(12) United States Patent
Sugahara et al.

(10) Patent No.: US 9,998,937 B2
(45) Date of Patent: Jun. 12, 2018

(54) METHOD AND DEVICE FOR ESTIMATING COMMUNICATION LOAD, RADIO STATION AND UPPER-LEVEL APPARATUS IN RADIO COMMUNICATION SYSTEM

(71) Applicant: NEC Corporation, Tokyo (JP)

(72) Inventors: Hiroto Sugahara, Tokyo (JP); Jun Shikida, Tokyo (JP); Hiroaki Aminaka, Tokyo (JP); Toshifumi Nakamura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days. days.

(21) Appl. No.: 14/890,981

(22) PCT Filed: May 12, 2014

(86) PCT No.: PCT/JP2014/002489
§ 371 (c)(1),
(2) Date: Nov. 13, 2015

(87) PCT Pub. No.: WO2014/185048
PCT Pub. Date: Nov. 20, 2014

(65) Prior Publication Data
US 2016/0105815 A1    Apr. 14, 2016

(30) Foreign Application Priority Data

May 13, 2013    (JP) .................................. 2013-101151

(51) Int. Cl.
*H04W 24/08* (2009.01)
*H04W 24/02* (2009.01)
(Continued)

(52) U.S. Cl.
CPC ............. *H04W 24/08* (2013.01); *H04L 5/006* (2013.01); *H04L 43/0882* (2013.01); *H04W 24/02* (2013.01)

(58) Field of Classification Search
CPC .. H04W 24/08; H04W 24/02; H04L 43/0882; H04L 5/006
See application file for complete search history.

(56) References Cited

U.S. PATENT DOCUMENTS

2002/0163879 A1    11/2002  Li et al.
2013/0252620 A1*   9/2013   Kobayashi .......... H04W 52/325
                                                    455/446
(Continued)

FOREIGN PATENT DOCUMENTS

CN          102484542 A      5/2012
JP          2004-529527 A    9/2004
(Continued)

OTHER PUBLICATIONS

International Search Report corresponding to PCT/JP2014/002489, dated Jul. 22, 2014; (3 pages).
(Continued)

*Primary Examiner* — Andrew Lai
*Assistant Examiner* — Harry H Kim
(74) *Attorney, Agent, or Firm* — Wilmer Cutler Pickering Hale and Dorr LLP

(57) ABSTRACT

A method and a device for estimating a communication load, as well as a radio station and an upper-level apparatus in a radio communication system, are provided that can estimate a communication load in a target network with high accuracy by using received quality information. A communication load estimation function (1) for estimating a communication load in a network (NW) estimates the communication load in the network by using at least a first quality indicator (Q1), which is a quality measurement value including entire received power, and a second quality indi-
(Continued)

cator (Q2), which is a quality measurement value including the signal-to-noise-and-interference ratio of a reference signal.

29 Claims, 42 Drawing Sheets

(51) Int. Cl.
*H04L 5/00* (2006.01)
*H04L 12/26* (2006.01)

(56) References Cited

U.S. PATENT DOCUMENTS

| | | | | |
|---|---|---|---|---|
| 2014/0092771 | A1* | 4/2014 | Siomina | H04W 24/08 370/252 |
| 2014/0254405 | A1* | 9/2014 | Mellein | H04W 24/02 370/252 |

FOREIGN PATENT DOCUMENTS

| | | |
|---|---|---|
| JP | 2005-012566 | 1/2005 |
| WO | WO-02/49305 A2 | 6/2002 |
| WO | WO-2002/058300 | 7/2002 |
| WO | WO-2011/031193 A1 | 3/2011 |
| WO | WO-2012/081150 A1 | 6/2012 |
| WO | WO-2012/118414 A1 | 9/2012 |
| WO | WO-2013/154186 A1 | 10/2013 |

OTHER PUBLICATIONS

3GPP TS 36.300 v10.5.0, (Sep. 2011); Section 22; 3rd Generation Partnership Project; Technical Specification Group Radio Access Network; Evolved Universal Terrestrial Radio Access (E-UTRA); and Evolved Universal Terrestrial Radio Access Network (E-UTRAN); Overall description; Stage 2; Release 10; (194 pages).

3GPP TS 36.331 v10.5.0 (Mar. 2012); 3rd Generation Partnership Project; Technical Specification Group Radio Access Network; Evolved Universal Terrestrial Radio Access (E-UTRA); Radio Resource Control (RRC); Protocol specification (Release 10); (302 pages).

Ricciato, Fabio, "Traffic Monitoring and Analysis for the Optimization of a 3G Network," IEEE Wireless Communications, IEEE Service Center, Piscataway, NJ, US, vol. 13, No. 6, XP011154452, pp. 42-49 (Dec. 2006).

Supplemental European Search Report issued by the European Patent Office for European Application No. 14797326.7 dated Apr. 3, 2017 (12 pages).

Chinese Office Action issued by the State Intellectual Property Office of the People's Republic of China for Chinese Application No. 201480027946.5 dated Mar. 19, 2018 (15 pages).

* cited by examiner

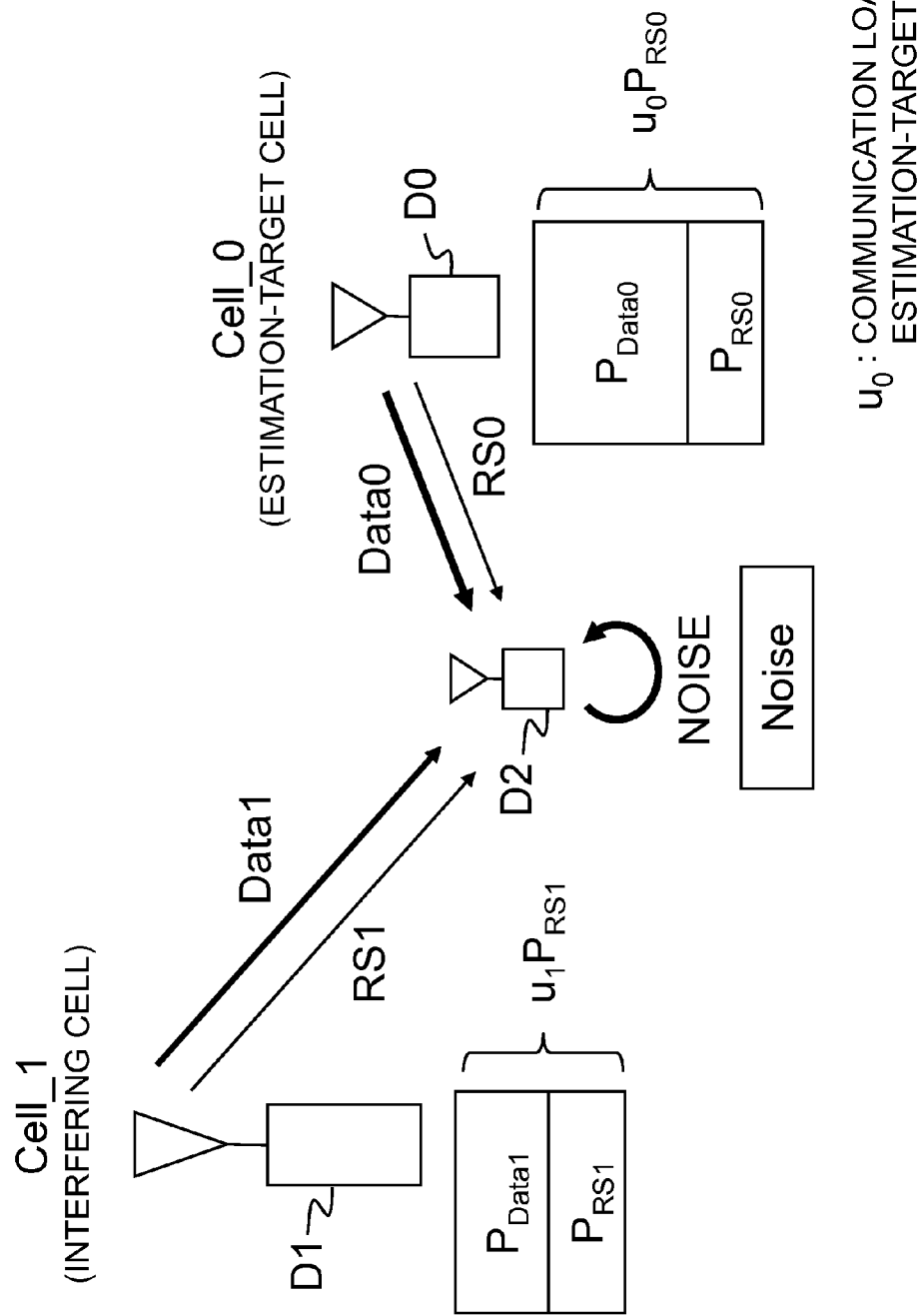

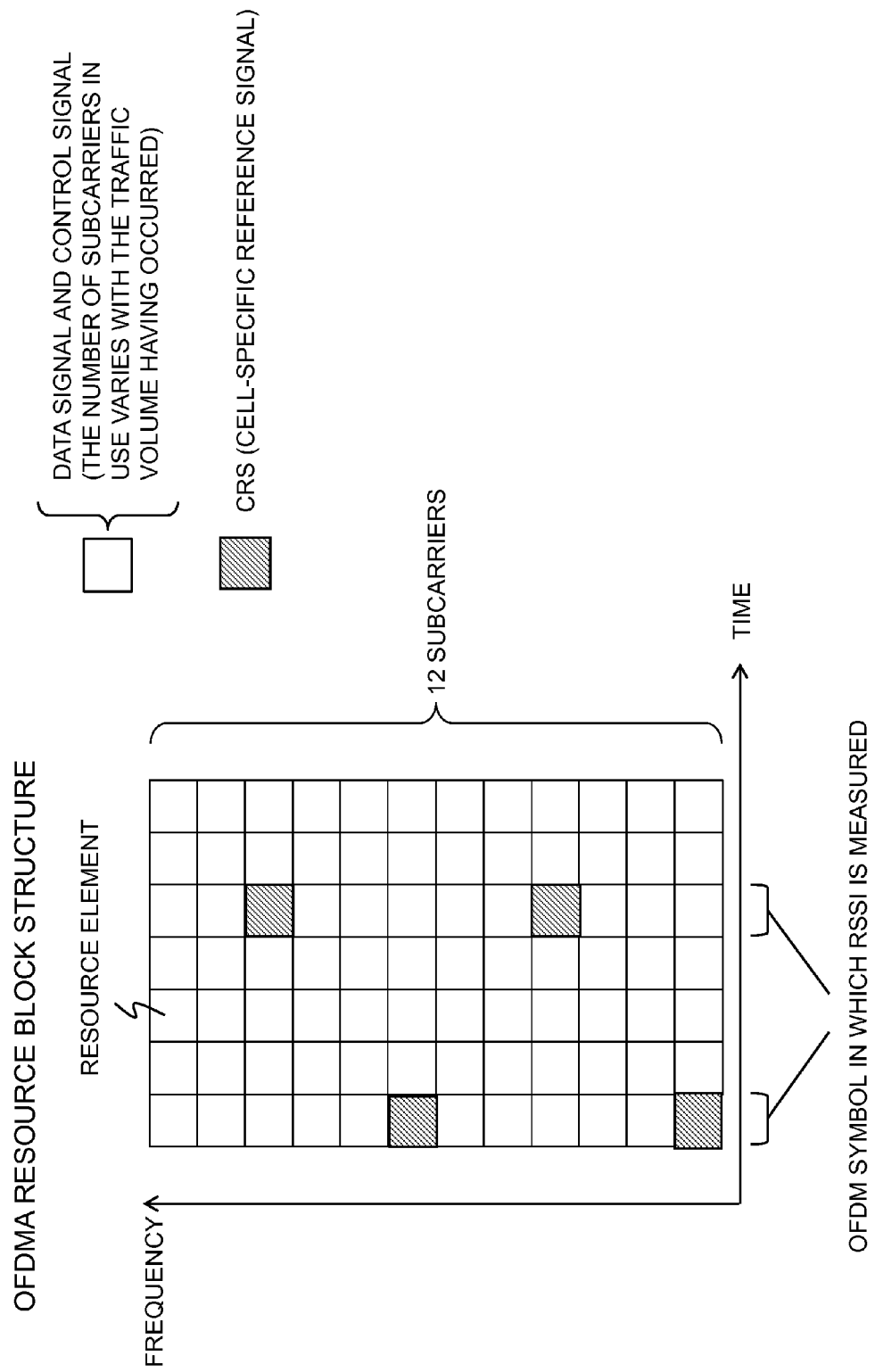

FIG. 5

ENTIRE RECEIVED POWER (INCLUDING INTERFERENCE POWER AND NOISE)

QUALITY INDICATOR Q1: RSSI = $\underbrace{\boxed{\begin{array}{c|c}P_{Data0} & P_{RS0}\end{array}}}_{u_0 P_{RS0}}$ + $\underbrace{\boxed{\begin{array}{c|c}P_{Data1} & P_{RS1}\end{array}} + \boxed{Noise}}_{\text{SUBTRACT}}$ QUALITY INDICATOR Q2: SINR = $\dfrac{P_{RS0}}{\left(\boxed{\begin{array}{c|c}P_{Data1} & P_{RS1}\end{array}} + \boxed{Noise}\right) / (\text{NUMBER OF SUBCARRIERS})}$

ONLY INTERFERENCE POWER AND NOISE COMPONENTS ARE INCLUDED IN DENOMINATOR

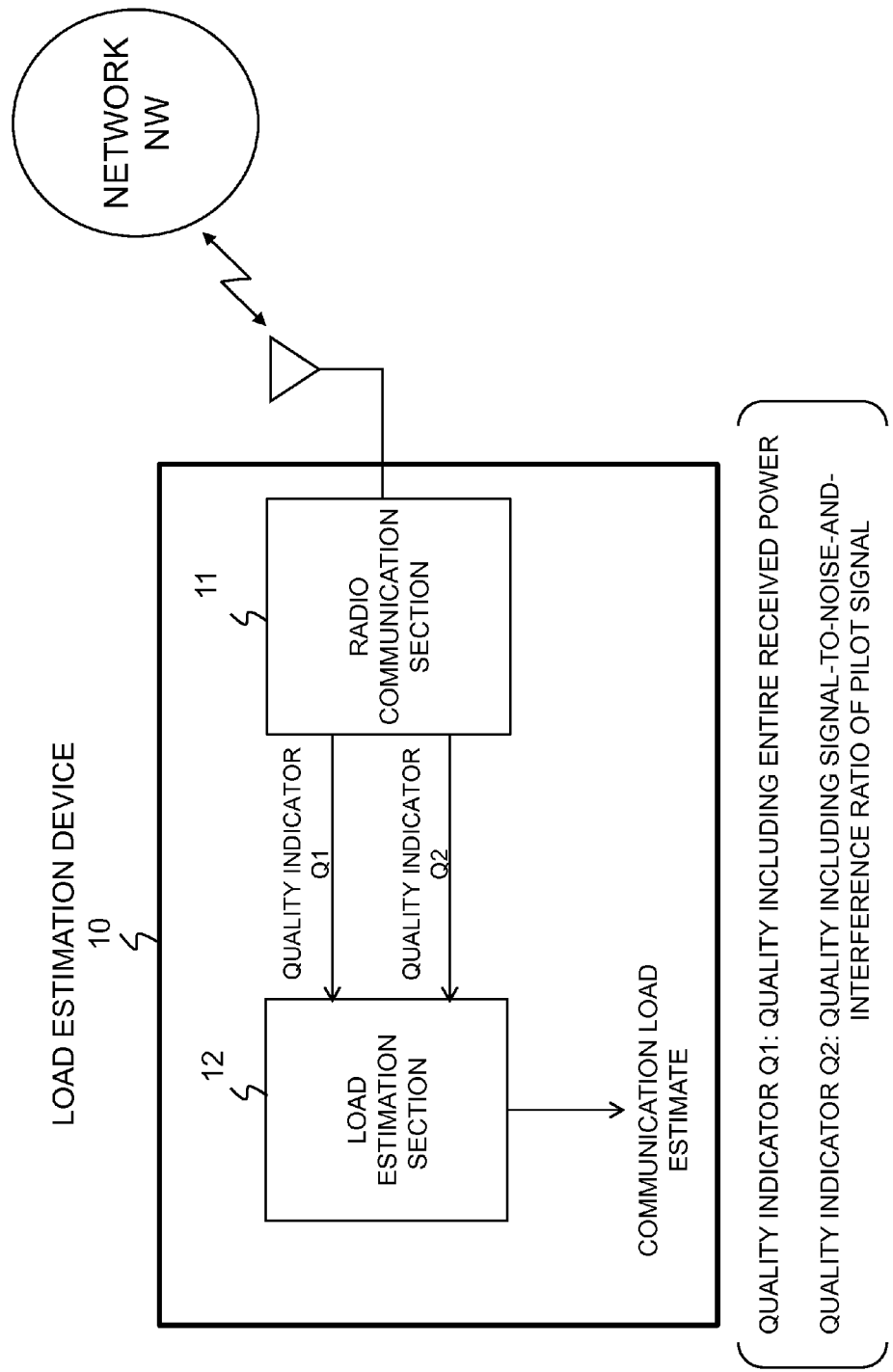

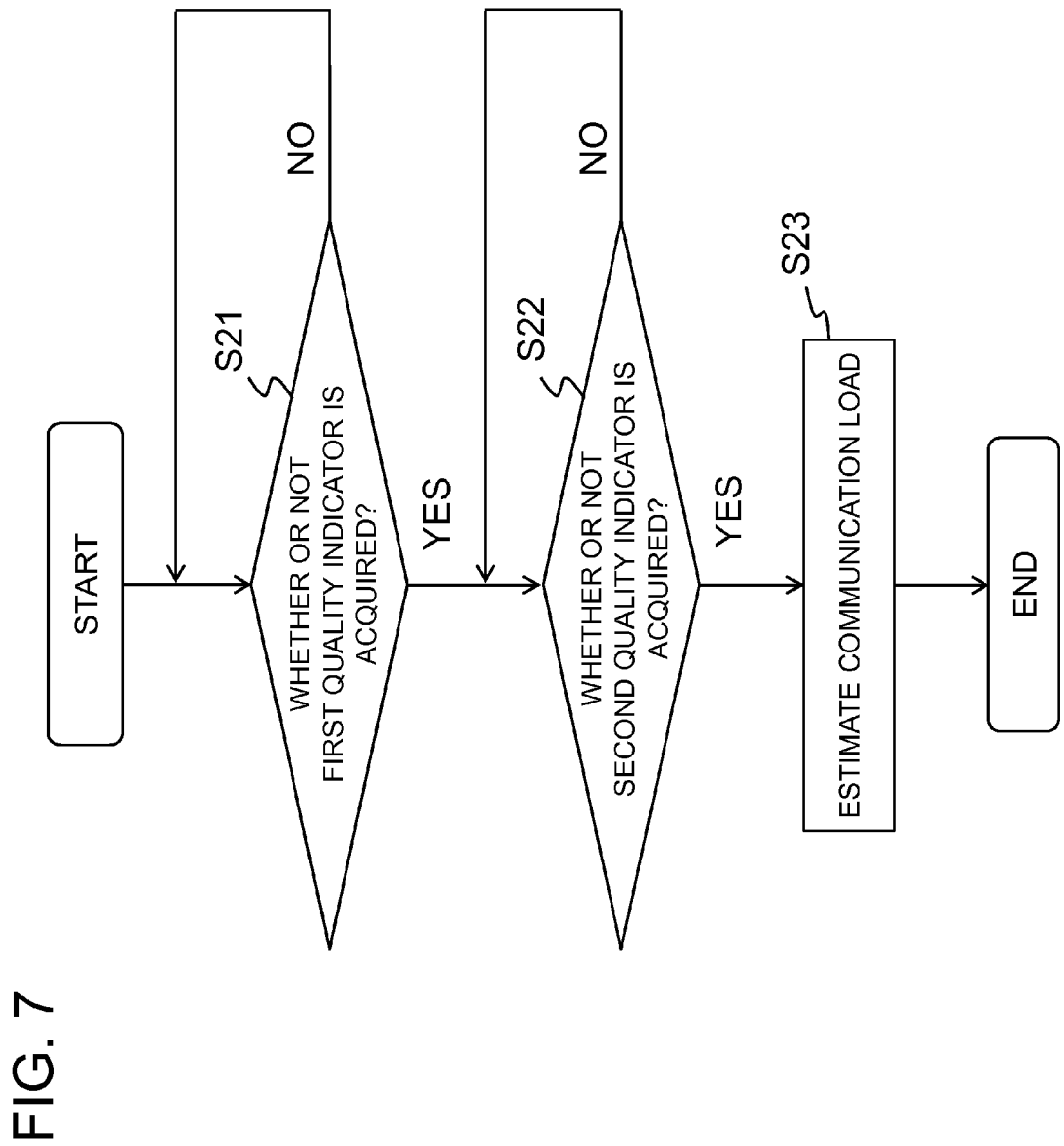

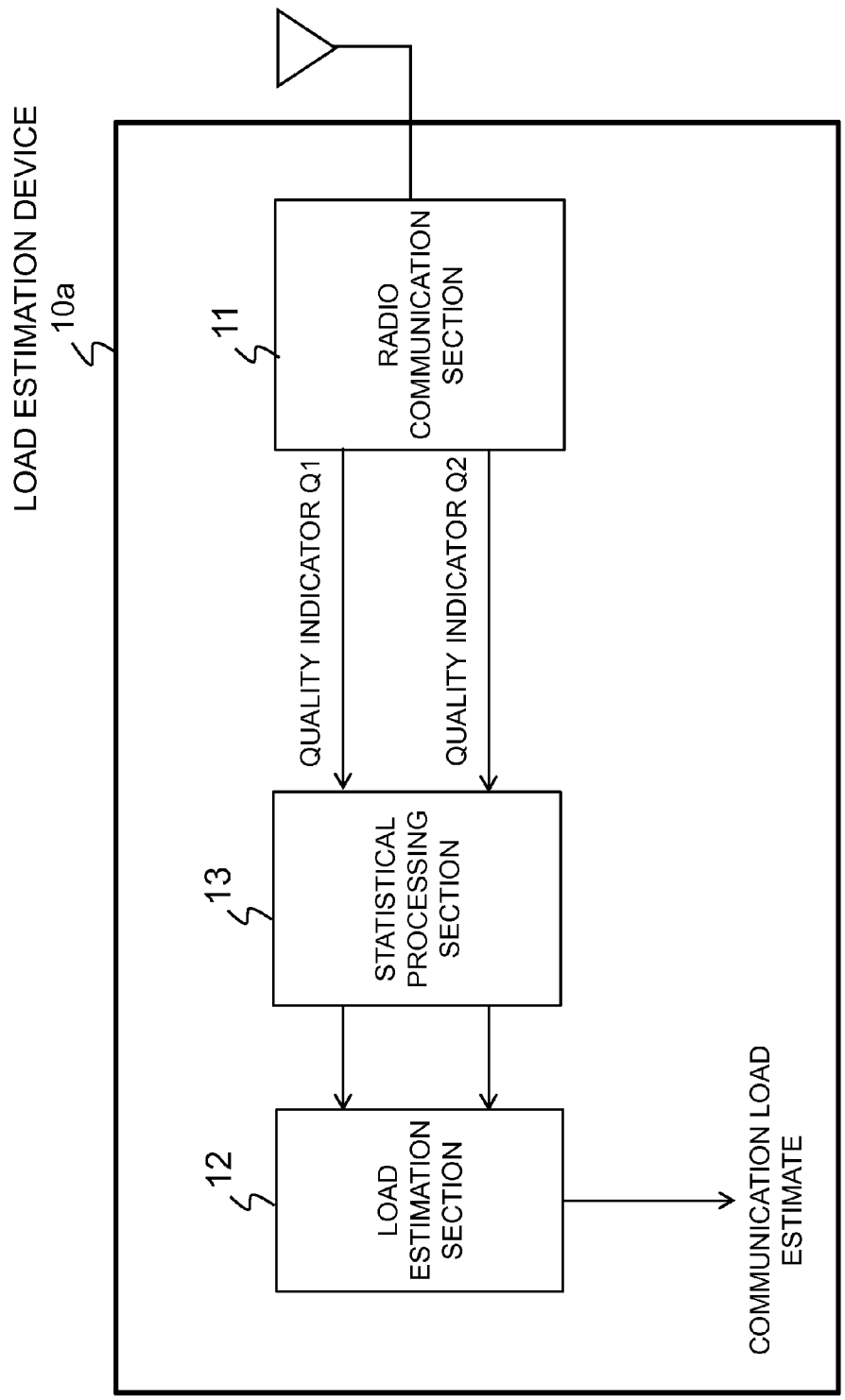

FIFTH EXAMPLE

COMMUNICATION LOAD ESTIMATION CONTROL
(FIRST EXAMPLE)

COMMUNICATION LOAD ESTIMATION CONTROL

EIGHTH EXAMPLE

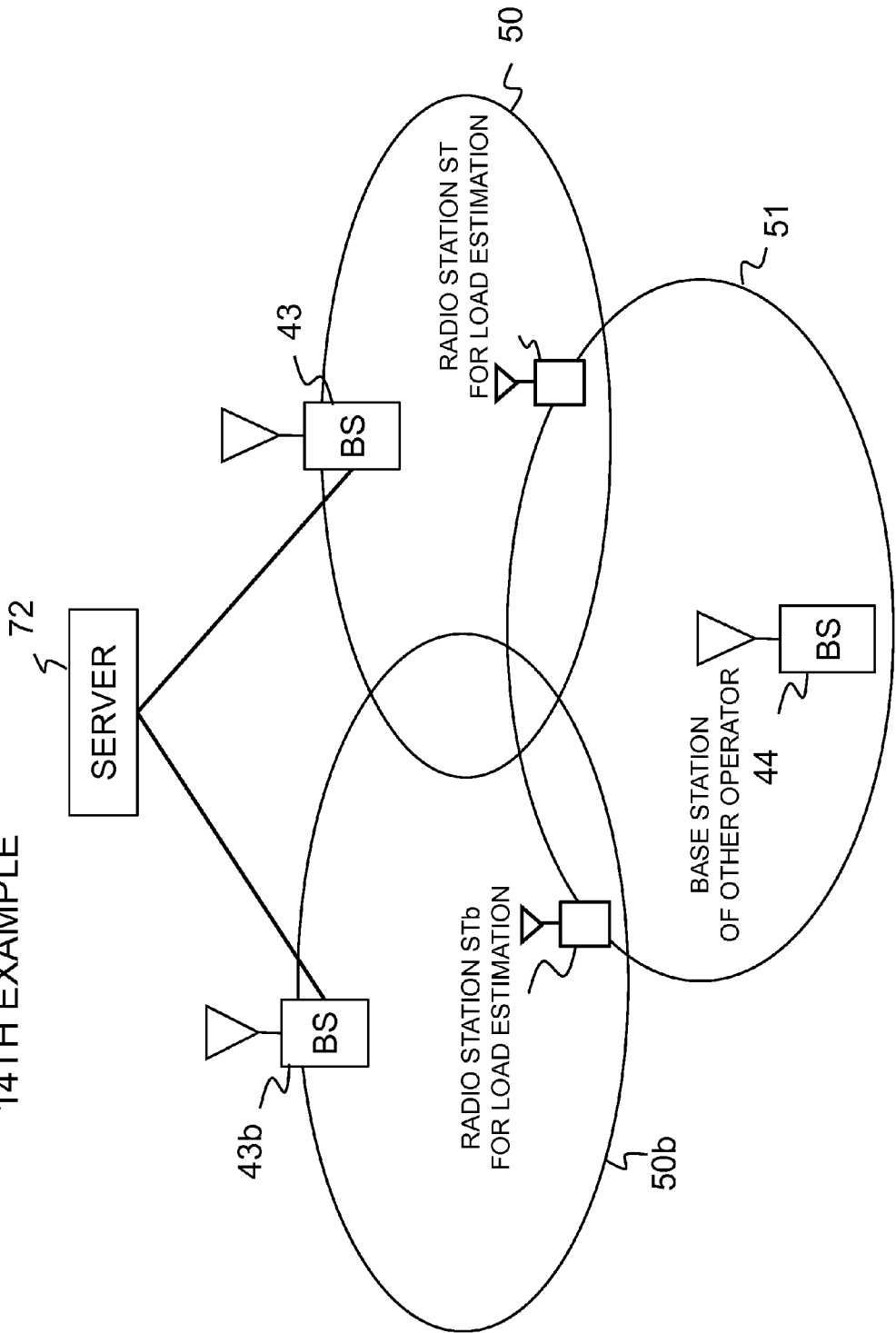

METHOD AND DEVICE FOR ESTIMATING COMMUNICATION LOAD, RADIO STATION AND UPPER-LEVEL APPARATUS IN RADIO COMMUNICATION SYSTEM

CROSS-REFERENCE TO RELATED APPLICATIONS

This application is a national stage application of International Application No. PCT/JP2014/002489 entitled "METHOD AND DEVICE FOR ESTIMATING COMMUNICATION LOAD, RADIO STATION AND UPPER-LEVEL APPARATUS IN RADIO COMMUNICATION SYSTEM," filed on May 12, 2014, which claims the benefit of the priority of Japanese Patent Application No. 2013-101151, filed on May 13, 2013, the disclosures of each of which are hereby incorporated by reference in their entirety.

TECHNICAL FIELD

The present invention relates to radio communication networks and, more particularly, to a technique for estimating a network communication load, a radio communication system, a radio station and an upper-level apparatus that use the technique.

BACKGROUND ART

In recent years, active studies have been conducted on SON (Self Organizing Network), which autonomously optimizes radio parameters and network configurations, in radio communication systems such as cellular systems. Standardization of SON functions is under way also in 3GPP LTE (Long Term Evolution) (NPL 1). Forms of use of SON include technologies for optimization of cell coverage and capacity (Coverage and Capacity Optimization: CCOpt) and the like. To implement CCOpt, it is necessary that each base station should know communication loads on its neighboring base stations. Since the X2 interface is prescribed between base stations that are close to each other for them to exchange various information (NPL 2), it is possible to acquire communication loads on neighboring base stations by using this X2 interface.

Moreover, the situation of mobile telecommunications is that a plurality of systems such as WCDMA (Wideband Code Division Multiple Access) and LTE, or public LANs (Local Area Networks), coexist, and further a plurality of operators coexist also in cellular networks. In such a multi-network environment, user equipment need to know a communication load in each network in order to select and connect to a network where higher-speed communication is possible.

Furthermore, PTL 1 discloses a method in which the degrees of communication loads in cells in vicinity are determined and then cell selection or re-selection is performed. According to the system of PTL 1, the Ec/No of a pilot signal received from another cell is measured, whereby the degree of concentration of calls in this another cell is determined and used for decision in cell selection or re-selection.

CITATION LIST

Patent Literature

[PTL 1]
Japanese Patent Application Unexamined Publication No. 2005-012566
[NPL 1]
3GPP TS36.300 v10.5.0, section 22
[NPL 2]
3GPP TS36.331 v10.5.0

SUMMARY OF INVENTION

Technical Problem

However, the above-described method for acquiring communication loads utilizing the X2 interface can be used between base stations having the X2 interface, and a base station having no X2 interface cannot obtain load information of neighboring cells.

Moreover, in a multi-network environment, if a radio terminal is capable of connecting not only to its own terminal's network but also to a different network via another radio terminal, a communication load in this different network is not notified to the radio terminal. Similarly, if an operator is different from that of the own terminal's network, a notification about a load in this different network cannot be acquired either.

Furthermore, in the method described in PTL 1, the Ec/No of a pilot signal received from a cell in vicinity is measured, whereby the degree of concentration of calls in this other cell is determined. However, since Ec/No depends not only on the load in a cell but also on the interference with neighboring cells, highly accurate communication load estimation cannot be performed only with Ec/No.

Accordingly, an object of the present invention is to provide a method and a device for estimating a communication load, a radio station and an upper-level apparatus in a radio communication system, which allows high-accuracy estimation of a communication load in a target network by using received quality information.

Solution to Problem

A communication load estimation method according to the present invention is a method for estimating a communication load in a network, characterized in that the communication load in the network is estimated by using at least a first quality indicator, which includes entire received power, and a second quality indicator, which includes a signal-to-noise-and-interference ratio of a reference signal.

A communication load estimation device according to the present invention is a device for estimating a communication load in a network, characterized by comprising: acquisition means for acquiring at least measurement data on a first quality indicator, which includes entire received power, and on a second quality indicator, which includes a signal-to-noise-and-interference ratio of a reference signal; and estimation means for estimating the communication load in the network by using at least the first and second quality indicators.

A radio station according to the present invention is a radio station in a radio communication system, characterized by comprising: acquisition means for acquiring at least measurement data on a first quality indicator, which includes entire received power, and on a second quality indicator, which includes a signal-to-noise-and-interference ratio of a reference signal; and estimation means for estimating a communication load in a network by using at least the first and second quality indicators.

An upper-level apparatus according to the present invention is an upper-level apparatus of a radio station in a radio communication system, characterized by comprising: acquisition means for acquiring from a radio station at least measurement data on a first quality indicator, which includes entire received power, and on a second quality indicator, which includes a signal-to-noise-and-interference ratio of a reference signal; and estimation means for estimating a communication load in a network by using at least the first and second quality indicators.

A radio communication system according to the present invention is a radio communication system including at least one of a radio station and an upper-level apparatus thereof, characterized in that the radio station or the upper-level apparatus estimates a communication load in the network by using at least a first quality indicator, which includes entire received power, and a second quality indicator, which includes a signal-to-noise-and-interference ratio of a reference signal.

Advantageous Effects of Invention

According to the present invention, it is possible to estimate a network communication load with high accuracy by using at least a first quality indicator, which includes entire received power, and a second quality indicator, which includes the signal-to-noise-and-interference ratio of a reference signal.

BRIEF DESCRIPTION OF DRAWINGS

FIG. 3 is a network architecture diagram in a case where the load estimation method according to the present exemplary embodiment is applied to an LTE system.

FIG. 4 is a schematic diagram showing an example of a resource block structure in LTE.

FIG. 5 is a schematic diagram for briefly describing mathematics for calculating quality indicators in the load estimation method shown in FIG. 3.

FIG. 6 is a block diagram showing a functional configuration of a load estimation device according to a first example of the present invention.

FIG. 7 is a flowchart showing a load estimation method according to the first example.

FIG. 8 is a block diagram showing a functional configuration of a load estimation device according to a second example of the present invention.

FIG. 42 is a network architecture diagram using radio terminals for load measurement according to a 14th example of the present invention.

DESCRIPTION OF EMBODIMENTS

Outline of Exemplary Embodiments

Figure 1:
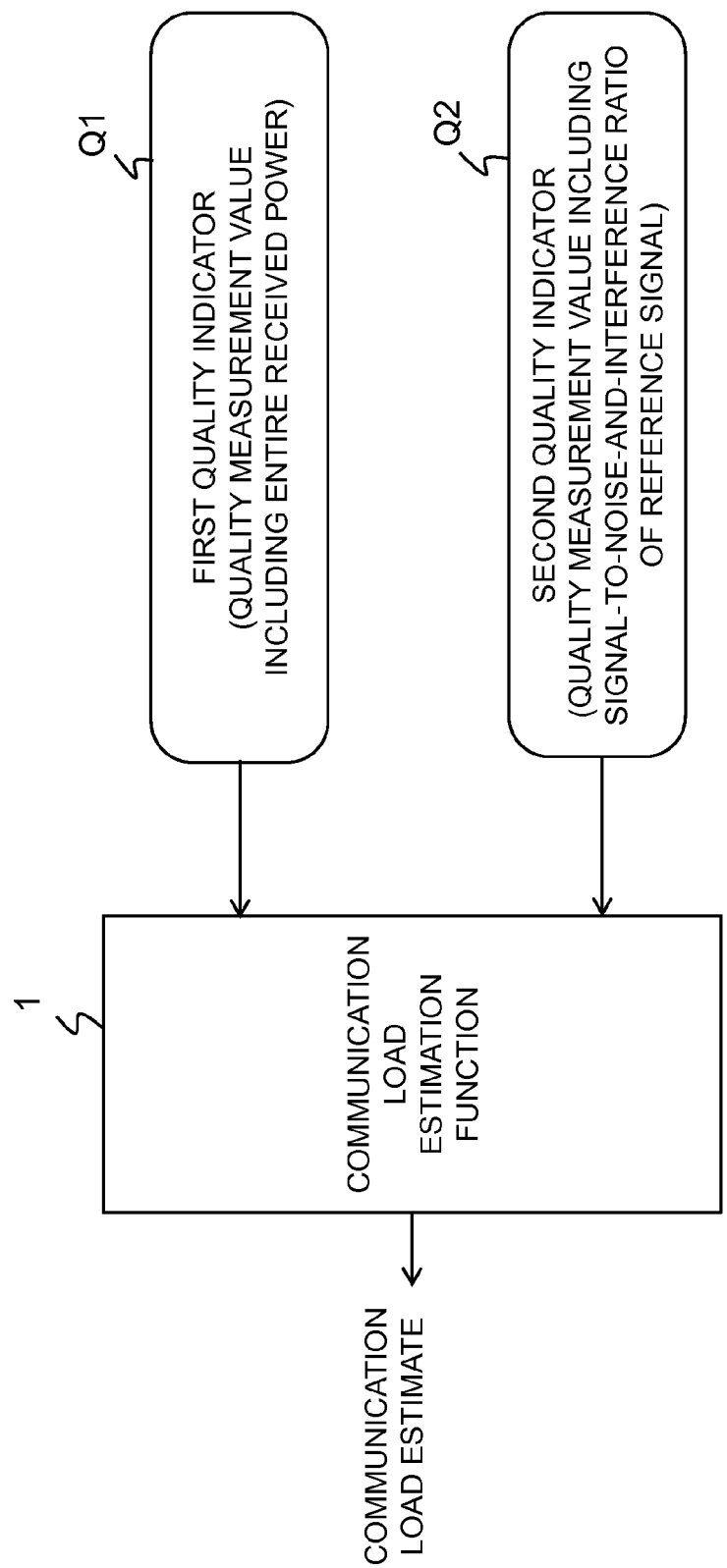
FIG. 1 is a conceptual configuration diagram for describing a method for estimating a communication load according to an exemplary embodiment of the present invention.

Referring to FIG. 1, according to an exemplary embodiment of the present invention, a network communication load is estimated by a communication load estimation function 1, using at least a quality indicator Q1, which includes entire received power measured by a radio station, and a quality indicator Q2, which includes a signal-to-noise-and-interference ratio of a reference signal (reference signal or pilot signal). Here, a radio station is a device having a radio communication function in a radio communication system, and it will be assumed hereinafter that "radio station" includes a radio terminal, a user terminal, a mobile station, a user equipment (UE), a radio base station, an eNB, a NodeB and the like.

The quality indicator Q1 is entire received power including interference power and noise, and its examples include RSSI (Received Signal Strength Indicator), RSRQ (Reference Signal Received Quality), Ec/No (Energy per chip/Noise), or the like. Examples of the quality indicator Q2 include SINR (Signal to Interference plus Noise Ratio) or the like.

The communication load estimation function 1 is a function that can be provided to a radio station or a network upper-level apparatus managing radio stations, and executes communication load estimation, which will be described next.

Communication Load Estimation

Figure 2:
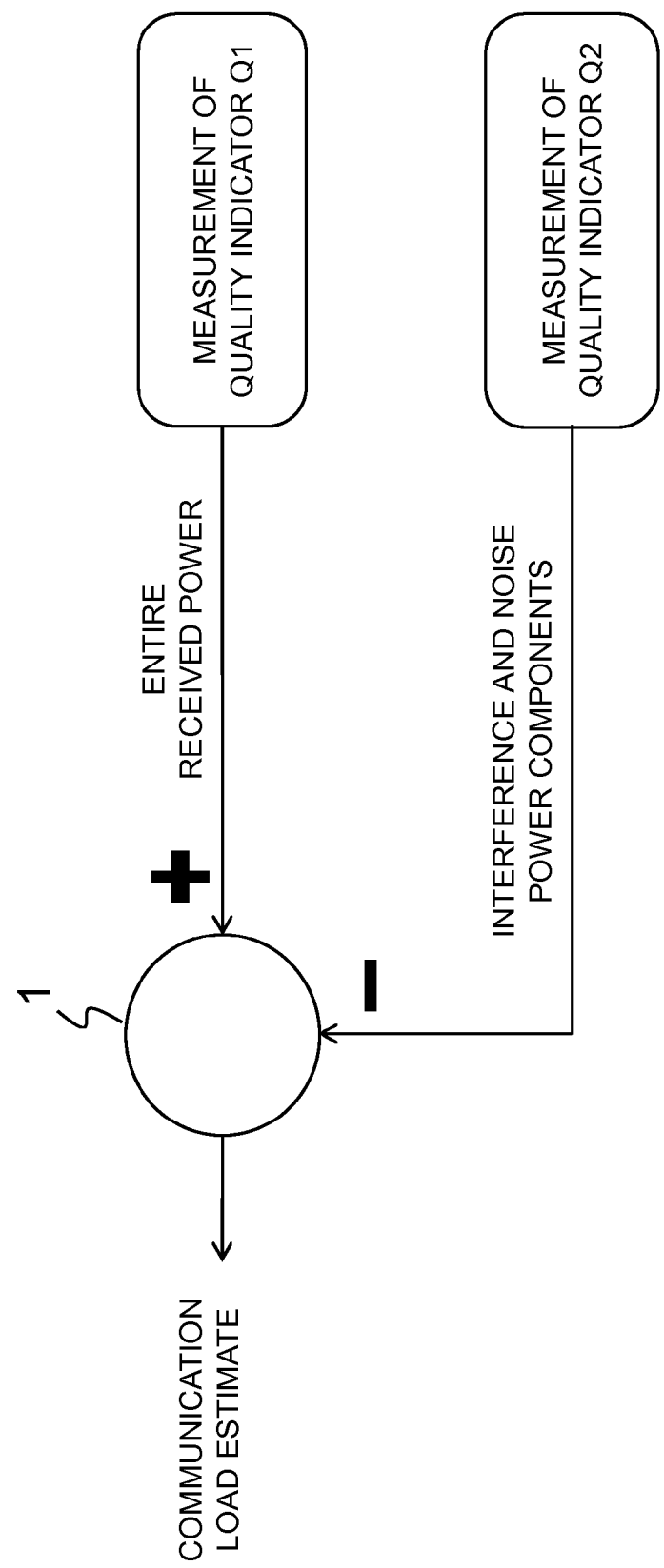
FIG. 2 is a schematic diagram showing an example of the method for estimating a communication load in FIG. 1.

Referring to FIG. 2, the communication load estimation function 1 calculates a communication load in an estimation-target network by subtracting inference and noise power components included in the quality indicator Q2 from entire received power, the quality indicator Q1. Hereinafter, a basic procedure of communication load estimation will be described by using an LTE system as an example.

Referring to FIG. 3, a radio communication system will be considered that includes radio stations D0 and D1, which manage cells, respectively, and a radio station D2, which receives reference signals RS and data signals Data from the radio stations D0 and D1. Here, it is assumed that a communication load $u_0$ in a cell Cell_0 is estimated in view of the radio station D2, and this cell Cell_0 and a cell Cell_1, which is controlled by the radio station D1, are referred to as the estimation-target cell and the interfering cell, respectively. Moreover, it is differentiated based on a suffix (0 or 1) whether a signal is of the estimation-target cell or of the interfering cell. Furthermore, it is assumed that $P_{RS0}$ is the received power of a reference signal RS0 from the radio station D0 and $P_{Data0}$ is the received power of a data signal Data0 therefrom, and that the entire received power from the estimation-target cell Cell_0 is represented as $u_0 P_{RS0}$ by using the communication load $u_0$.

Moreover, an OFDMA (Orthogonal Frequency Division Multiple Access) resource block structure shown in FIG. 4 will be used as an example in the description. However, the resource block structure in FIG. 4 is a structure in a case where the number of transmission antennas is one.

Referring to FIG. 5, RSSI, which is the quality indicator Q1, is entire received power including the received power $P_{RS0}$ and $P_{Data0}$ ($=u_0 P_{RS0}$) from the estimation-target cell Cell_0 as well as interference power $P_{RS1}+P_{Data1}$ from the interfering cell Cell_1 and a noise Noise. SINR, which is the quality indicator Q2, is the ratio of the received power $P_{RS0}$ of the reference signal RS0 to the interference power $P_{RS1}$ and $P_{Data1}$+Noise components per subcarrier.

Accordingly, the interference power $P_{RS1}$ and $P_{Data1}$+Noise components can be calculated by measuring the SINR and the received power $P_{RS0}$, and the received power $P_{RS0}$ and $P_{Data0}$ ($=u_0 P_{RS0}$) from the estimation-target cell Cell_0 can be obtained by subtracting a result of this calculation from a measurement value of RSSI, the quality indicator Q1. The communication load $u_0$ in the estimation-target cell Cell_0 can be calculated from the received power $P_{RS0}$ and $P_{Data0}$ ($=u_0 P_{RS0}$) from the estimation-target cell Cell_0 thus obtained and the measurement value of the receive power $P_{RS0}$ of the reference signal RS0. As the communication load $u_0$, a resource usage or the like can be used.

FIGS. 3 to 5 show a case of LTE. However, in a case of WCDMA, the same basic procedure also applies, in which a communication load in an estimation-target network is calculated by subtracting interference and noise power components included in the quality indicator Q2 from the quality indicator Q1 which indicates entire received power. Hereinafter, respective communication load estimation equations in the cases of LTE and WCDMA will be shown.

LTE

In the case of LTE, a communication load ($u_k$) in an estimation-target cell Cell_k can be estimated by using the following equation (1).

[Math. 1]

$$u_k = \frac{1}{5} \cdot \left( \frac{RSSI}{2p_k} - \frac{6}{SINR_k} - 1 \right) = \frac{1}{5} \cdot \left( \frac{1}{2RSRQ_k} - \frac{6}{SINR_k} - 1 \right) \quad (1)$$

Here, the quality indicator Q1 indicating entire received power is RSSI or $RSRQ_k$, and the quality indicator Q2 including the signal-to-noise-and-interference radio of a reference signal is $SINR_k$;

RSSI is the received signal power per resource block (1 RB) of an OFDM symbol in which reference signals RSs are multiplexed;

$p_k$ is the received signal power per resource element of the reference signal RS of the cell Cell_k ($RSRP_k$);

$SINR_k$ is the ratio of the received signal power of the RS signal of the cell Cell_k to interference signal power+noise power; and $RSRQ_k$ is the ratio of the received signal power of the RS signal of the cell Cell_k to the RSSI.

WCDMA

In the case of WCDMA, a communication load ($u_k$) in an estimation-target cell Cell_k can be estimated by using the following equation (2).

[Math. 2]

$$u_k = \frac{RSSI}{p_k} - \frac{SF}{SINR_k} - 1 = \frac{1}{Ec/No_k} - \frac{SF}{SINR_k} - 1 \qquad (2)$$

Here, the quality indicator Q1 indicating entire received power is RSSI or $Ec/No_k$, and the quality indicator Q2 including the signal-to-noise-plus-interference radio of a reference signal is $SINR_k$;

RSSI is the received signal power within a bandwidth;

$p_k$ is the received signal power of a pilot signal (PS) of the cell Cell_k ($RSRP_k$);

$SINR_k$ is the ratio of the received signal power of the PS signal of the cell Cell_k to interference signal power+noise power;

$Ec/No_k$ is the ratio of the received signal power of the PS signal of the cell Cell_k to the RSSI; and SF is a spreading factor.

Note that apart from LTE and WCDMA described above, in a case of cdma2000, Ec, Ec/Io or Pilot Strength can be used for the quality indicator Q1, and in a case of WiMAX, Preamble RSSI or CINR (Carrier to Interference-plus-Noise Ratio) can be used for the quality indicator Q1.

As described above, a network communication load is estimated by using at least the quality indicator Q1, which includes entire received power measured by a radio station, and the quality indicator Q2, which includes the signal-to-noise-and-interference ratio of a reference signal. Thus, it is possible to estimate a network communication load with high accuracy by using radio quality information measured by a radio terminal.

Hereinafter, a description will be given individually of first to fourth examples (FIGS. 6 to 15) as exemplary aspects of a first exemplary embodiment of the present invention, fifth to eighth examples (FIGS. 16 to 28), a second exemplary embodiment, ninth to 13th examples (FIGS. 29 to 41), a third exemplary embodiment, and 14th and 15th examples (FIG. 42), a fourth exemplary embodiment.

First Exemplary Embodiment

A load estimation device according to a first exemplary embodiment of the present invention acquires the first quality indicator Q1 and the second quality indicator Q2 and estimates a communication load in an estimation-target network as described above.

1. First Example 1.1) Configuration

Referring to FIG. 6, a load estimation device 10 according to a first example of the present invention has a functional configuration including a radio communication section 11 and a load estimation section 12. The radio communication section 11 is capable of connecting to a network NW by radio and outputs the first quality indicator Q1 and the second quality indicator Q2 to the load estimation section 12.

The quality indicator Q1 is a quality indicator including entire received power measured by the radio communication section 11 or another radio station and is, for example, RSSI or RSRQ in the case of LTE, or Ec/No in the case of WCDMA. The quality indicator Q2 is a quality indicator (such as SINR) including the signal-to-noise-and-interference ratio of a reference signal (reference signal or pilot signal). The load estimation section 12 estimates a communication load in the network NW by using the quality indicators Q1 and Q2. A communication load estimate is a resource usage or the like and can be obtained by subtracting interference power and noises included in the quality indicator Q2 from the quality indicator Q1, which indicates the entire received power.

1.2) Operations

The load estimation device 10 shown in FIG. 6 can be provided to a radio station, and a control section (not shown) of the radio station performs control for load estimation operations, which will be described next.

Referring to FIG. 7, the control section determines whether or not the first quality indicator Q1 is acquired (Operation S21) and, if the first quality indicator Q1 is acquired (Operation S21; YES), determines whether or not the second quality indicator Q2 is acquired (Operation S22). If the second quality indicator Q2 is acquired (Operation S22; YES), the control section controls the load estimation section 12 so that the load estimation section 12 estimates a communication load in the network NW by using the first quality indicator Q1 and the second quality indicator Q2 (Operation S23). For the estimation of the communication load, the above-described load estimation equation (1) or (2) can be used. Note that in the present operations, the order of the operations for acquiring the first and second quality indicators may be interchanged.

Note that the load estimation section 12 may be configured to perform the load estimation operations when the received power of a reference signal is not smaller than a predetermined magnitude. Since load estimation is not performed when a reference signal is weak, the amount of calculation by the load estimation section 12 can be suppressed.

1.3) Effects

As described above, according to the first example of the present invention, a network communication load is estimated by using the quality indicator Q1 and the quality indicator Q2, which includes the signal-to-noise-and-interference ratio of a reference signal. Accordingly, it is possible to estimate a network communication load with high accuracy by using only measured radio quality information. Moreover, load estimation can be performed without actually connecting to a network, and so it is possible to suppress increases in power consumption and network load.

2. Second Example

According to a second example of the present invention, in order to suppress variation in load estimation results, load estimation is performed after statistical processing on the measured quality indicators.

2.1) Configuration

Referring to FIG. 8, a load estimation device 10a according to the second example of the present invention has a structure in which a statistical processing section 13 is provided prior to the load estimation section 12 in the load estimation device 10 according to the first example shown in FIG. 6. Accordingly, those blocks that have the same functions as in the first example are given the same reference numerals, and a description thereof will be omitted.

2.2) Operations

Assuming that the load estimation device 10a shown in FIG. 8 is provided with a control section (not shown) that controls operations, the control section performs control for load estimation operations, which will be described next.

Figure 9:
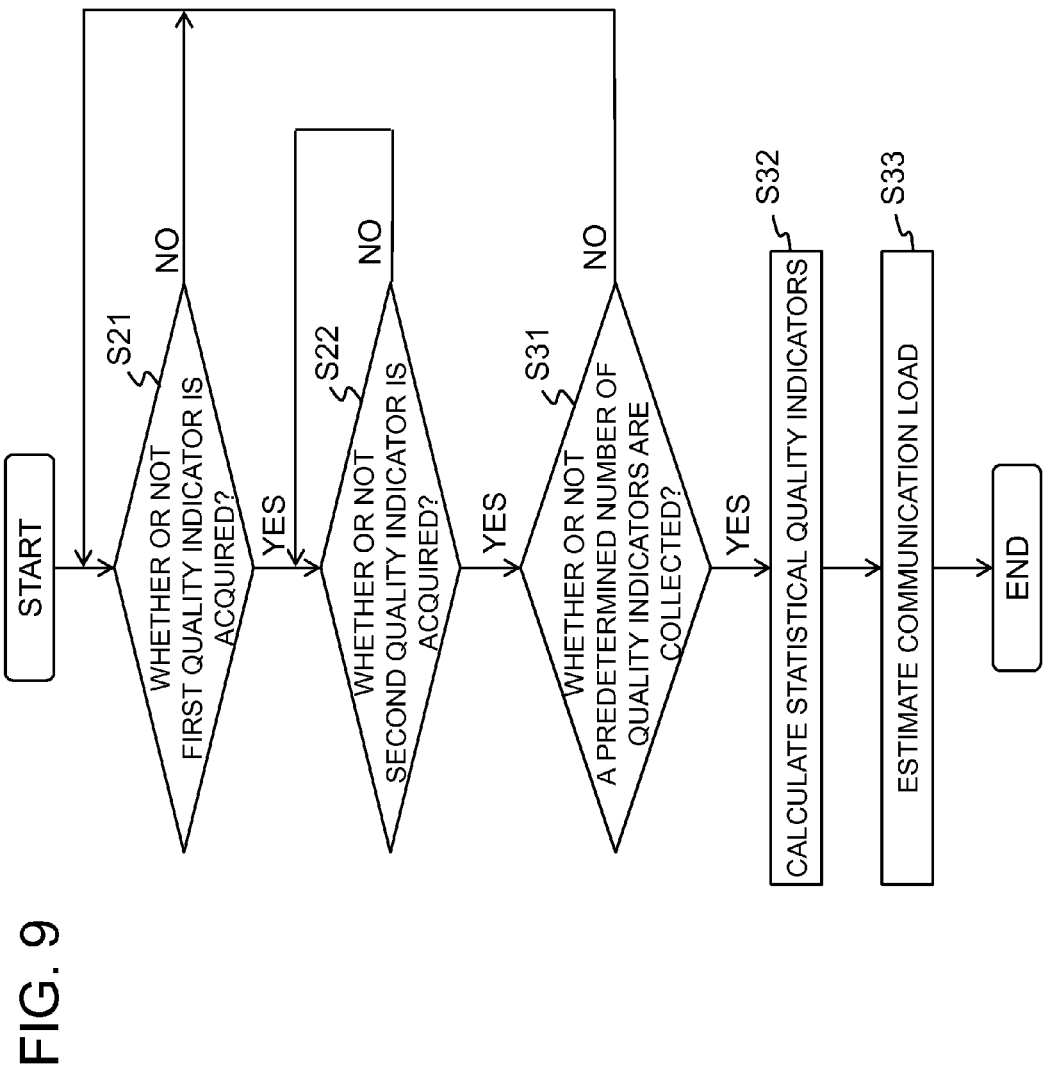
FIG. 9 is a flowchart showing operations of the load estimation device according to the second example.

Referring to FIG. 9, the control section determines whether or not the first quality indicator Q1 is acquired (Operation S21) and, if the first quality indicator Q1 is acquired (Operation S21; YES), determines whether or not the second quality indicator Q2 is acquired (Operation S22). If the second quality indicator Q2 is acquired (Operation S22; YES), the control section determines whether or not a predetermined number of quality indicator measurement values are collected at the statistical processing section 13 (Operation S31), and repeats the above-described Operations S21 to S22 until the predetermined number of them are collected (Operation S31; NO). When the predetermined number of quality indicator measurement values are collected (Operation S31; YES), the statistical processing section 13 performs statistical processing, such as averaging or weighting, on the predetermined number of first quality indicators Q1 and second quality indicators Q2 (Operation S32) and outputs the first and second quality indicators subjected to the statistical processing to the load estimation section 12. The load estimation section 12 estimates a communication load in the network NW as described above by using the first quality indicator Q1 and the second quality indicator Q2 subjected to the statistical processing (Operation S33).

Note that the statistical processing section 13 may be configured to perform the statistical processing when the received power of a reference signal is not smaller than a predetermined magnitude.

2.3) Statistical Processing

Figure 10:
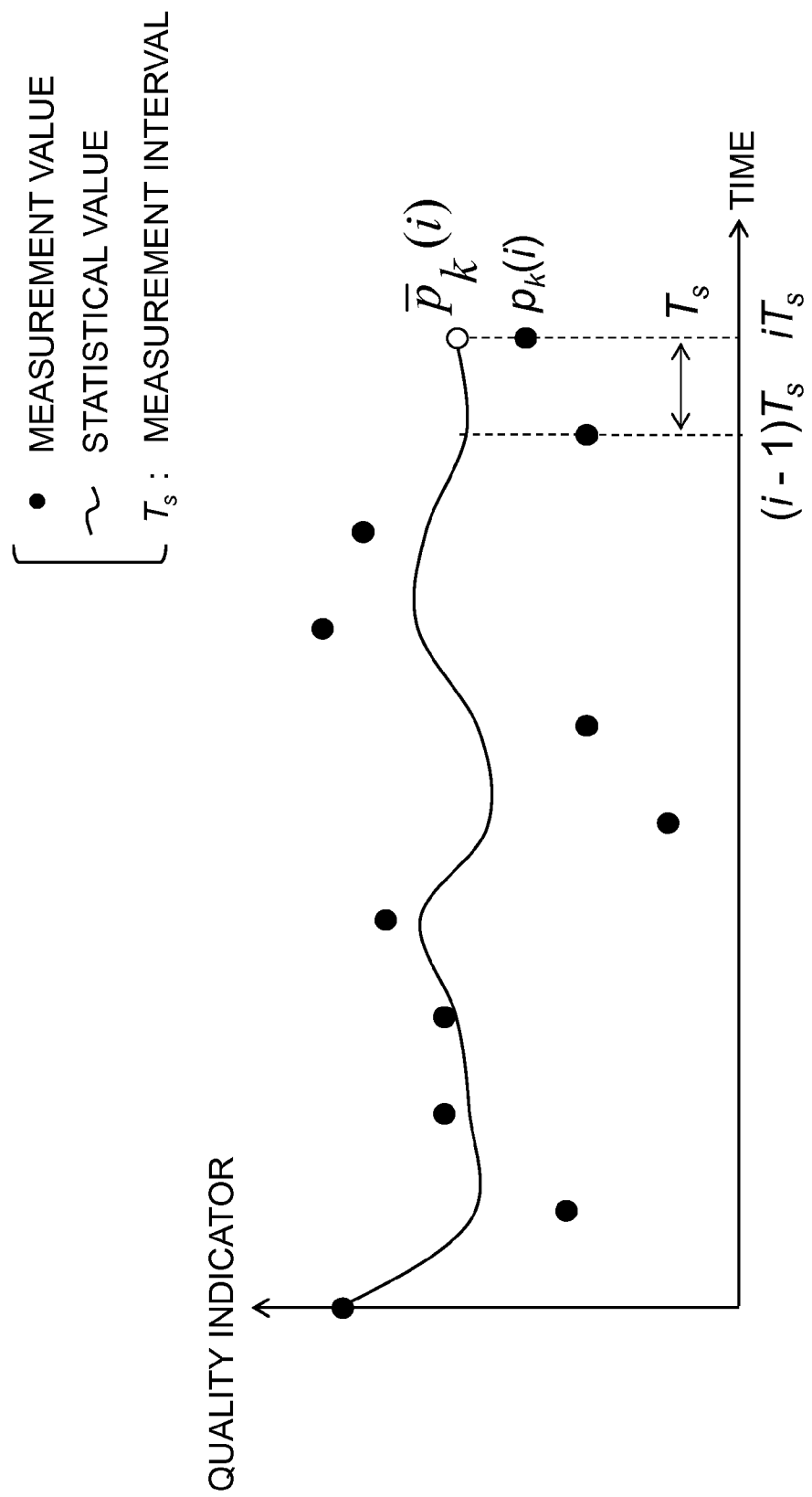
FIG. 10 is a graph showing changes in quality indicator over time for describing an example of statistical processing of a quality indicator in the second example.

The first quality indicator Q1 and the second quality indicator Q2 are individually measured at measurement intervals Ts as schematically shown in FIG. 10. However, their measurement values $p_k$ vary over time in actuality, and a measurement value $p_k(i)$ at a certain sampling point i does not always reflect actual quality and may possibly greatly deviate from it. Accordingly, such measurement values are collected for a certain period of time and subjected to statistical processing, whereby variation in the measurement values over time can be suppressed as shown by statistical value $p(\text{overbar})_k(i)$ in FIG. 10.

For the statistical processing, averaging or weighting processing or the like can be used and, generally, can be expressed by the following equation (3).

[Math. 3]

$$\overline{p}_k(i) = \sum_{j=0}^{N_{samp}-1} w_j p_k(i-j) \Big/ \sum_{j=0}^{N_{samp}-1} w_j \quad (3)$$

Here, $p(\text{overbar})_k$ is a quality indicator statistical value, $N_{samp}$ is the number of samples, $w_j$ is a weighting factor, and $p_k$ is a quality indicator measurement value.

The number of samples $N_{samp}$ and the weighting factor $w_j$ can be determined depending on the varying states over time of the measurement values. For example, when attempting to suppress variation, the number of samples $N_{samp}$ is made larger, and when attempting to make latest measurement values have greater effects, the weighting factor $w_j$ is made to have a greater value as j becomes smaller.

2.4) Effects

As described above, according to the second example of the present invention, in addition to the above-described effects of the first example, variation in load estimation results over time can be suppressed by performing load estimation after carrying out statistical processing on the measured quality indicators, and so it is possible to perform more reliable load estimation.

3. Third Example

An object of a third example of the present invention is to suppress variation in load estimation results over time similarly to the second example, but the third example provides another method for solution, in which variation over time is suppressed by using a plurality of load estimation results obtained according to the above-described first example. Hereinafter, a detailed description will be given.

3.1) Configuration

Figure 11:
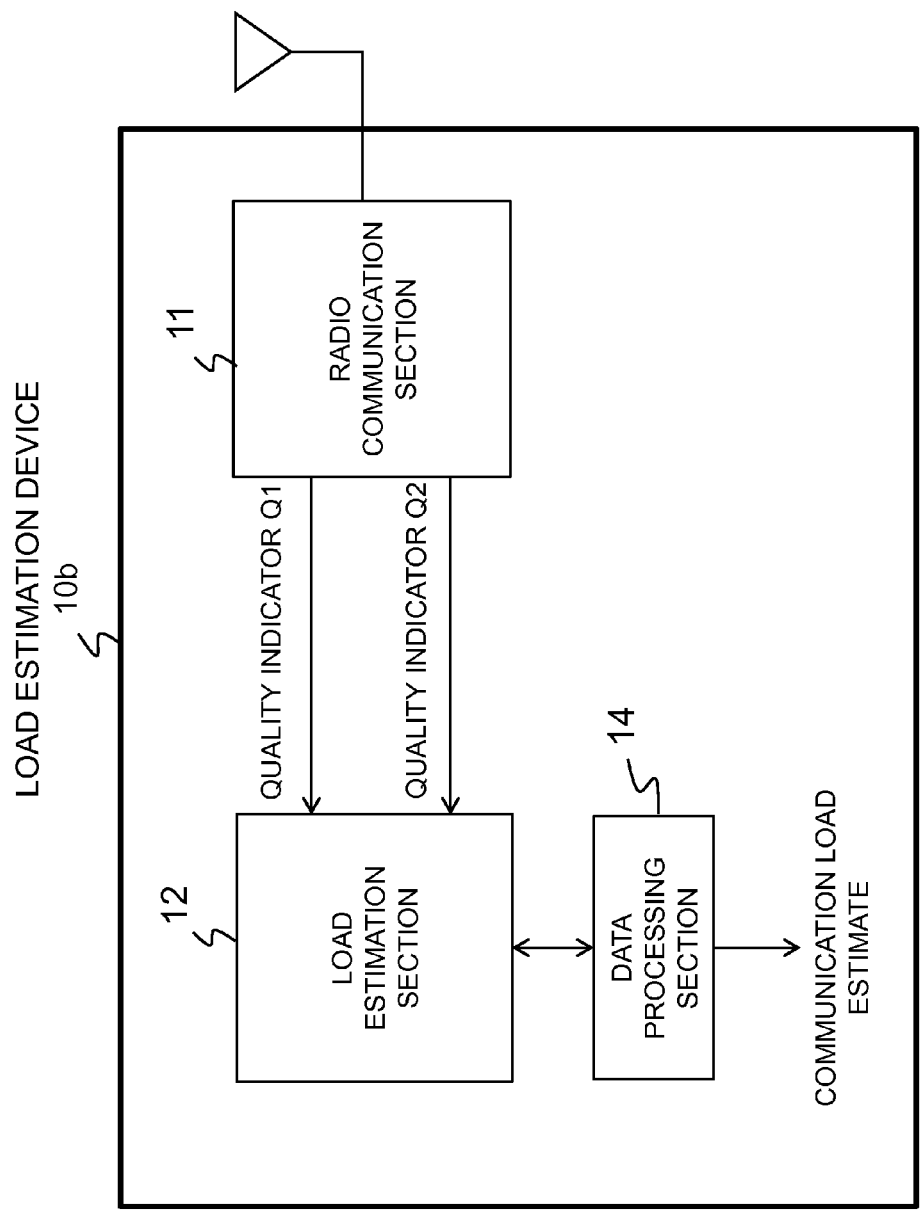
FIG. 11 is a block diagram showing a functional configuration of a load estimation device according to a third example of the present invention.

Referring to FIG. 11, a load estimation device 10b according to a third example of the present invention has a structure in which a data processing section 14 is added to the load estimation device 10 according to the first example shown in FIG. 6. The data processing section 14 performs statistical processing or selection processing on estimates, which will be described later, whereby variation in estimation results over time can be suppressed. Accordingly, those blocks that have the same functions as in the first example are given the same reference numerals, and a description thereof will be omitted.

3.2) Operations

Figure 12:
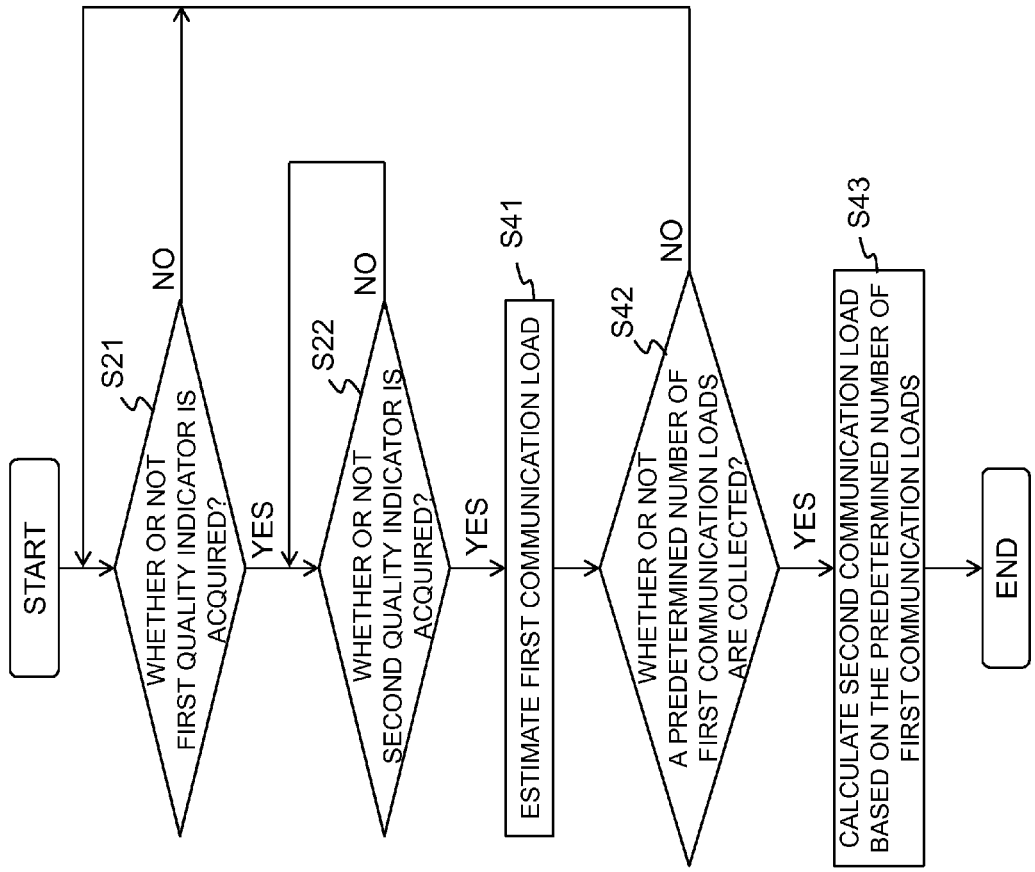
FIG. 12 is a flowchart showing operations of the load estimation device according to the third example of the present invention.

Referring to FIG. 12, a control section determines whether or not the first quality indicator Q1 is acquired (Operation S21) and, if the first quality indicator Q1 is acquired (Operation S21; YES), determines whether or not the second quality indicator Q2 is acquired (Operation S22). If the second quality indicator Q2 is acquired (Operation S22; YES), the control section controls the load estimation section 12 so that the load estimation section 12 estimates a first communication load based on the acquired quality indicator measurement values (Operation S41). A first communication load estimate is a load estimation result obtained according to the above-described first example. Subsequently, the control section determines whether or not a predetermined number of first communication load estimates are collected (Operation S42) and repeats the above-described Operations S21, S22 and S41 until the predetermined number of them are collected (Operation S42; NO). When the predetermined number of first communication load estimates are collected (Operation S42; YES), the control section controls the data processing section 14 so that the data processing section 14 performs statistical processing or selection processing, which will be described later, on the predetermined number of first communication load estimates, thereby estimating a communication load in the network NW (a second communication load) (Operation S43).

3.3) Statistical Processing

Figure 13:
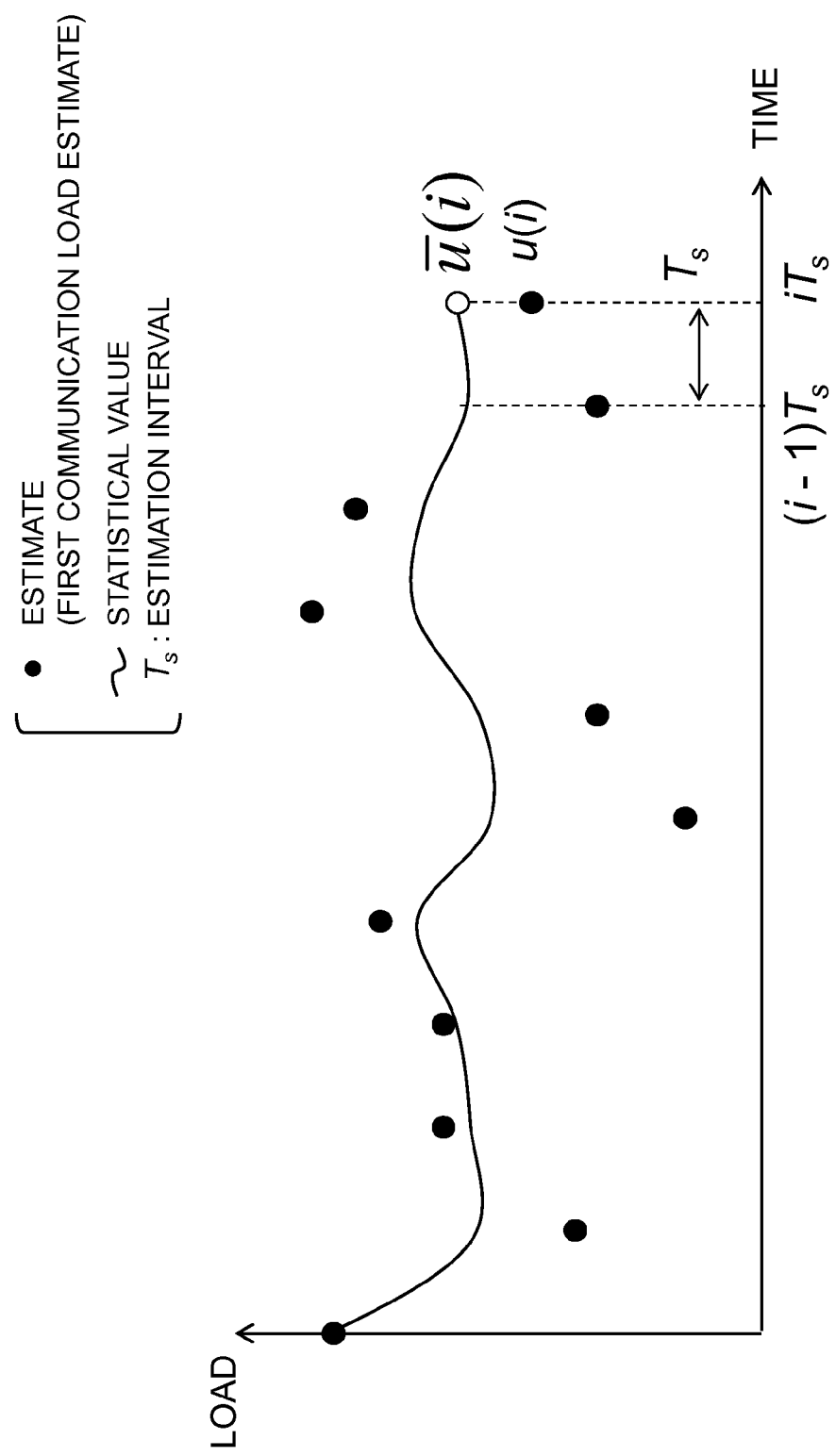
FIG. 13 is a graph showing changes in load over time for describing an example of statistical processing of a quality indicator in the third example.

In the above-described first example, first communication load estimates u(i) are obtained based on the measured first quality indicator Q1 and second quality indicator Q2 at measurement intervals Ts as schematically shown in FIG. 13. However, as described already, the first communication load estimates u(i) vary over time in actuality, and a u(i) at a certain sampling point i does not always reflect an actual load and may possibly greatly deviate from it. Accordingly, such first communication load estimates are collected for a certain period of time and subjected to statistical processing, whereby variation in the estimates over time can be suppressed as shown by statistical value u(overbar)(i) in FIG. 13.

For the statistical processing, averaging or weighting processing or the like can be used and, generally, can be expressed by the following equation (4).

[Math. 4]

$$\bar{u}(i) = \sum_{j=0}^{N_{samp}-1} w_j u(i-j) \bigg/ \sum_{j=0}^{N_{samp}-1} w_j \quad (4)$$

Here, u(overbar) is a communication load statistical value, $N_{samp}$ is the number of samples, $w_j$ is a weighting factor, and u is a first communication load estimate.

The number of samples $N_{samp}$ and the weighting factor $w_j$ can be determined depending on the varying states over time of the measurement values. For example, when attempting to suppress variation, the number of samples $N_{samp}$ is made larger, and when attempting to make latest estimates have greater effects, the weighting factor $w_j$ is made to have a greater value as j becomes smaller.

3.4) Selection Processing

Figure 14:
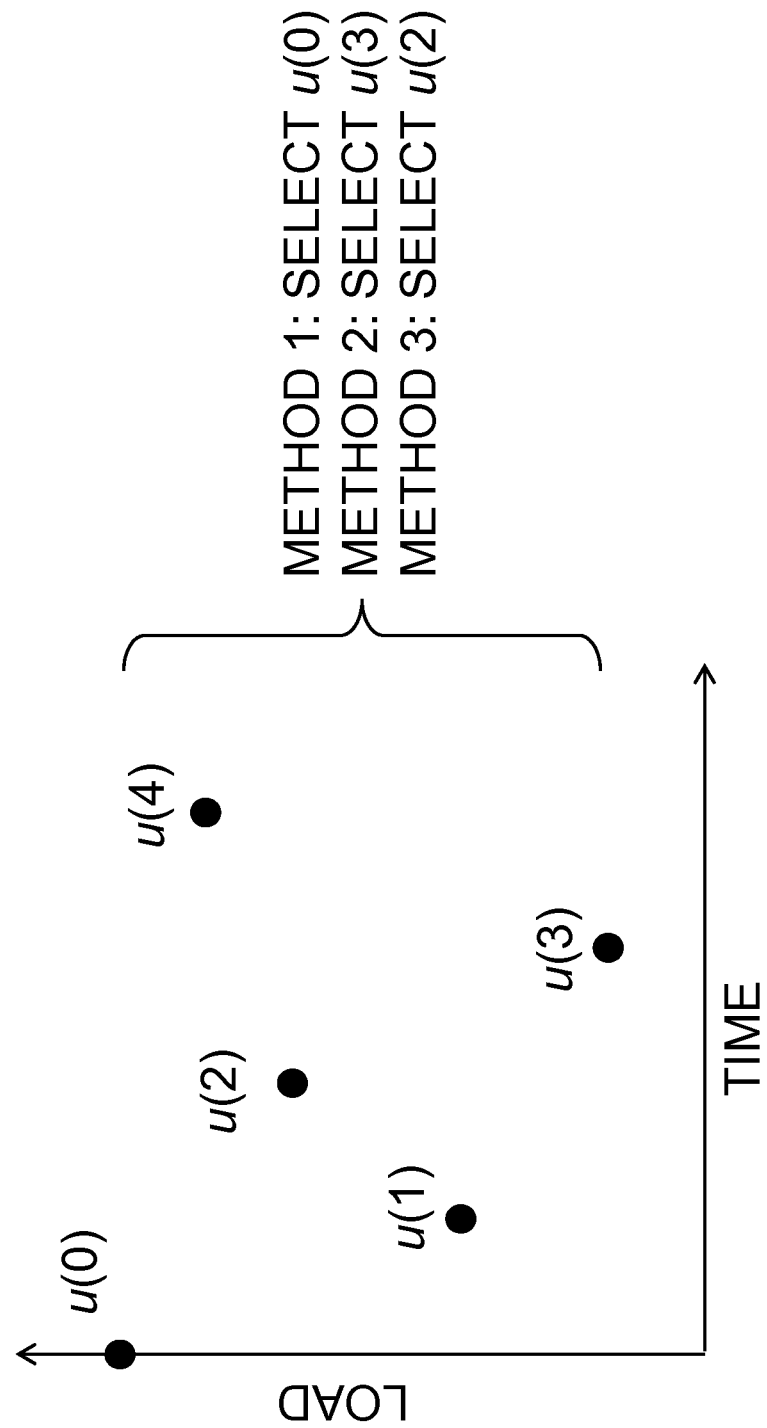
FIG. 14 is a graph showing changes in load over time for describing another example of statistical processing of a quality indicator in the third example.

The data processing section 14 selects one load estimate from a plurality of first communication load estimates u(i) estimated at different points of time as schematically shown in FIG. 14, whereby it is also possible to suppress variation in load estimation results over time. For example, from the plurality of first communication load estimates u(i), the largest value is selected in Method 1, the smallest value is selected in Method 2, and the median value is selected in Method 3.

3.5) Effects

As described above, according to the third example of the present invention, variation in load estimation results over time can be suppressed by carrying out statistical processing or selection processing on first load estimates obtained according to the above-described first example, and so it is possible to perform more reliable load estimation.

4. Fourth Example

Figure 15:
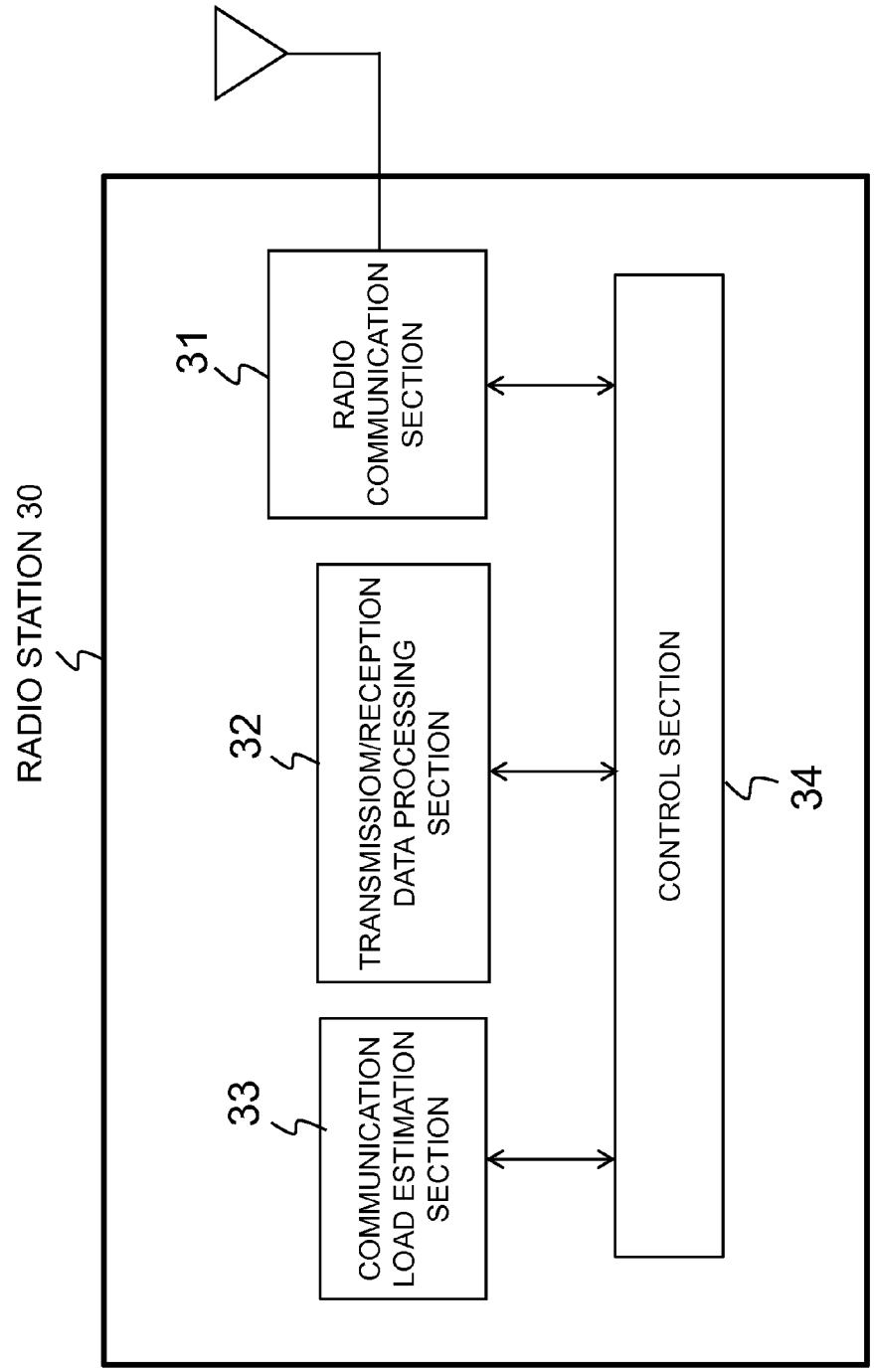
FIG. 15 is a block diagram showing a schematic configuration of a radio station according to a fourth example of the present invention.

Referring to FIG. 15, a radio station 30 provided with the functionality of the communication load estimation device according to the above-described first, second or third example will be described as a fourth example of the present invention. As described already, the radio station 30 is a radio terminal or a radio base station. The radio station 30 according to the present example includes a radio communication section 31, a transmission/reception data processing section 32, a communication load estimation section 33, and a control section 34. The functions according to each of the above-described examples can be implemented by the radio communication section 31, the communication load estimation section 33 and the control section 34.

For example, according to the first example, the radio communication section 31 measures the quality indicator Q1, which includes the entire received power from an estimation-target cell, and the quality Q2, which includes the signal-to-noise-and-interference ratio of a reference signal, and the communication load estimation section 33 estimates a communication load in the estimation-target cell by using the measurement values of the quality indicators Q1 and Q2 as described above. Further, it is also possible that the control section 34 causes the communication load estimation section 33 to perform statistical processing as in the above-described second or third example.

Note that the control section 34 may perform control such that the communication load estimation section 33 performs the load estimation operations only when the received power of a reference signal measured by the radio communication section 31 is not smaller than a predetermined magnitude.

Second Exemplary Embodiment

According to a second exemplary embodiment of the present invention, a radio base station uses radio quality information (quality indicators Q1 and Q2) of a radio cell of another radio base station to estimate a communication load in this other radio cell. Hereinafter, fifth to eighth examples of the present invention will be described with reference to drawings.

5. Fifth Example 5.1) System Architecture

Figure 16:
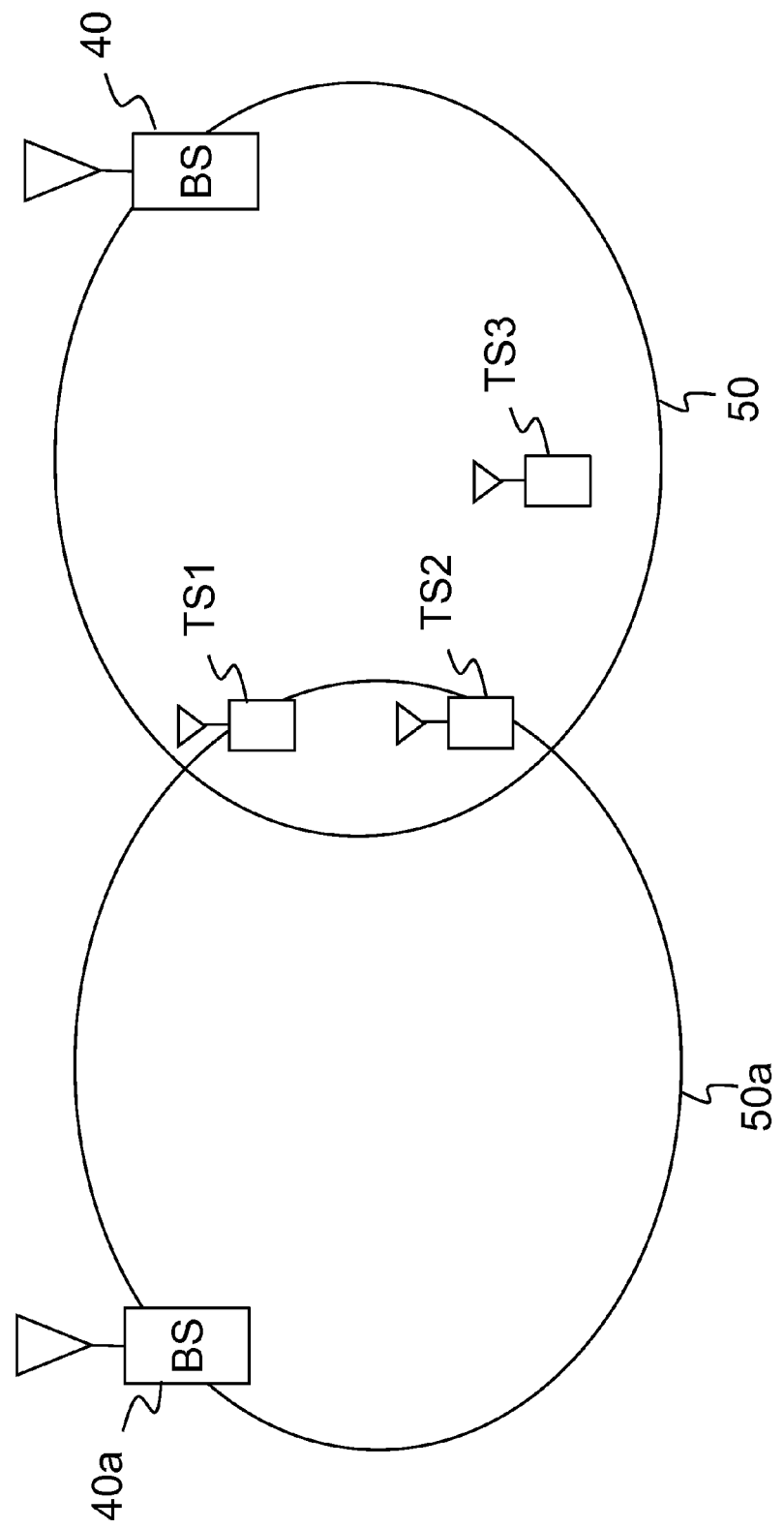
FIG. 16 is a network architecture diagram showing an example of a radio communication system according to a fifth example of the present invention.

Referring to FIG. 16, a radio communication system including radio base stations according to the present example includes radio base stations 40 and 40a, radio cells 50 and 50a managed by them, respectively, and terminal stations TS1 to TS3 that are belonging to the radio cell 50. The radio base stations 40 and 40a are close to each other, and it is assumed that signals of both the radio cells 50 and 50a can be measured in at least some area. Here, it is assumed that the radio base station 40 estimates a communication load in the radio cell 50a by using results of radio quality (quality indicators Q1 and Q2) measured by the terminal stations TS1, TS2 and TS3, which are mobile stations.

Figure 17:
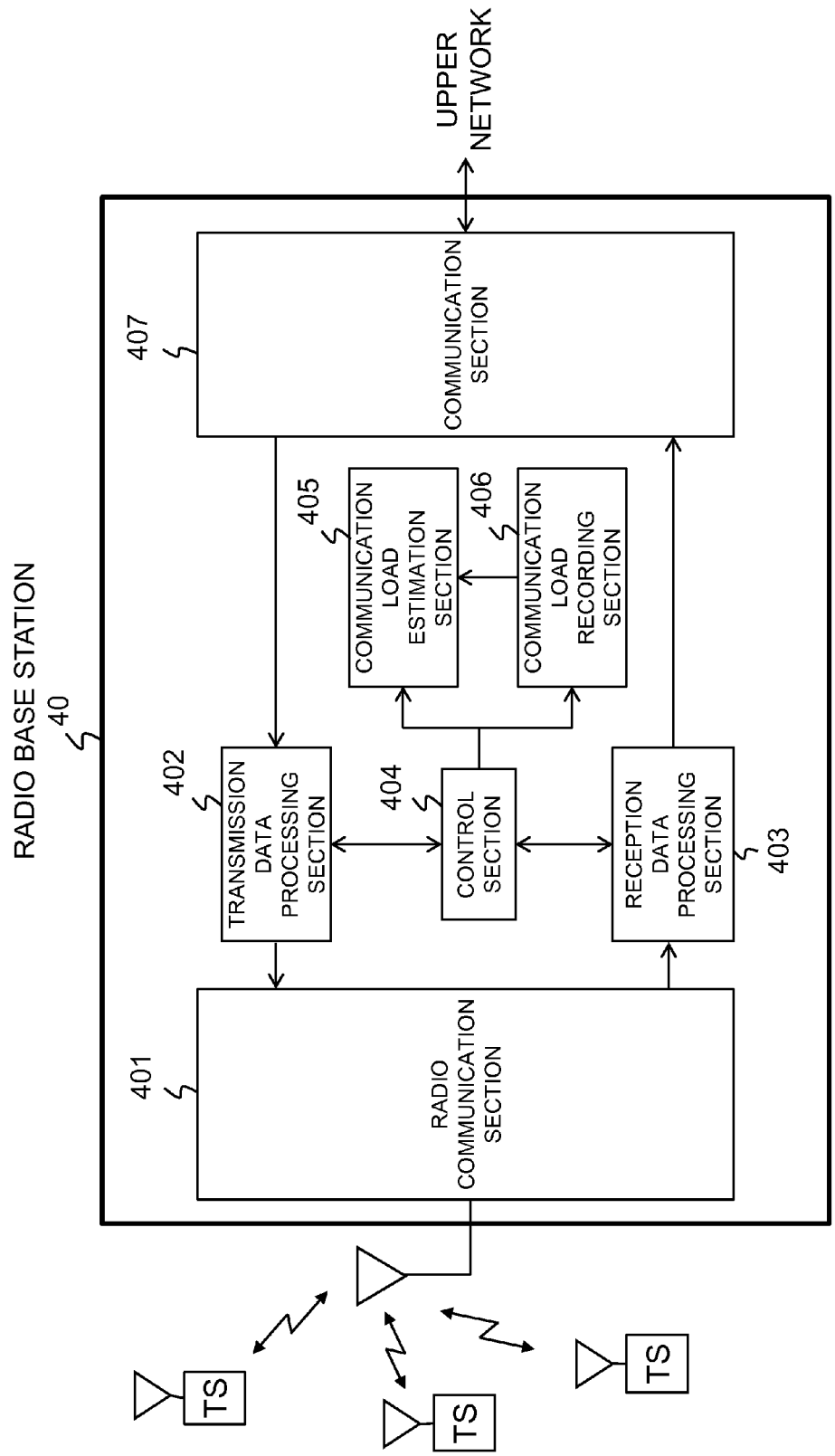
FIG. 17 is a block diagram showing a functional configuration of a radio base station according to the fifth example of the present invention.

Referring to FIG. 17, the radio base station 40 includes a radio communication section 401, a transmission data processing section 402, a reception data processing section 403, a control section 404, a communication load estimation section 405, a communication load recording section 406, and a communication section 407.

The radio communication section 401 receives an uplink signal transmitted from a terminal station TS via an antenna and reconstructs received data by performing various processing such as amplification, frequency conversion and demodulation. Moreover, the radio communication section 401 performs various processing, such as modulation, frequency conversion and amplification, on a signal sequence in a radio frame from the transmission data processing section 402 to generate a downlink signal and transmits it to a terminal station TS via the antenna.

The reception data processing section 403 outputs to the communication section 407 data to be transmitted to an upper-level network among the received data reconstructed by the radio communication section 401. Moreover, the reception data processing section 403 outputs to the control section 404 data concerning the radio quality measured by a terminal station TS (hereinafter, simply referred to as measurement data) and the like to be processed within the radio base station 40 among the reconstructed received data.

The control section 404 outputs the measurement data input from the reception data processing section 403 to the communication load estimation section 405. Moreover, the control section 404 measures a communication load in its own radio cell (the radio cell 50; hereinafter referred to as the own radio cell) under a predetermined condition and records a result thereof in the communication load recording section 406. Furthermore, the control section 404 performs control related to measurement and reporting of the radio quality by a terminal station TS and configures a control signal for it. A specific manner of control by the control section 404 will be described in detail in the description of operations, which will be given later.

The communication section 407 sends data from the reception data processing section 403 to the upper-level network via a communication line. Moreover, the communication section 407 receives data from the upper-level network and outputs it to the transmission data processing section 402.

The transmission data processing section 402 stores data for a terminal station input from the communication section 407 in a buffer, which is configured for each terminal station and for each bearer, respectively, and performs processing such as error correction coding, rate matching and interleaving to create a transport channel. Moreover, the transmission data processing section 402 adds control information including the control signal related to measurement of the radio quality by a terminal station configured by the control section 404 to a data sequence of the transport channel, thus generating a radio frame.

The communication load estimation section 405 estimates a communication load in the estimation-target cell 50a as described already by using the measurement data (quality indicators Q1 and Q2) input from the control section 404. Hereinafter, a description will be given of communication load estimation control operations of the radio base station 40.

5.2) Operations

Figure 18:
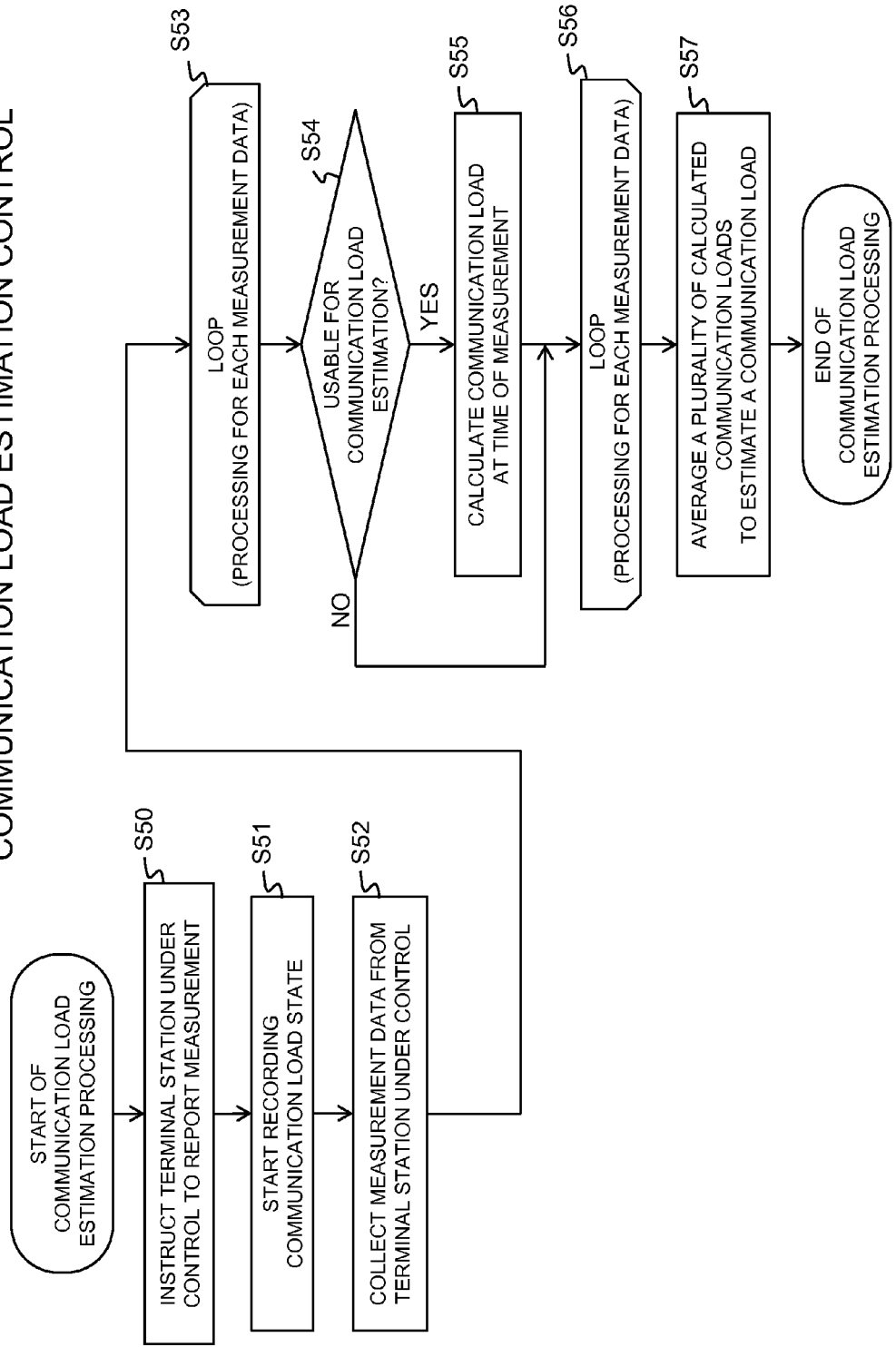
FIG. 18 is a flowchart showing an example of communication load estimation control by the radio base station shown in FIG. 17.

Referring to FIG. 18, first, the control section 404 instructs terminal stations under the control thereof to measure radio quality and to report measurement results (Operation S50). Quality indicators to be measured are the quality indicator Q1 including entire received power and the quality indicator Q2 including the signal-to-noise-and-interference ratio of a reference signal, as described above.

The instruction to do measurement and report measurement results may be performed toward all terminal stations that are belonging to the own radio cell, or may be performed toward some terminal stations selected. A method for selecting terminal stations may be at random, or may be on a condition based on the measurement results. For the condition based on the measurement results, it is possible to use, for example, a method of selecting terminal stations presenting that the received signal strength of a reference signal of the estimation-target cell has a predetermined value or larger, a method of selecting terminal stations presenting that the difference between the received signal strength of a reference signal of the estimation-target cell and the received signal strength of a reference signal of the own radio cell is a predetermined value or larger, or the like.

Note that a report of the measurement results is assumed to include time of measurement, in addition to the above-mentioned quality indicators of the estimation-target cell.

Next, the control section 404 measures a communication load in the own radio cell under a predetermined condition and records a result thereof in the communication load recording section 406 (Operation S51). Specifically, if the radio base station 40 is of LTE, a physical resource block usage is measured as a communication load and is recorded in the communication load recording section 406. Moreover, the predetermined condition here is that measurement is performed at predetermined intervals, or the like. Subsequently, the control section 404 collects measurement data reported from the terminal stations TS under the control thereof (Operation S52).

Moreover, the communication load estimation section 405, for each measurement data collected, calculates a communication load in the estimation-target cell at the time of measurement (Operations S53 to S57). Note that this processing for communication load calculation may be performed each time measurement data is reported from a terminal station, or may be performed after a certain amount of measurement data are collected.

First, the communication load estimation section 405 determines whether or not measurement data can be used for communication load estimation (Operation S54). Specifically, as described already, it is sufficient to determine that measurement data presenting that the received signal strength of a reference signal of the estimation-target cell has a predetermined value or larger, and measurement data presenting that the difference between received signal strength of interest and the received signal strength of a reference signal of the own radio cell is a predetermined value or larger, can be used for communication load estimation.

If it is determined that measurement data cannot be used for communication load estimation (Operation S54; No), processing on this measurement data is completed. If measurement data can be used (Operation S54; Yes), this measurement data (quality indicators Q1 and Q2) is used to calculate a communication load in the estimation-target cell (Operation S55). A method of estimating a communication load has been described in the first example, and therefore a description thereof will be omitted.

Subsequently, the communication load estimation section 405, when completing the processing for communication load calculation on all subject measurement data, averages the plurality of communication loads calculated for the measurement data, respectively, and thereby estimates a communication load in the estimation-target cell (Operation S57). For a method for averaging, although the above-described second or third example can be applied, a mean value or a median value may also be used. Moreover, it is also possible to perform averaging after weighting, depending on results of measurement with respect to the estimation-target cell included in the measurement data. For example, the weight is made larger if the received signal strength of the estimation-target cell included in the measurement data is high in comparison with the received signal strength of the own radio cell or another radio cell.

5.3) Effects

As described above, according to the fifth example of the present invention, even in a case where a radio resource state is not notified via the X2 interface from a neighboring base station, it is possible to estimate a communication load in a radio cell managed by this neighboring base station by using results of radio quality measurement by terminal stations under control.

6. Sixth Example

A sixth example of the present invention is different from the fifth example in that results of quality indicator measurement with respect to the estimation-target cell are collected from another radio base station. Estimation of a communication load in the estimation-target cell according to the present example can be performed by using measurement results collected by another station and/or measurement results collected by the own station. Hereinafter, to simplify and clarify the description, the differences between the present example and the above-described fifth example will be described briefly.

6.1) System Architecture

Figure 19:
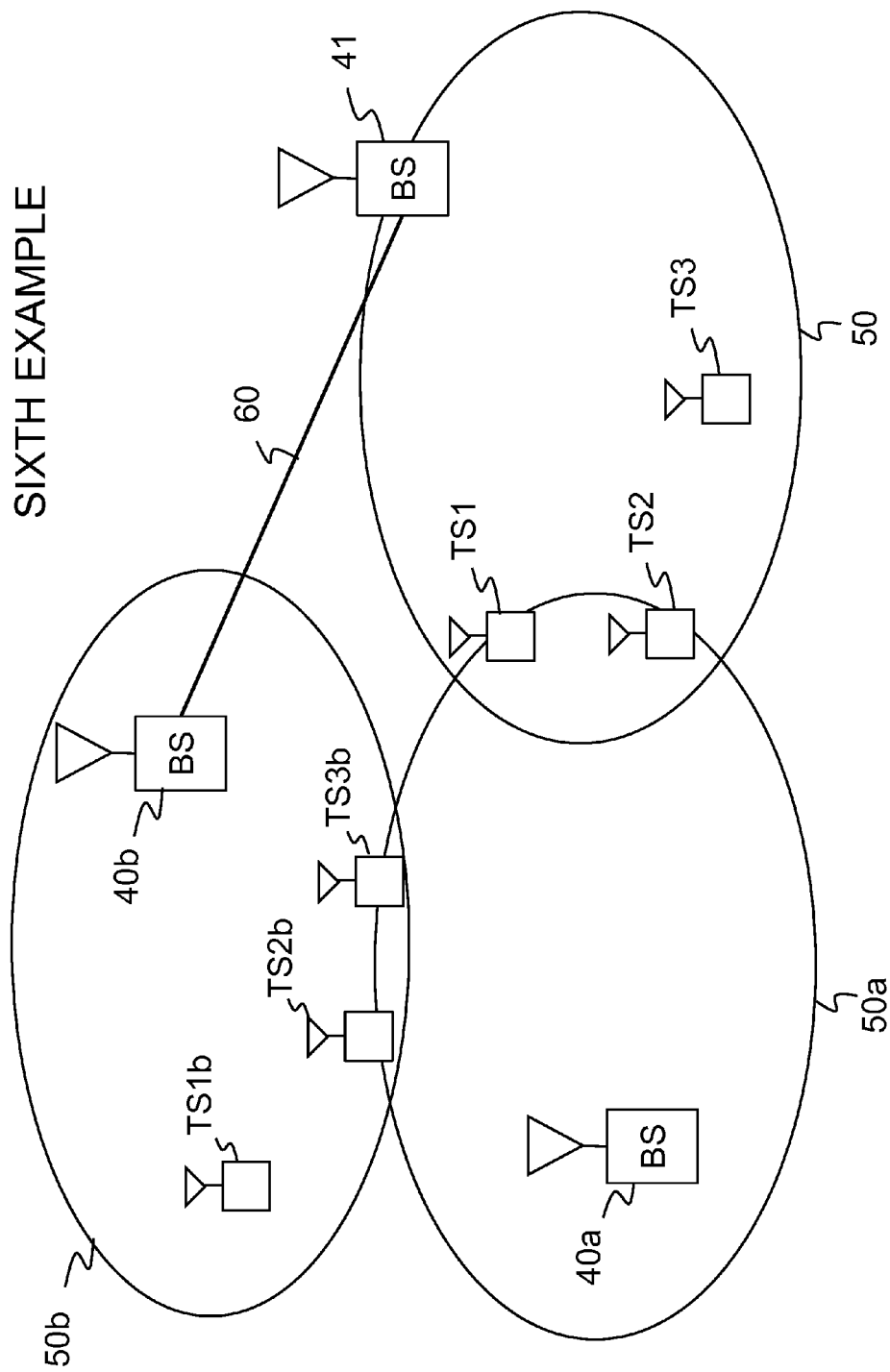
FIG. 19 is a network architecture diagram showing an example of a radio communication system according to a sixth example of the present invention.

Referring to FIG. 19, a radio communication system according to the sixth example of the present invention, compared to the fifth example shown in FIG. 16, includes a radio base station 41 in place of the radio base station 40 and further newly includes a radio base station 40b, a radio cell 50b managed by it, and terminal stations TS1b to TS3b that are belonging to the radio cell 50b. The radio base stations 40b and 40a are close to each other, and it is assumed that signals of the radio cells 50b and 50a can be measured in at least some area. Moreover, the radio base stations 41 and 40b are connected via a communication line 60 and can exchange various kinds of information. Note that the communication line may be radio or may be wired.

In the present example, the radio base station 41 estimates a communication load in the radio cell 50a by using not only results of radio quality (quality indicators Q1 and Q2) measurement by the terminal stations TS1, TS2 and TS3 but also results of radio quality (quality indicator Q1 and Q2) measured by the terminal stations TS1b, TS2b and TS3b, which are collected by the radio base station 40b. Alternatively, if the radio base station 40b has communication load estimation functionality similar to that of the radio base station 41, a communication load in the radio cell 50a can be estimated by also using a result of communication load estimation with respect to the radio cell 50a calculated by the radio base station 40b. Since the radio base station 40b cooperates for the radio base station 41 to estimate a communication load, this base station and a cell managed by this base station will be referred to as the cooperating base station and the cooperating cell, respectively, hereinafter.

Figure 20:
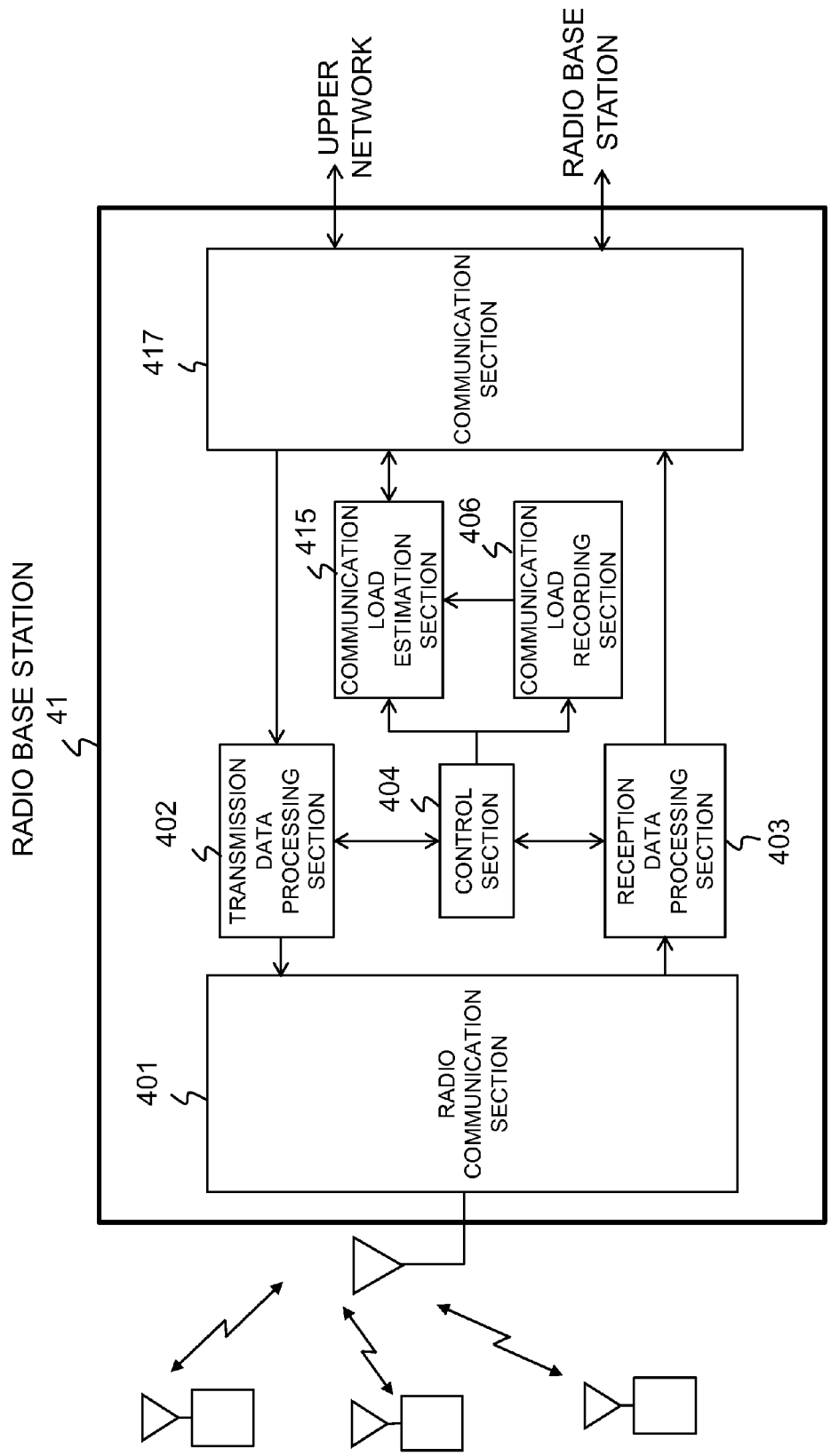
FIG. 20 is a block diagram showing a functional configuration of a radio base station according to the sixth example of the present invention.

Referring to FIG. 20, in the radio base station 41 according to the present example, compared to the radio base station 40 according to fifth example, the functions of a communication load estimation section 415 and a communication section 417 are different.

The communication section 417, unlike the communication section 407 according to the fifth example, can exchange information not only with the upper-level network but also with the cooperating base station via the communication line 60. For example, the radio base station 41 can acquire measurement data and the like measured by terminal stations under the control of the cooperating base station. Moreover, if the cooperating base station has communication load estimation functionality similar to that of the radio base station 41, it is also possible to acquire a communication load result estimated by the cooperating base station with respect to the estimation-target cell.

The communication load estimation section 415, unlike the communication load estimation section 405 according to the fifth example, uses measurement data on the estimation-target cell (here, the radio cell 50a) collected by the own station and measurement data on the estimation-target cell measured by the terminal stations under the control of the cooperating base station to estimate a communication load in the estimation-target cell. Moreover, if the cooperating base station has communication load estimation functionality similar to that of the radio base station 41, it is also possible to update an estimation result obtained by the own station by using a result of communication load estimation obtained by the cooperating base station.

6.2) Communication Load Estimation Control (First Example)

Figure 21:
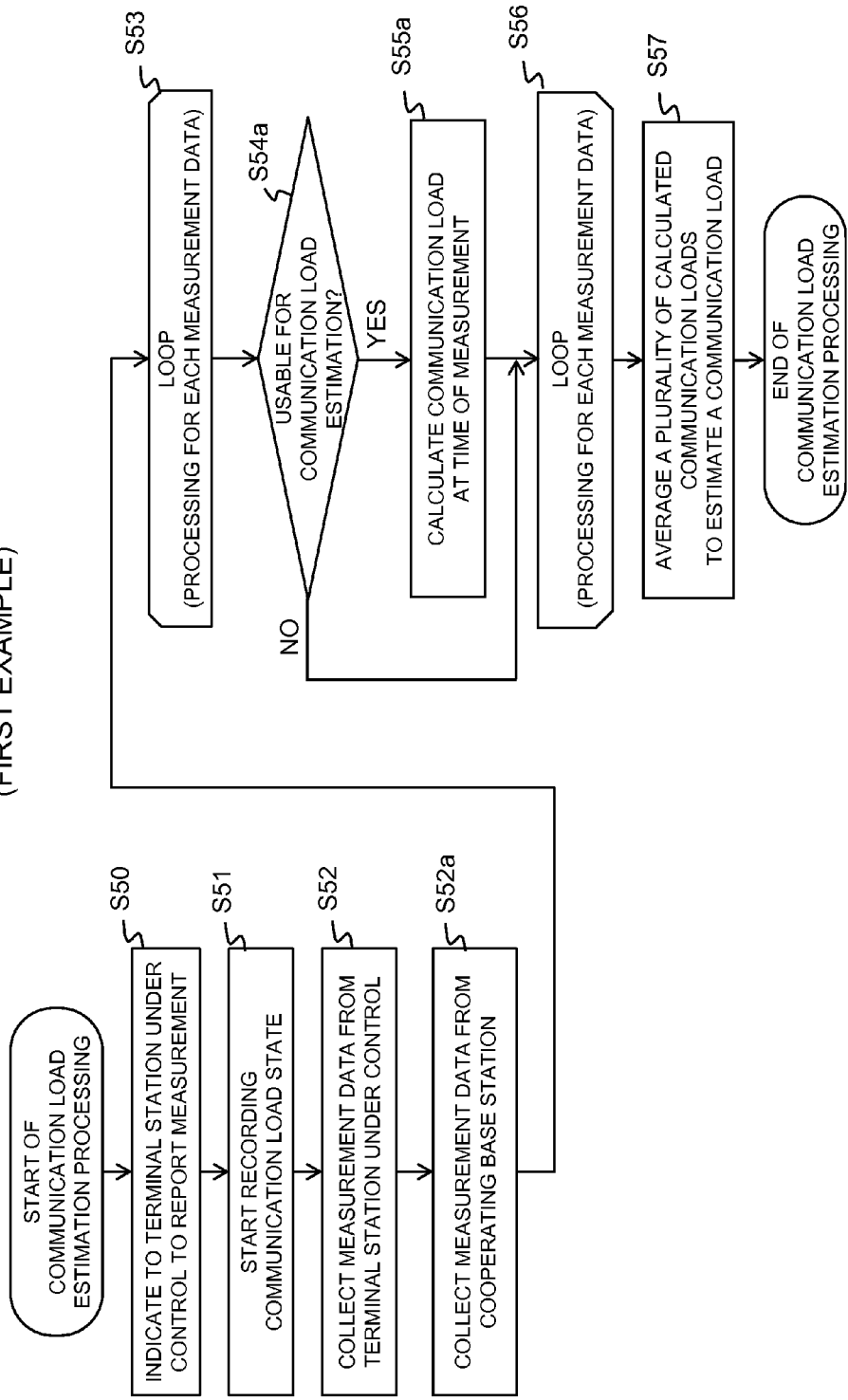
FIG. 21 is a flowchart showing a first example of communication load estimation control by the radio base station shown in FIG. 20.

As shown in FIG. 21, of Operations S50 to S57, operations similar to those of the fifth example shown in FIG. 18 are given the same reference signs, and a description thereof will be omitted.

In communication load estimation control according to the present example, after measurement data are collected from terminal stations under the control thereof (Operation S52), measurement data measured by terminal stations under the control of the cooperating base station are collected (Operation S52a). However, this processing for collection (S52a) does not necessarily need to be performed after Operation S52 but may be such an operation that collection is performed at any appropriate time and a result thereof is stored in a memory or the like.

The communication load estimation section 415 next calculates, for each measurement data collected, a communication load in the estimation-target cell at the time of measurement (Operations S53 to S56). Here, a description will be given of a case where measurement data subject to the calculation is that acquired by the cooperating base station.

For Operation S54a in which it is determined whether or not the measurement data can be used for communication load estimation, it is sufficient to perform the processing of Operation S54 according to the fifth example, wherein the own radio cell is read as the cooperating cell. For processing for calculating a communication load in the estimation-target cell for the measurement data of interest (Operation S55a) as well, it is sufficient to perform the processing of Operation S55 according to the fifth example, wherein the own radio cell is read as the cooperating cell. The subsequent Operation S57 is as described in the fifth example.

6.3) Communication Load Estimation Control (Second Example)

Figure 22:
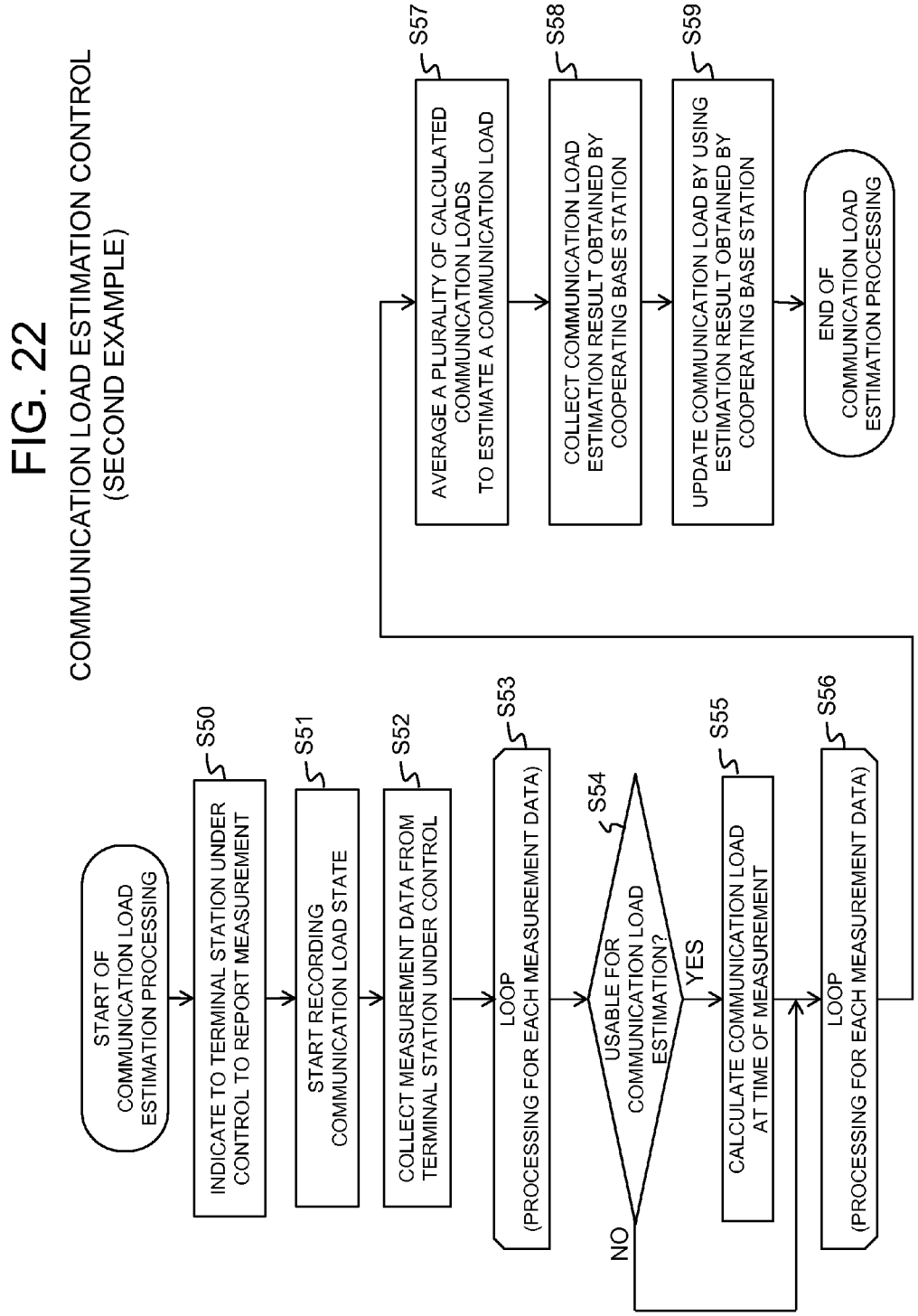
FIG. 22 is a flowchart showing a second example of communication load estimation control by the radio base station shown in FIG. 20.

FIG. 22 shows communication load estimation control in a case where the cooperating base station has communication load estimation functionality similar to that of the radio base station 41. Operations S50 to S57 shown in FIG. 22 are similar to those of the fifth example shown in FIG. 18, and therefore a description thereof will be omitted.

Referring to FIG. 22, the communication load estimation section 415, subsequent to Operation S57, collects a result of communication load estimation with respect to the estimation-target cell obtained by the cooperating base station (Operation S58). In this event, information concerning a method used in this estimation may also be collected. The information concerning an estimation method includes, for example, an equation used to estimate a communication load, the number of samples used for averaging, and the like. Note that the processing for collection here does not necessarily need to be performed after Operation S57, but it is also possible that collection is performed at any appropriate time and a result thereof is stored in a memory or the like.

Subsequently, the communication load estimation section 415 uses the communication load in the estimation-target cell estimated by the cooperating base station to update the communication load in the estimation-target cell estimated by itself (Operation S59). For this update of the communication load, for example, the two estimation results may simply be averaged, or averaging may be performed after weighting, depending on the number of samples used in the estimation.

Further, the communication load updated by the radio base station 41 may be notified to the cooperating base station (not shown). Note that the cooperating base station does not need to be one, but a plurality of them may exist.

6.4) Effects

As described above, according to the sixth example of the present invention, a communication load can be estimated by also utilizing a cooperating base station, and so it is possible to perform estimation with higher accuracy, or with less measurement data.

7. Seventh Example

A seventh example of the present invention is different from the fifth example in that results of quality indicator measurement with respect to the estimation-target cell are stored in a database connected to each radio base station. Estimation of a communication load in the estimation-target cell according to the present example can be performed by using measurement data stored in the database. Hereinafter, to simplify and clarify the description, the differences between the present example and the above-described fifth example will be described briefly.

7.1) System Architecture

Figure 23:
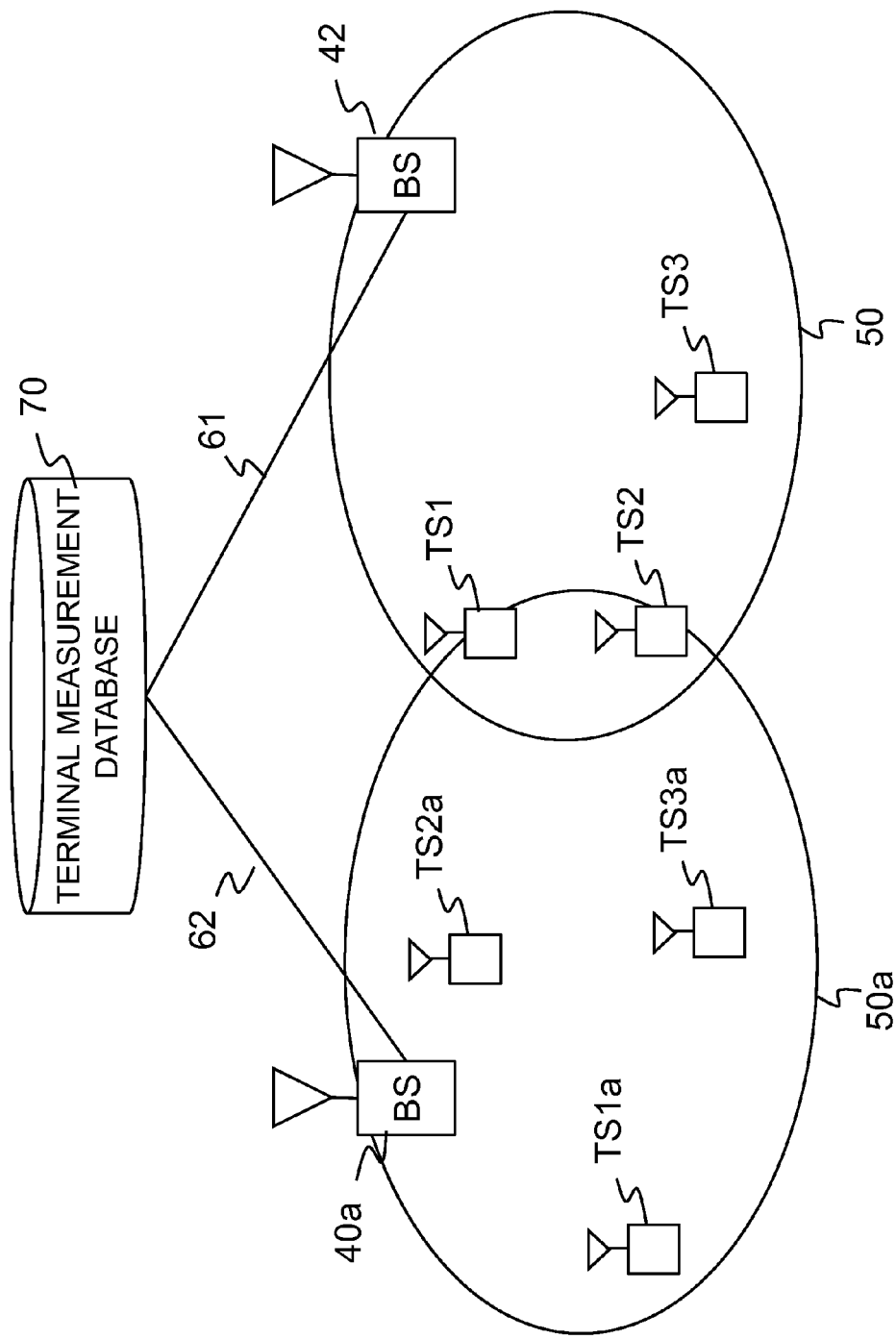
FIG. 23 is a network architecture diagram showing an example of a radio communication system according to a seventh example of the present invention.

Referring to FIG. 23, a radio communication system according to the seventh example, compared to the fifth example shown in FIG. 16, includes a radio base station 42 in place of the radio base station 40 and further newly includes a terminal measurement database (DB) 70. Moreover, it is assumed that terminal stations TS1a to TS3a are belonging to the radio cell 50a managed by the radio base station 40a. The radio base stations 42 and 40a are connected to the terminal measurement DB 70 via communication lines 61 and 62, respectively, and can register measurement data in the terminal measurement DB 70 and acquire measurement data from the terminal measurement DB 70.

According to the present example, the radio base station 42 estimates a communication load in the estimation-target cell 50a by using results of radio quality (quality indicators Q1 and Q2) measured by the terminal stations TS1a, TS2a and TS3a, which are acquired from the terminal measurement DB 70.

Figure 24:
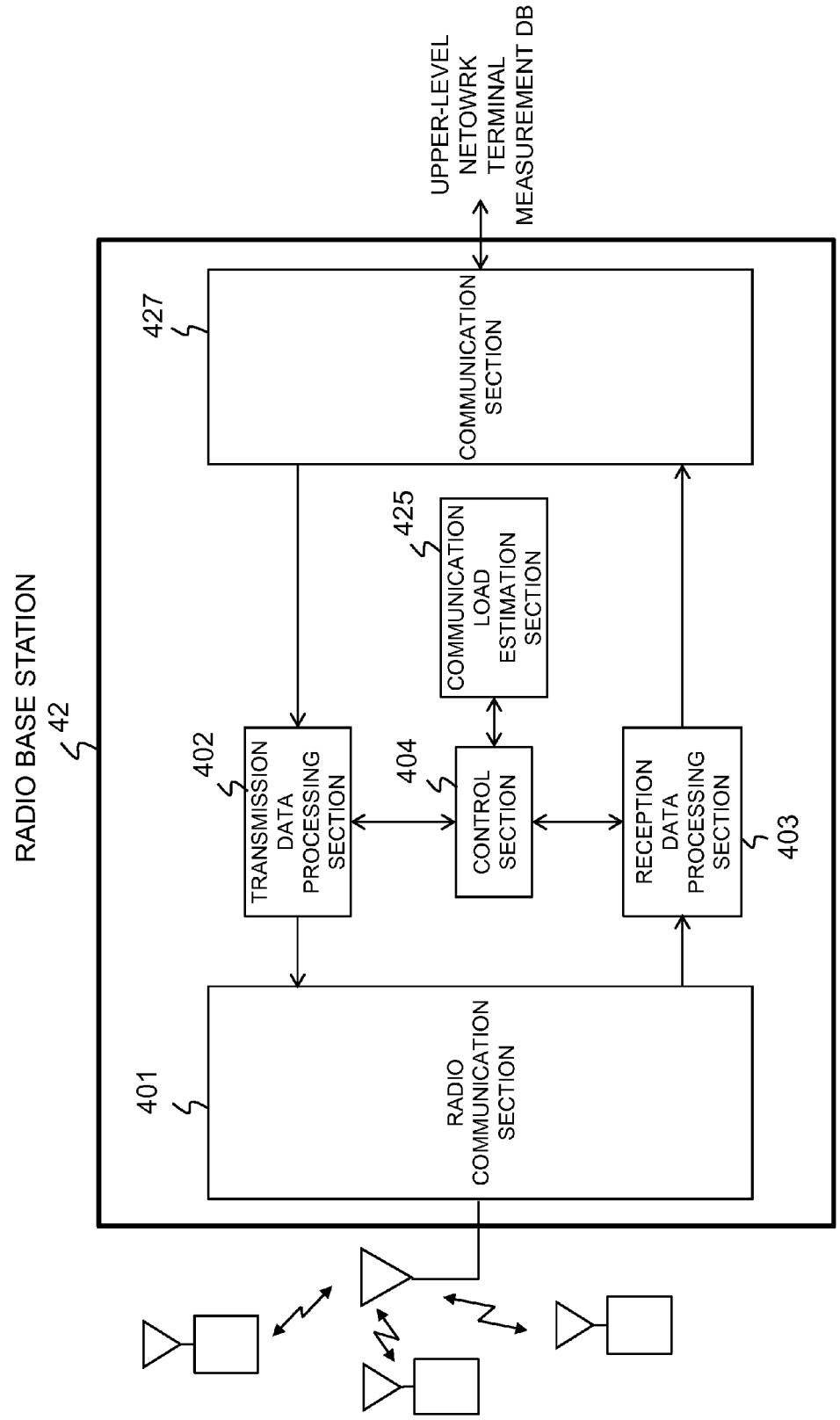
FIG. 24 is a block diagram showing a functional configuration of a radio base station according to the seventh example of the present invention.

Referring to FIG. 24, in the radio base station 42, compared to the radio base station 40 according to the fifth example, the functions of a communication load estimation section 425 and a communication section 427 are different. Moreover, the communication load recording section 406 is not necessarily required.

The communication section 427 is different from the communication section 407 of the fifth example in that the communication section 427 sends measurement data to the terminal measurement DB 70 and receives measurement data recorded therein via the communication line. Here, measurement data on the estimation-target cell are acquired, and the communication load estimation section 425 performs communication load estimation. Note that the terminal measurement DB 70 stores measurement data received from the radio base stations in a predetermined format (not shown), and a radio base station allowed to access this DB can acquire the measurement data registered.

The communication load estimation section 425 estimates a communication load in the estimation-target cell by using measurement data measured by terminal stations with respect to the estimation-target cell, in accordance with any communication load estimation method described already.

7.2) Communication Load Estimation Control

Figure 25:
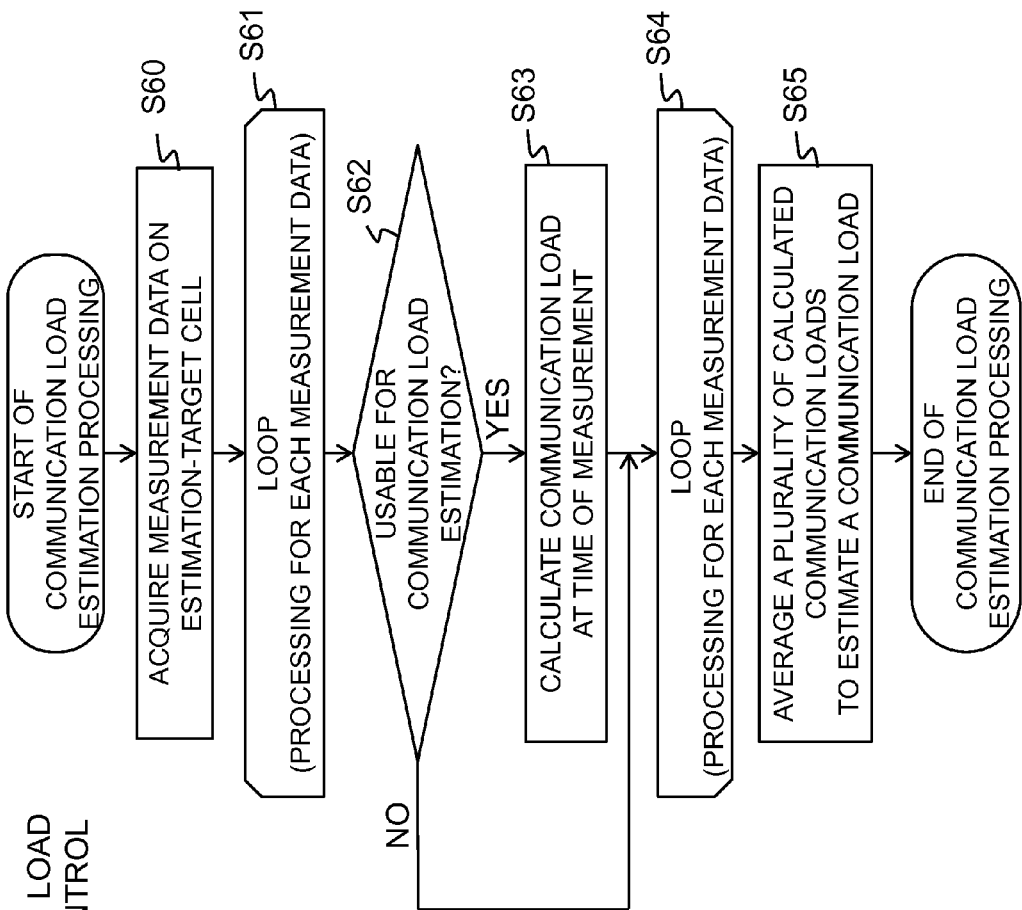
FIG. 25 is a flowchart showing an example of communication load estimation control by the radio base station shown in FIG. 24.

Referring to FIG. 25, the control section 404 first acquires measurement data on the estimation-target cell from the terminal measurement DB 70 (Operation S60). Subsequently, the communication load estimation section 425 calculates, for each measurement data acquired, a communication load in the estimation-target cell at the time of measurement (Operations S61 to S64).

Processing for determining whether or not the measurement data can be used for communication load estimation (Operation S62), and processing for calculating a communication load in the estimation-target cell for the measurement data of interest (Operation S63) are similar to Operations S54 and S55 according to the fifth example.

Note that as a method for acquiring measurement data on the estimation-target cell, described in the present example is such a system that measurement data are acquired from the terminal measurement DB 70, but the method can also be implemented in another system. For example, if any one of the terminal stations TS1 to TS3 has the Logged MDT (Minimization of Drive Test) function prescribed in 3GPP, it is possible that it performs radio quality measurement in an idle state and notifies measurement data upon falling in a connected state.

Moreover, a communication load in the estimation-target cell is estimated by using measurement data on the estimation-target cell in the present example, but the present example is not limited to this system. For example, it is also possible to concurrently use measurement data obtained in the own radio cell and a cooperating cell as described in the sixth example. In such a case, it is also possible to place greater importance on the measurement data on the estimation-target cell than the measurement data obtained in the own radio cell and the cooperating cell when communication loads calculated from the respective measurement data are averaged. However, in that case, the radio base station 42 requires the communication load recording section 406.

7.3) Effects

As described above, according to the seventh example of the present invention, a communication load is estimated by using measurement data obtained in the estimation-target radio cell, and accordingly it is possible to perform estimation with higher accuracy, or with less measurement data.

8. Eighth Example

An eighth example of the present invention is different from the fifth to seventh examples in that estimation of a load in the estimation-target cell is performed by a network upper-level apparatus. Hereinafter, to simplify and clarify the description, the differences between the present example and the above-described fifth to seventh examples will be described briefly.

8.1) System Architecture

Figure 26:
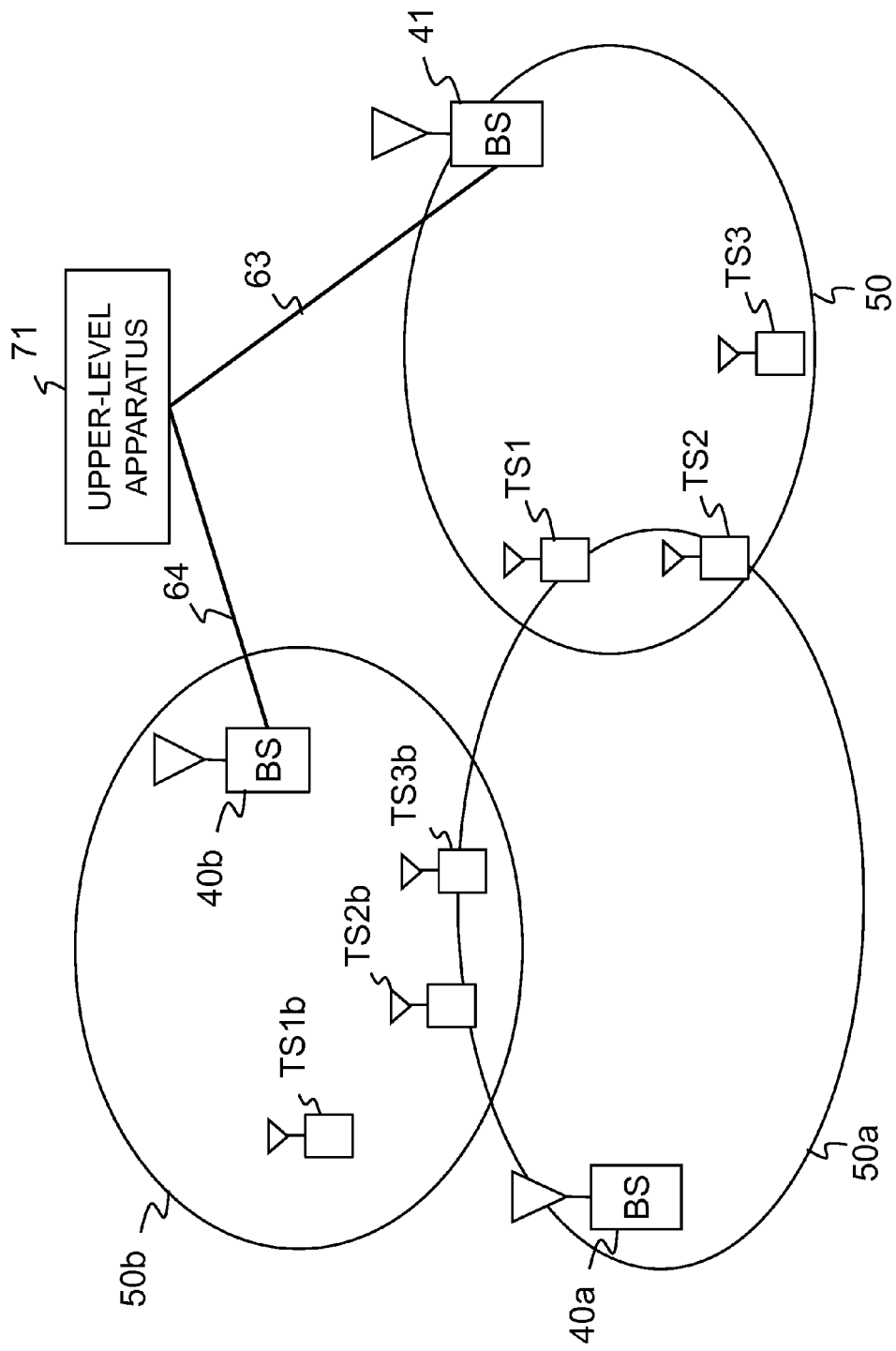
FIG. 26 is a network architecture diagram showing an example of a radio communication system according to an eighth example of the present invention.

Referring to FIG. 26, a radio communication system according to the eighth example, compared to the fifth example shown in FIG. 16, includes a radio base station 41 in place of the radio base station 40 and further newly includes a radio base station 40b, a radio cell 50b managed by the radio base station 40b, terminal stations TS1b and TS3b that are belonging to the radio cell 50b, and a network upper-level apparatus 71. The network upper-level apparatus 71 is connected to the radio base stations 41 and 40b via communication lines 63 and 64, respectively, and can exchange various kinds of data with them. The communication lines 63 and 64 may be wireless or may be wired. Note that the communication line 60 between base stations in the sixth example is not necessarily required in the present example.

According to the present example, communication load estimation is not performed by the radio base station 41 but is performed by the network upper-level apparatus 71. Specifically, the network upper-level apparatus 71 estimates a communication load in the radio cell 50a by using results of radio quality measurement by the terminal stations TS1, TS2 and TS3 and results of radio quality measurement by the terminal stations TS1b, TS2b and TS3b obtained by the radio base station 40b.

Figure 27:
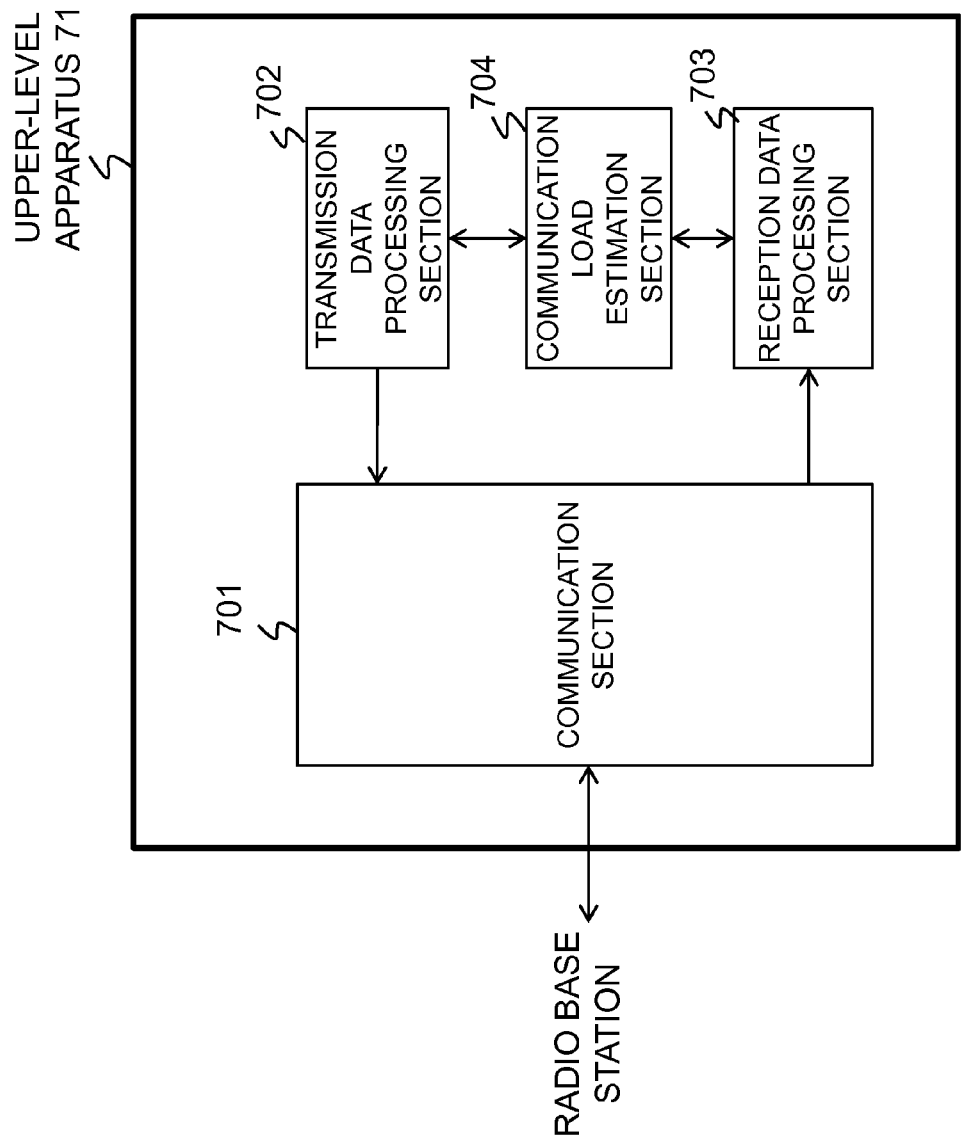
FIG. 27 is a block diagram showing a functional configuration of a network upper-level apparatus according to the eighth example of the present invention.

Referring to FIG. 27, the network upper-level apparatus 71 according to the present example includes a communication section 701, a transmission data processing section 702, a reception data processing section 703, and a communication load estimation section 704. However, FIG. 27 only depicts the communication load estimation functionality-related configuration relevant to the present example, and those functions that are provided to a general network upper-level apparatus are omitted. The network upper-level apparatus 71 shown here, specifically, corresponds to a parameter control device, an operations management device or the like for base stations.

The communication section 701 acquires information from the radio base stations via the communication lines. Specifically, it acquires measurement data (quality indicators Q1 and Q2) measured by the radio base stations and terminal stations under the control thereof, communication load information on the radio cells managed by these radio base stations, and the like. Here, information is acquired from the radio base stations 41 and 40b. The reception data processing section 703 outputs such received data to the communication load estimation section 704. The communication load estimation section 704 uses the measurement data and communication load information input from the reception data processing section 703 to estimate a communication load in the estimation-target cell (here, the radio cell 50a) through the method described already.

The transmission data processing section 702 sends information such as the communication load estimated by the communication load estimation section 704 from the communication section 701 to the radio base stations via the communication lines.

8.2) Communication Load Estimation Control

Figure 28:
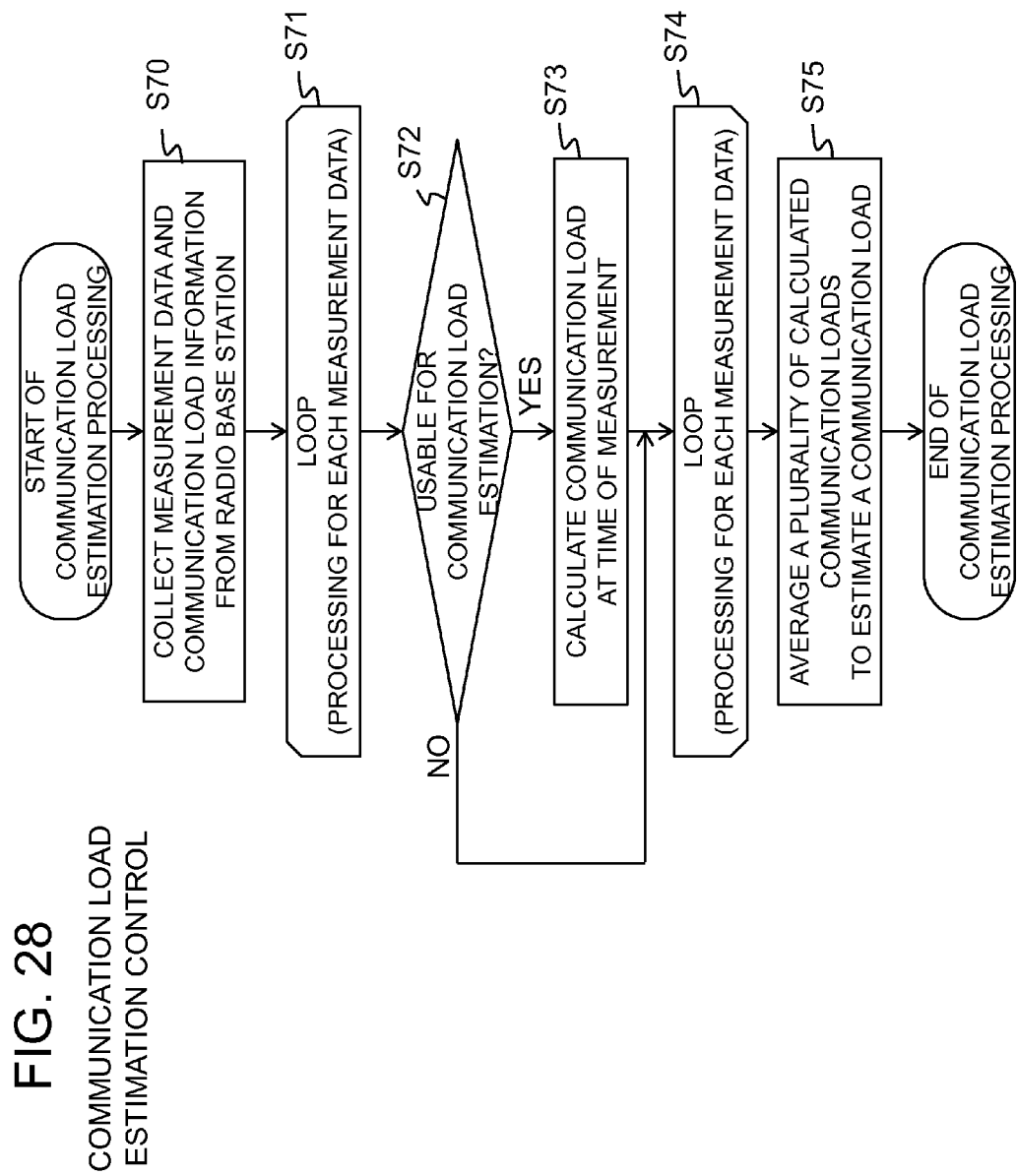
FIG. 28 is a flowchart showing an example of communication load estimation control by the network upper-level apparatus shown in FIG. 27.

Referring to FIG. 28, the communication load estimation section 704 of the network upper-level apparatus 71 first collects from the radio base stations measurement data measured by terminal stations under the control of these radio base stations and communication load information on the radio cells managed by these radio base stations (Operation S70).

Next, the communication load estimation section 704 calculates, for each measurement data collected, a communication load in the estimation-target cell at the time of measurement (Operations S71 to S74). Operations S71 to S74 have been described at Operations S61 to S64 in the seventh example. Further, the plurality of communication loads calculated for the measurement data, respectively, are averaged, thereby estimating a communication load in the estimation-target cell (Operation 75). The processing of Operation S75 is also as described at Operation 65 in the seventh example.

Note that it is also possible to apply the present example to the sixth example, making a configuration such that the processing for communication load estimation performed by the radio base station 41 in the sixth example is performed by the network upper-level apparatus 71. In addition to this, as a modification example of the fifth example, a system is also possible in which the processing for communication load estimation performed by the radio base station 40 is performed by the network upper-level apparatus 71. Moreover, as a modification example of the seventh example, a system is also possible in which the network upper-level apparatus 71 connected to the terminal measurement DB 40 performs the processing for communication load estimation.

8.3) Effects

As described above, according to the eighth example of the present invention, the processing for communication load estimation can be performed by a network upper-level apparatus in place of a radio base station, and so the load on the radio base station can be reduced.

Note that the radio base stations 40, 41 and 42 and the network upper-level apparatus 71 according to the above-described fifth to eighth examples can be configured with hardware as apparent from the above description, but they can also be implemented with computer programs. In such a configuration, the base station or upper-level apparatus includes a processor and a program memory and executes programs stored in the program memory on the processor, whereby functions and operations similar to those of each example described above can be implemented. Note that it is also possible to implement only part of the functions according to the above-described examples with computer programs.

Third Exemplary Embodiment

According to a third exemplary embodiment of the preset invention, in a multi-network environment, a radio terminal estimates a communication load in an estimation-target network by using radio quality information (quality indicators Q1 and Q2). Hereinafter, ninth to thirteenth example of the present invention will be described with reference to drawings.

9. Ninth Example

A radio terminal according to a ninth example of the present invention is a multi-network-operable terminal that is capable of connecting to a plurality of networks, includes the load estimation functionality according to the above-described examples and can select an appropriate network. Hereinafter, a detailed description will be given.

9.1) System Architecture

Figure 29:
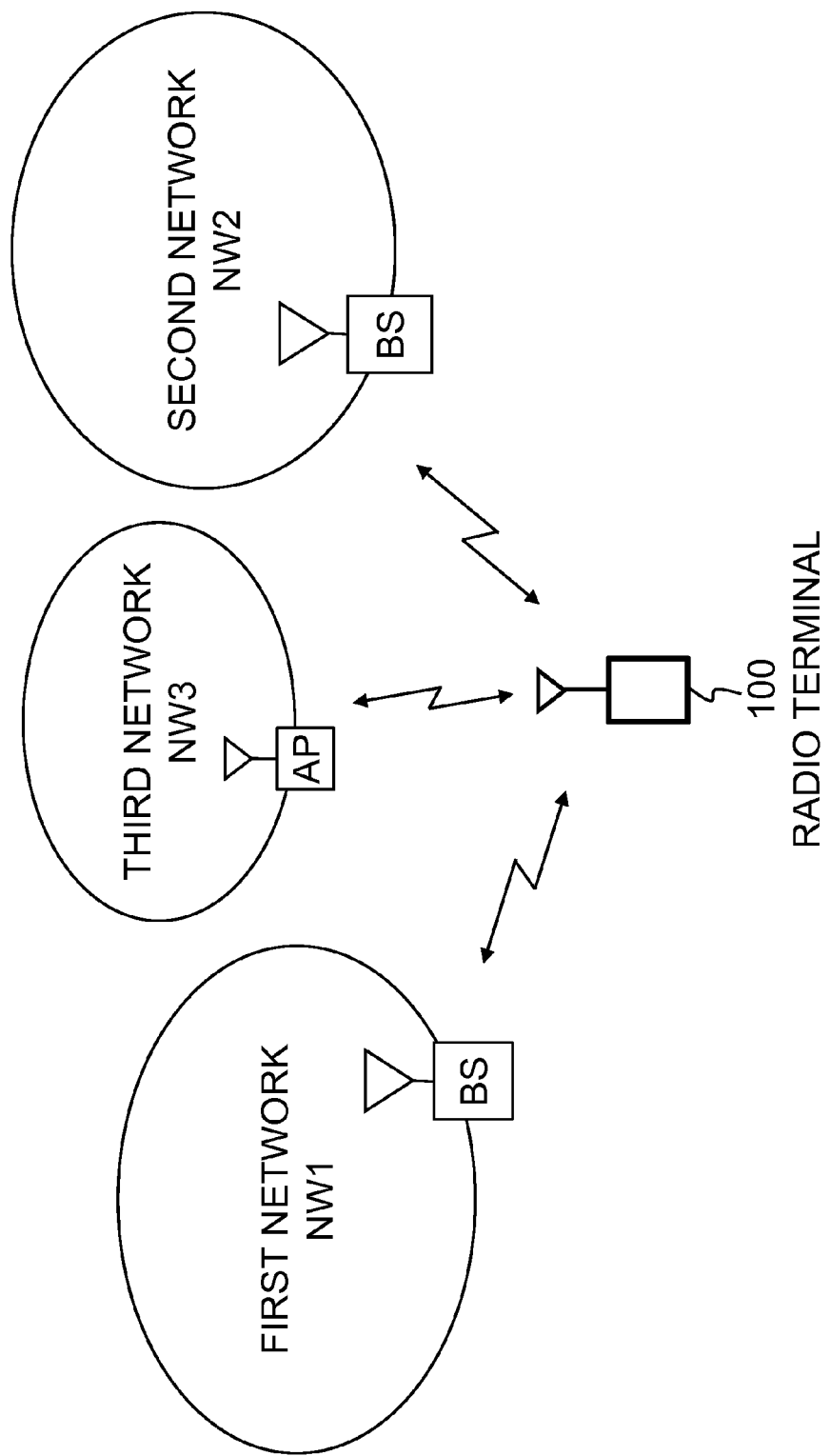
FIG. 29 is a network architecture diagram using a radio terminal according to a ninth example of the present invention.

Referring to FIG. 29, it is assumed that a radio terminal 100 according to the present example can connect to a plurality of networks. Three networks NW1, NW2 and NW3 illustrated here are, for example, cellular networks, public radio LANs and the like provided by communication operators (mobile operators and radio service providers).

Figure 30:
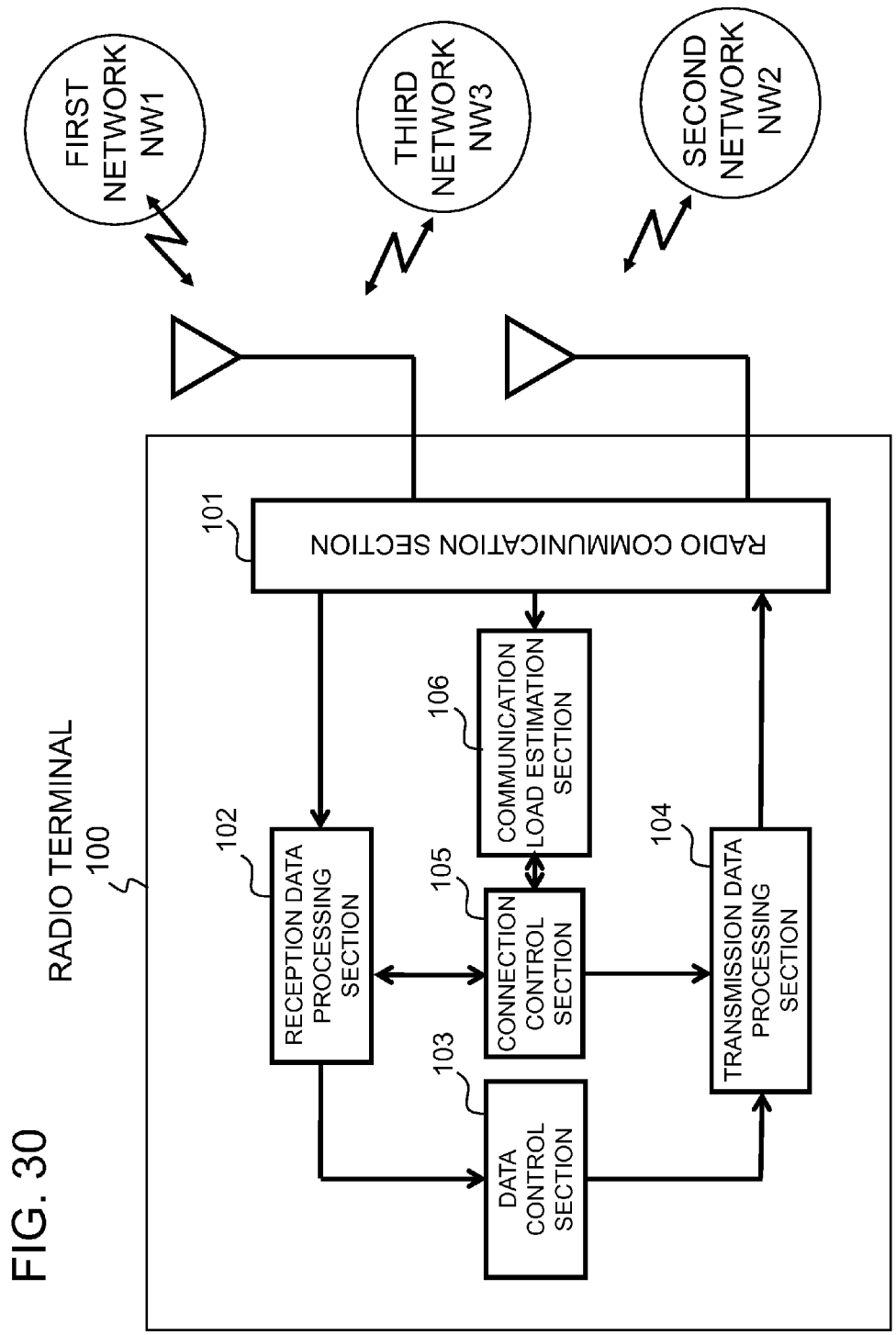
FIG. 30 is a block diagram showing a schematic configuration of the radio terminal according to the ninth example.

Referring to FIG. 30, a radio communication section 101 of the radio terminal 100 can connect by radio to a base station or an access point of the network NW1, NW2 or NW3 by using a predetermined radio access system (e.g., URAN (UMTS Terrestrial Radio Access Network), E-UTRAN (Evolved UTRAN), GERAN (GSM EDGE Radio Access Network), WiMAX (Worldwide Interoperability for Microwave Access), Radio LAN, or the like). The radio communication section 101 is provided with the above-described function of measuring the quality indicators Q1 and Q2.

The radio terminal 100 further includes a reception data processing section 102, a data control section 103, a transmission data processing section 104, a connection control section 105, and a communication load estimation section 106. The reception data processing section 102 and the transmission data processing section 104, in accordance with control of the connection control section 105, performs processing of data to be sent and received to/from a connected network, and the data control section 103 performs control of the transmission data processing section 104 and the like based on received data. The communication load estimation section 106, under the control of the connection control section 105, estimates communication loads in the networks NW as described in the first to third examples above by using measurement values of the quality indicators Q1 and Q2 input from the radio communication section 101, and outputs estimated communication load information to the connection control section 105. The connection control section 105 selects a network to use based on results of estimation by the communication load estimation section 106.

9.2) Operations

Figure 31:
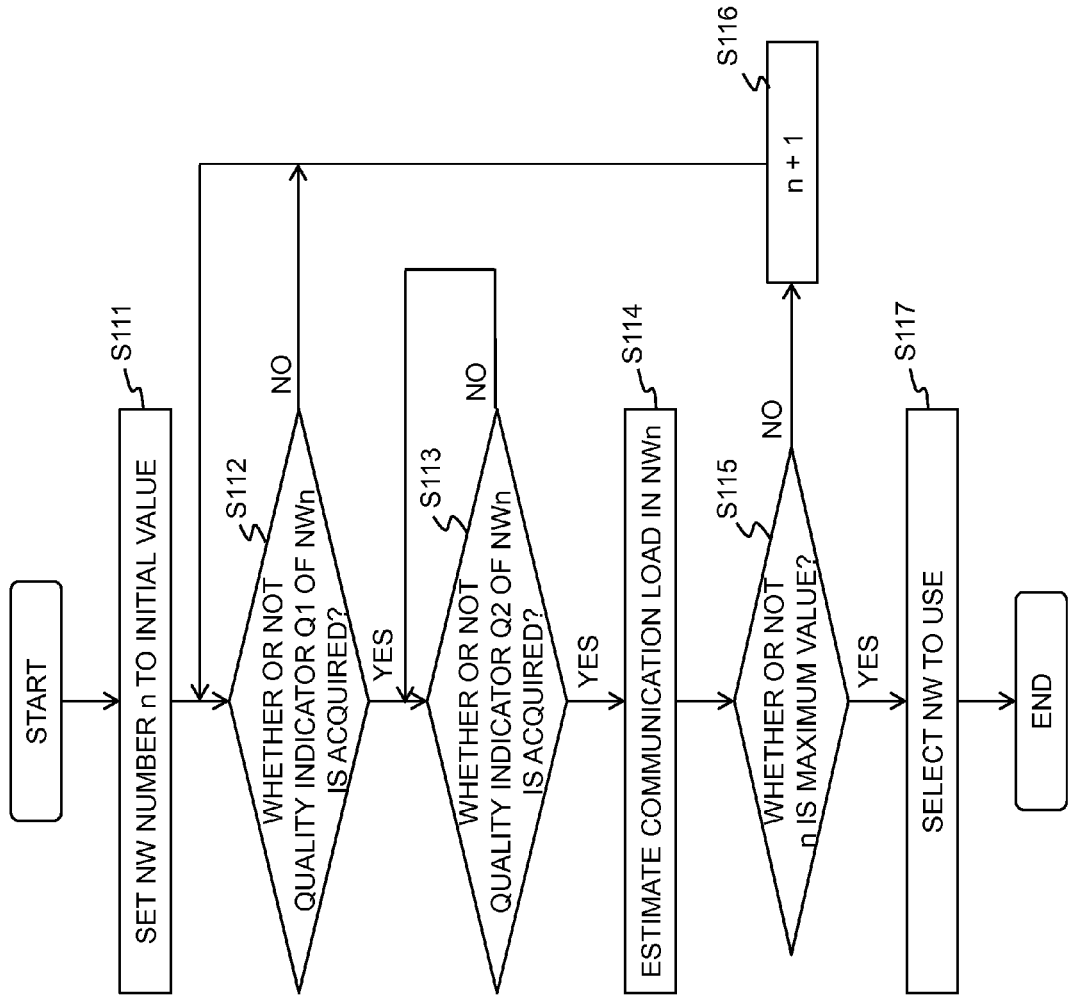
FIG. 31 is a flowchart showing an example of communication load estimation control by the radio terminal shown in FIG. 30.

Referring to FIG. 31, the connection control section 105 initializes a network number n (Operation S111). Thereafter, the communication load estimation section 106 determines whether or not the quality indicator Q1 of a network NWn is acquired (Operation S112) and, if the quality indicator Q1 is acquired (Operation S112; YES), subsequently determines whether or not the quality indicator Q2 is acquired (Operation S113). If the quality indicator Q2 is acquired (Operation S113; YES), the communication load estimation section 106 estimates a communication load in the network NWn as described in the first to third examples by using the measurement values of the quality indicators Q1 and Q2 of the network NWn (Operation S114).

Subsequently, if the network number n has not reached a maximum value (Operation S115; NO), the connection control section 105 increments n by 1 (Operation S116) and returns to Operation S112. In this manner, the above-described Operations S112 to S114 are repeated until n reaches the maximum value, that is, until the communication load estimation section 106 estimates a communication load in every one of predetermined networks. Note that the maximum value of n may be defined as the number of networks from which the radio terminal 100 can receive a pilot signal or the like to measure the quality indicators. In the present example, the maximum value of n=3, as shown in FIG. 29.

When the load estimates of the networks NW1 to NW3 are thus obtained, the connection control section 105 selects a network to use based on the load estimates (Operation S117). An example of a method for selecting a network will be described next.

9.3) Network Selection

The connection control section 105 can select a network of the lowest load estimate among the plurality of networks NW1 to NW3. Further, a network may be selected in consideration of the following indicators.

Indicator 1: An error in communication load estimation. The magnitude of an estimation error can be estimated based on the magnitude of a quality indicator that does not depend on the network load in each cell (for example, RSRP, RSCP or the like).

Indicator 2: Priorities on networks. For example, priorities are predetermined by network type and by operator, and a network of a higher priority is preferentially selected if load estimates are at similar levels.

Indicator 3: Received quality of networks. For example, a network producing higher received quality is preferentially selected if load estimates are at similar levels.

Specifically, the connection control section 105 selects a network of the smallest sum of the load estimate u and an offset $u_{offset}$. As examples of setting of the offset $u_{offset}$, the value of the offset $u_{offset}$ is made larger for a network with a large estimation error; the value of the offset $u_{offset}$ is made smaller for a network that is desired to be connected preferentially; the value of the offset $u_{offset}$ is made smaller for a network producing good received quality.

9.4) Effects

As described above, according to the ninth example of the present invention, the radio terminal 100 performs the load estimation control according to the first to third examples, whereby effects similar to those of the first to third examples can be obtained, and in addition, an appropriate network can be selected in consideration of network loads. In this event, communication loads can be estimated without actually connecting to networks, and accordingly it is possible to suppress increases in the power consumption of the radio terminal 100 and in network loads.

10. 1 Tenth Example

A radio terminal according to a 10th example of the present invention is capable of connecting to a plurality of networks and further is also capable of connecting to another network via another radio terminal that has mobile router functionality or tethering functionality to which the radio terminal connects through a radio LAN. In such a communication system as well, the radio terminal according to the present example includes the load estimation functionality according to the above-described first to third examples and thereby can select an appropriate network. Hereinafter, a detailed description will be given.

Figure 32:
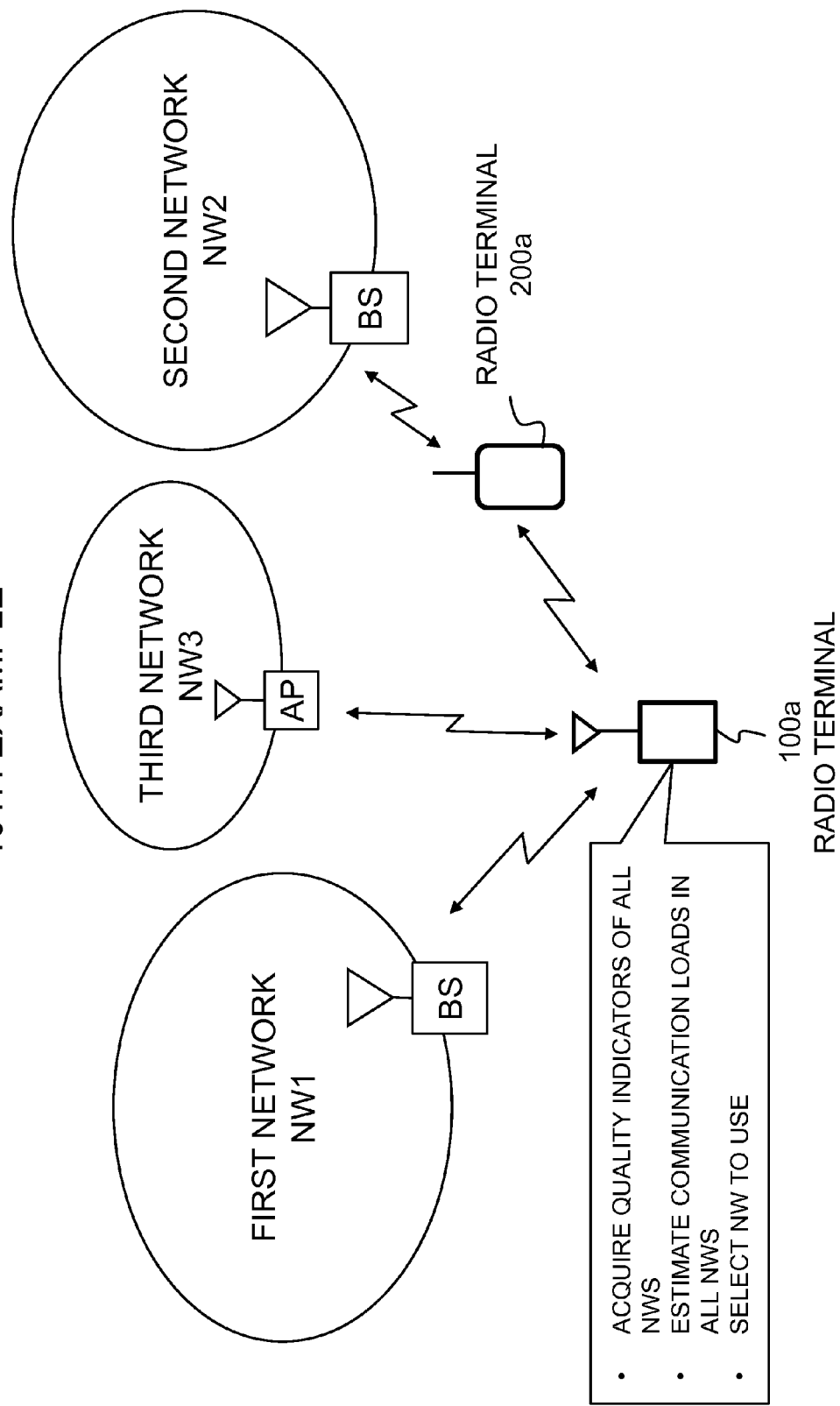
FIG. 32 is a network architecture diagram using a radio terminal according to a 10th example of the present invention.

Referring to FIG. 32, a radio terminal 100a according to the present example can connect to networks NW1 and NW3, whereas another radio terminal 200a can connect to a network NW2. Further, the radio terminals 100a and 200a can establish a radio connection by using a radio access technology such as IEEE 802.11 series-compliant Radio LAN or IEEE 802.15 series-compliant Radio PAN (e.g., Bluetooth™) Accordingly, the radio terminal 100a can use the network NW2 via the radio terminal 200a.

The configuration of the radio terminal 100a is basically similar to that of the radio terminal 100 shown in FIG. 30, but the radio communication section 101 can connect to the networks NW1 and NW3 and can also connect to the radio terminal 200a through radio LAN functionality. In the present example, it is assumed that the radio communication section 101 of the radio terminal 100a measures the quality indicators Q1 and Q2 of all the networks NW1 to NW3. Accordingly, the connection control section 105 and the communication load estimation section 106 of the radio terminal 100a, following the operation flow shown in FIG. 31, can estimate a communication load in each network and select an appropriate network by using the communication load estimates.

Note that as another configuration, it is also possible that the radio terminal 200a measures the quality indicators of the networks NW1 to NW3 and selects a network by using respective load estimates of the networks. In this case, the radio terminal 100a connects to the radio terminal 200a through a radio LAN and connects to a network selected by the radio terminal 200a via the radio terminal 200a.

As described above, the radio terminal 100a according to the 10th example of the present invention, in addition to effects similar to those of the above-described ninth example, can also use a network via the other radio terminal 200a through similar communication load estimation.

11. Eleventh Example

In the above-described 10th example, a radio terminal measures the quality indicators of all networks and estimates communication loads. In an 11th example of the present invention, each radio terminal measures the quality indicators of a network to which it can connect and estimates a communication load, and one radio terminal can be notified of the communication loads estimated by other radio terminals. In such a communication system, a radio terminal according to the present example can obtain communication load estimates of all networks similarly to the load estimation functionality according to the above-described first to third examples and therefore can select an appropriate network. Hereinafter, a detailed description will be given.

11.1) System Architecture

Figure 33:
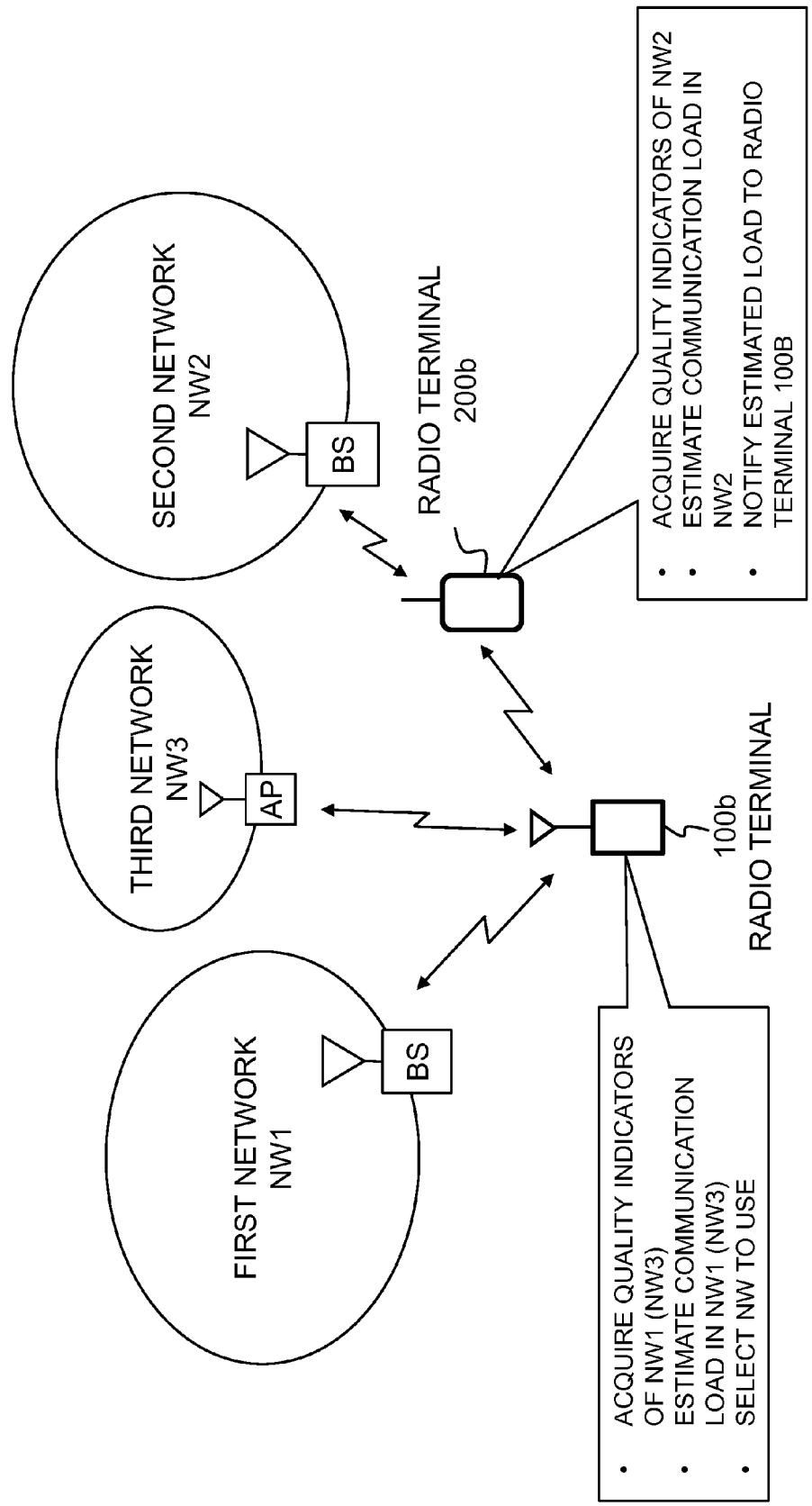
FIG. 33 is a network architecture diagram using radio terminals according to an 11th example of the present invention.

Referring to FIG. 33, a radio terminal 100b according to the present example is capable of connecting to networks NW1 and NW3, whereas another radio terminal 200b having mobile router functionality is capable of connecting to a network NW2. Further, the radio terminals 100b and 200b can establish a radio connection through a radio LAN as described above, allowing the radio terminal 100b to use the network NW2 via the radio terminal 200a.

Figure 34:
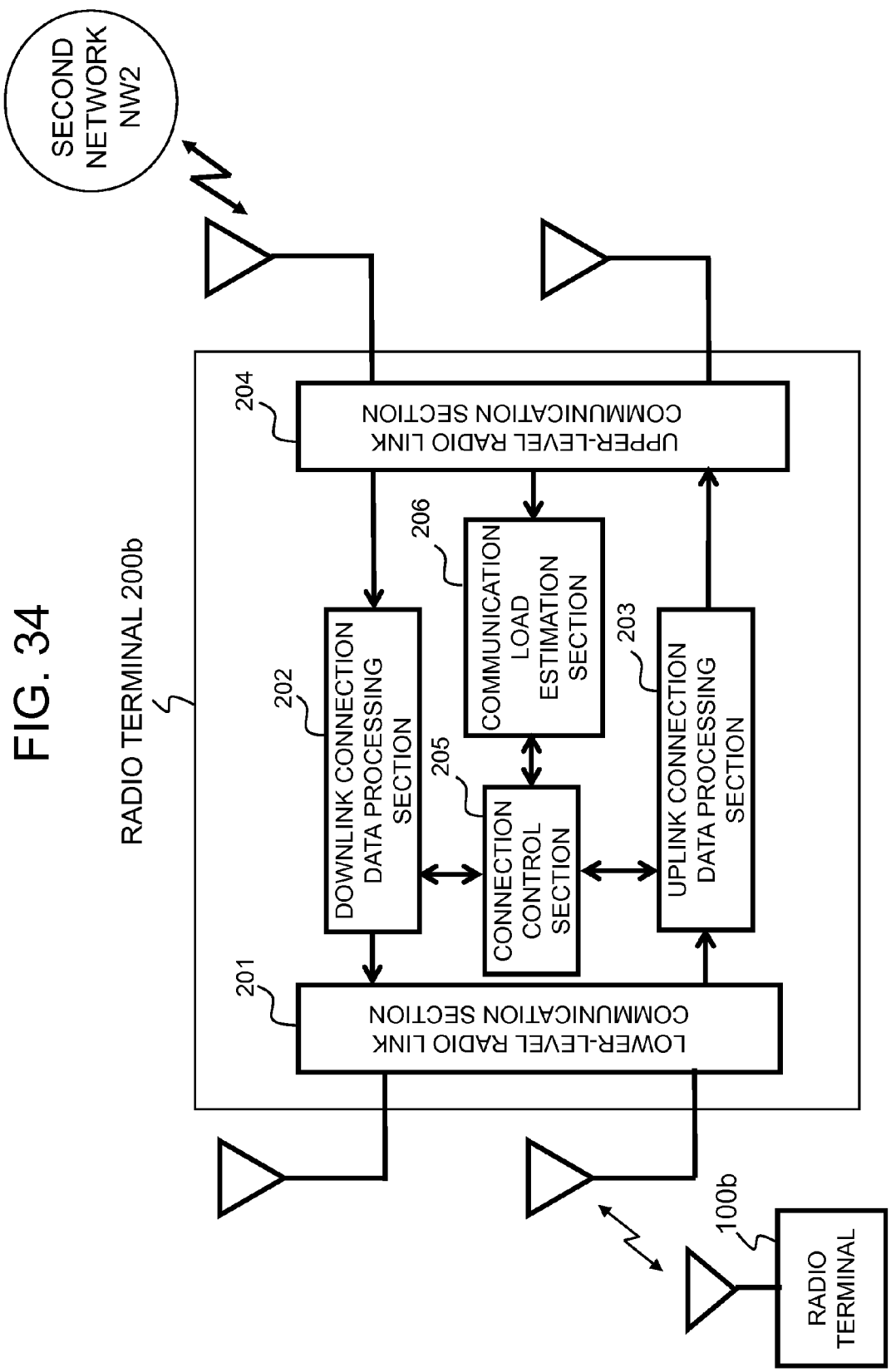
FIG. 34 is a block diagram showing a schematic configuration of the radio terminal according to the 11th example.

Referring to FIG. 34, the radio terminal 200b is, for example, a mobile router, such as a smartphone having tethering functionality or a Wi-Fi router, and controls transfer of data transmitted/received between the radio terminal 100b and the network NW2. A lower-level radio link communication section 201 connects by radio to the radio terminal 100b by using a radio access system such as Radio LAN or Radio PAN as mentioned above to send transmission data from a downlink connection data processing section 202 to the radio terminal 100b and also to output data received from the radio terminal 100b to an uplink connection data processing section 203. An upper-level radio link communication section 204 connects by radio to a base station of the network NW2 by using the above-mentioned same radio access system that is used by the radio terminal 100b or a different radio access system and thereby can communicate with the network NW2. Further, the upper-level radio link communication section 204 has a function of measuring the quality indicators Q1 and Q2 of the network NW2.

A communication load estimation section 206 receives as inputs measurement values of the quality indicators Q1 and Q2 from the upper-level radio link communication section 204 and performs communication load estimation as described in the first to third examples above. A connection control section 205 notifies a communication load estimate of the network NW2 to the radio terminal 100b via the lower-level radio link communication section 201.

11.2) Operations

Figure 35:
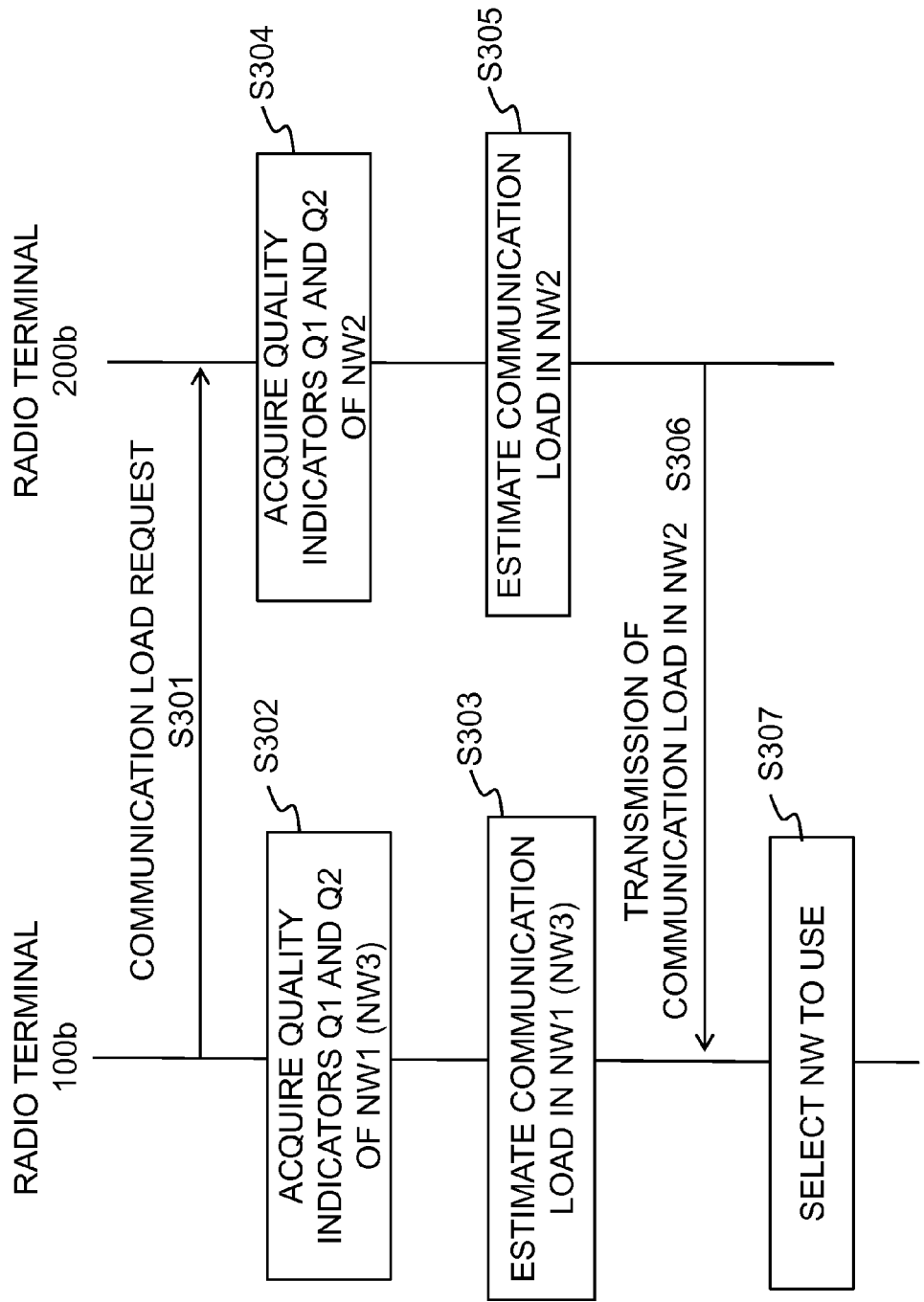
FIG. 35 is a sequence diagram showing operations in the network shown in FIG. 34.

Referring to FIG. 35, the connection control section 105 of the radio terminal 100b according to the present example, when starting network selection, sends a communication load request to the radio terminal 200b (Operation S301). Subsequently, the radio communication section 101 measures the quality indicators Q1 and Q2 of the networks NW1 and NW3 (Operation S302), and the communication load estimation section 106 uses those measurement values to estimate communication loads in the networks NW1 and NW3 as in the above-described first to third examples (Operation S303).

Meanwhile in the radio terminal 200b, when the communication load request is received via the uplink connection data processing section 203, the upper-level radio link communication section 204 measures the quality indicators Q1 and Q2 of the network NW2 (Operation S304), and the communication load estimation section 206 uses those measurement values to estimate a communication load in the network NW2 as in the above-described first to third examples (Operation S305). The communication load estimate of the network NW2 thus obtained is notified to the radio terminal 100b via the downlink connection data processing section 202 (Operation S306).

When receiving the communication load estimate of the network NW2 from the radio terminal 200b, the connection control section 105 of the radio terminal 100b, based on it along with the communication load estimates of the networks NW1 and NW3 estimated by the own terminal, selects an appropriate network as described in the ninth example above (Operation S307).

11.3) Effects

As described above, according to the 11th example of the present invention, the radio terminal 100b and the radio terminal 200b that operates as a mobile router individually estimate communication loads in the respective networks to which they can connect. Then, the radio terminal 100b receives the communication load estimate estimated by the radio terminal 200b and thereby can perform network selection by using the communication load estimates of all the networks. The processing for network load estimation is shared between the radio terminals 100b and 200b, whereby the processing load on each radio terminal is lightened, making is possible to reduce power consumption.

Note that it is also possible that the radio terminal 100b notifies load estimates of the networks NW1 and NW3 to the radio terminal 200b, and the radio terminal 200b selects a network based on a load in the network NW2 estimated by itself and the acquired load estimates of the networks NW1 and NW3.

12. Twelfth Example

In the above-described 11th example, the processing for network load estimation is shared between a radio terminal and another radio terminal. In a 12th example of the present invention, the other radio terminal only performs measurement of the quality indicators and notifies the measurement values thereof to the radio terminal. In such a communication system as well, according to the present example, it is possible to obtain communication load estimates of all networks and select an appropriate network as in the above-described ninth to 11th examples.

Figure 36:
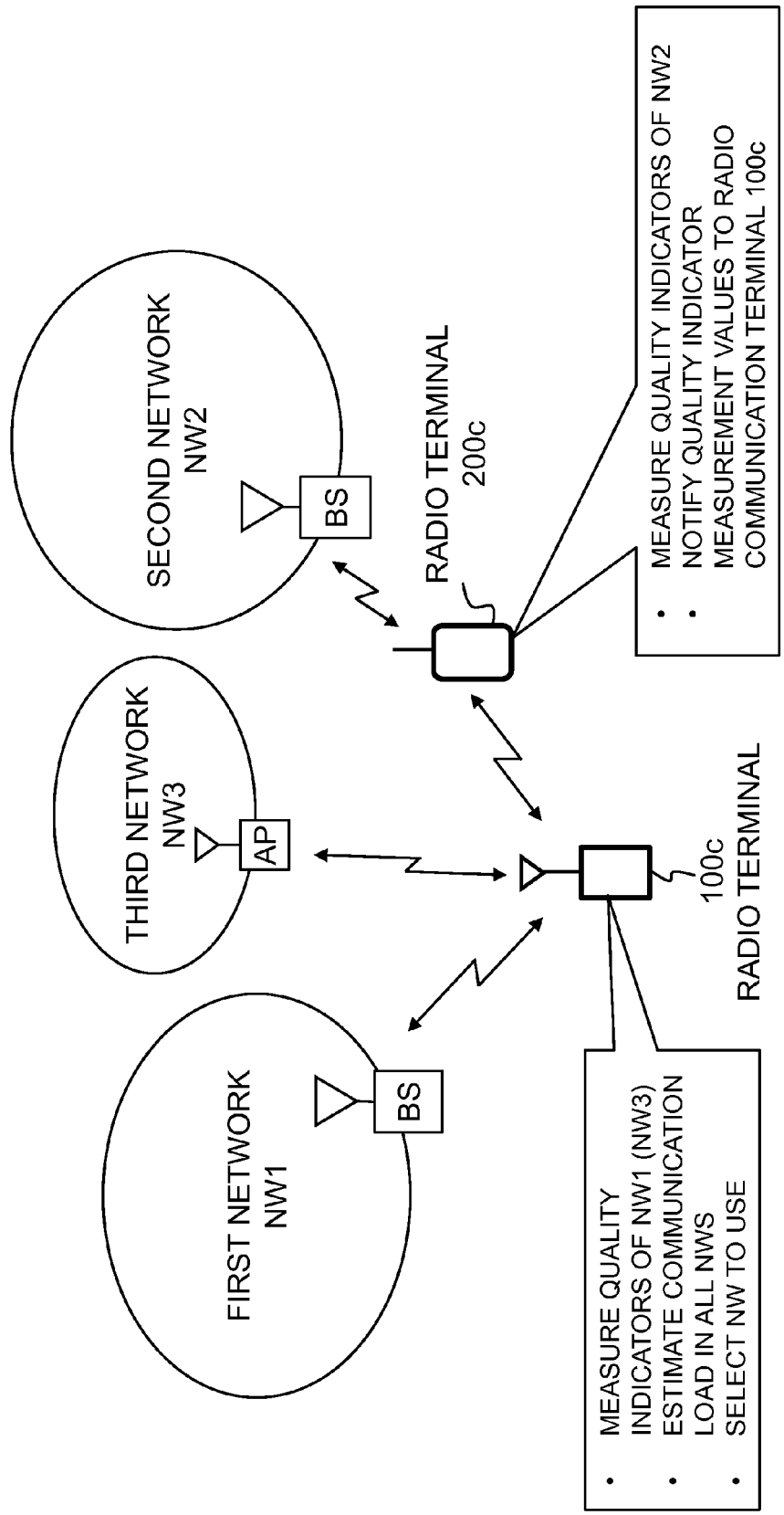
FIG. 36 is a network architecture diagram using radio terminals according to a 12th example of the present invention.

Referring to FIG. 36, a radio terminal 100c according to the present example is capable of connecting to networks NW1 and NW3, whereas another radio terminal 200c having mobile router functionality is capable of connecting to a network NW2. Further, the radio terminals 100c and 200c can establish a radio connection through a radio LAN as described above, allowing the radio terminal 100c to use the network NW2 via the radio terminal 200c.

Figure 37:
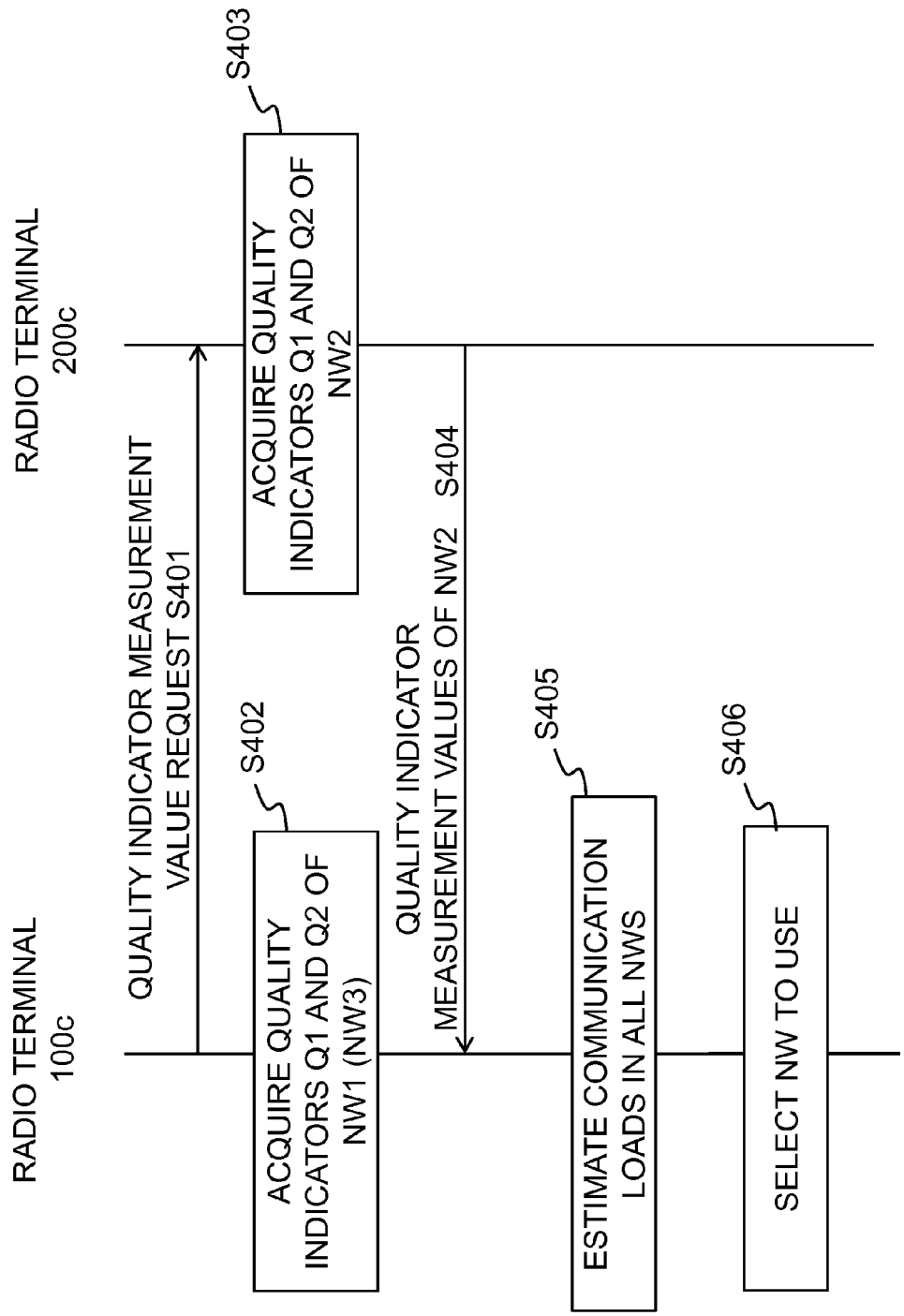
FIG. 37 is a sequence diagram showing operations in the network shown in FIG. 36.

Referring to FIG. 37, the connection control section 105 of the radio terminal 100c according to the present example, when starting network selection, sends a quality indicator measurement value request to the radio terminal 200c (Operation S401). Subsequently, the radio communication section 101 measures the quality indicators Q1 and Q2 of the networks NW1 and NW3 (Operation S402).

Meanwhile in the radio terminal 200c, when the quality indicator measurement value request is received via the uplink connection data processing section 203, the upper-level radio link communication section 204 measures the quality indicators Q1 and Q2 of the network NW2 (Operation S403) and sends the quality indicator measurement values of the network NW2 to the radio terminal 100c via the downlink connection data processing section 202 (Operation S404).

The communication load estimation section 106 of the radio terminal 100c estimates communication loads in all the networks as in the above-described first to third examples by using the quality indicator measurement values of the network NW2 received from the radio terminal 200c and the quality indicator measurement values of the networks NW1 and NW3 measured by the own terminal (Operation S405). The connection control section 105 selects an appropriate network by using these communication load estimates (Operation S406).

As described above, according to the 12th example of the present invention, the radio terminal 100c and the radio terminal 200c that operates as a mobile router individually measure the quality indicators of the respective networks to which they can connect. Then, the radio terminal 100c receives the quality indicator measurement values measured by the radio terminal 200c and thereby can estimate a communication load in each network by using the quality indicator measurement values of all the networks and perform network selection by using these communication load estimates. The processing for measuring the quality indicators of networks is shared between the radio terminals 100c and 200c, and the processing for network load estimation is performed by the radio terminal 100c, whereby the processing load on each radio terminal is lightened, making is possible to reduce power consumption particularly of the radio terminal 200c.

Note that it is also possible that the radio terminal 100c notifies quality indicator measurement values of the networks NW1 and NW3 to the radio terminal 200c, and the radio terminal 200c estimates a communication load in each network by using the quality indicators of the network NW2 measured by itself and the acquired quality indicator measurement values of the networks NW1 and 3 and selects a network by using these load estimates.

13. Thirteenth Example

In the above-described 10th to 12th examples, network communication loads are estimated based on the quality indicators Q1 and Q2 of each network, and a network to connect to is selected. On the other hand, according to a 13th example of the present invention, a network can be selected by using simplified radio quality information of a radio terminal, as well as received quality measured by and a network communication load estimated by another radio terminal.

13.1) System Architecture

Figure 38:
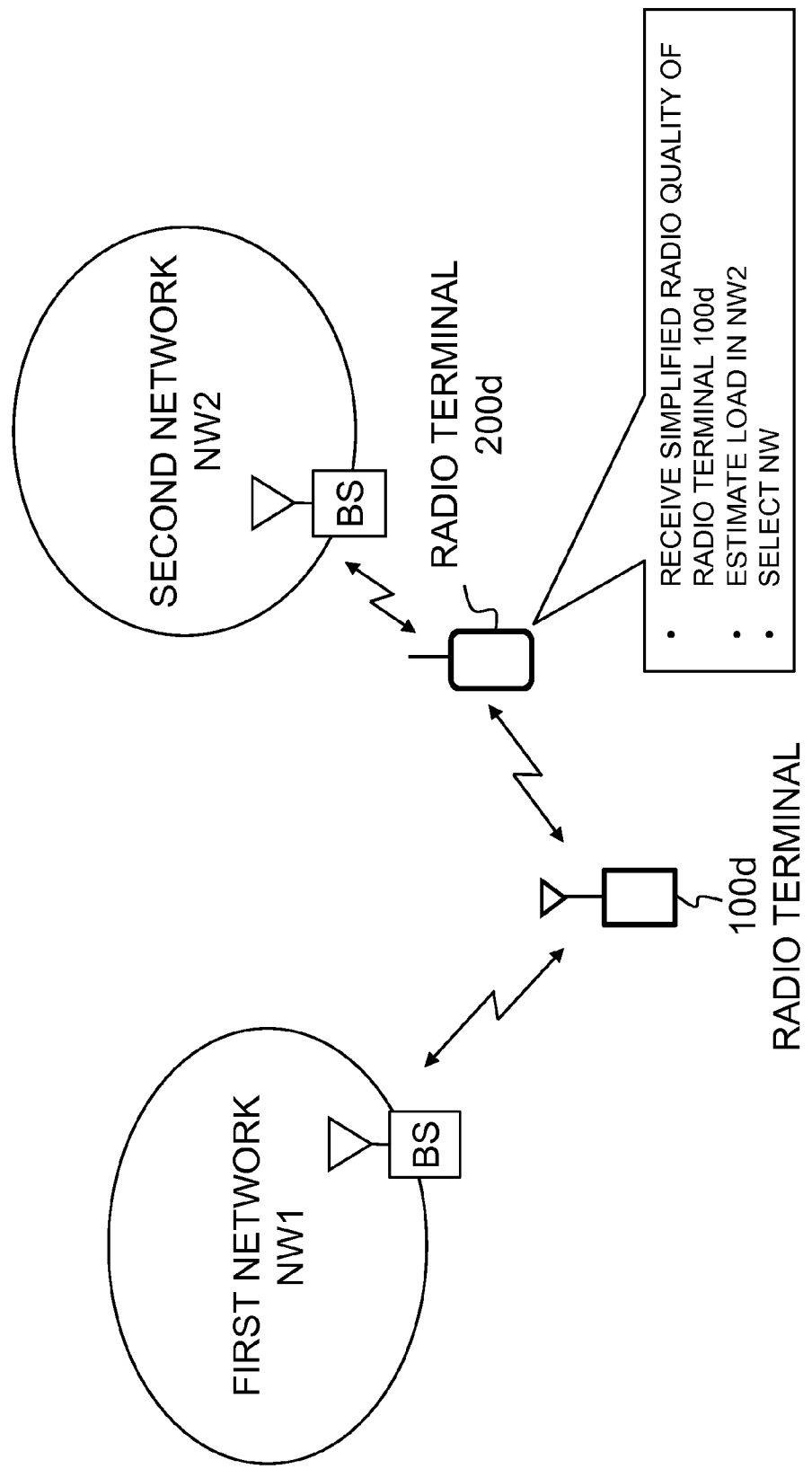
FIG. 38 is a network architecture diagram using a radio terminal according to a 13th example of the present invention.

Referring to FIG. 38, it is assumed that a radio terminal 100d according to the present example is capable of connecting to a network NW1, whereas another radio terminal 200d having mobile router functionality is capable of connecting to a network NW2. It is also possible that the radio terminal 100d can further connect to another network (a third network), as described already. Moreover, the radio terminals 100d and 200d can establish a radio connection through a radio LAN as described above, allowing the radio terminal 100d to use the network NW2 via the radio terminal 200d. Note that the basic configurations of the radio terminals 100d and 200d are similar to the block diagrams shown in FIGS. 30 and 34, respectively, and therefore a description thereof will be given by using the same reference signs. However, the functions of the connection control sections 105 and 205 and the communication load estimation sections 106 and 206 in the present embodiment are different from those of the above-described examples, which will be described hereinafter.

13.2) System Operations

Figure 39:
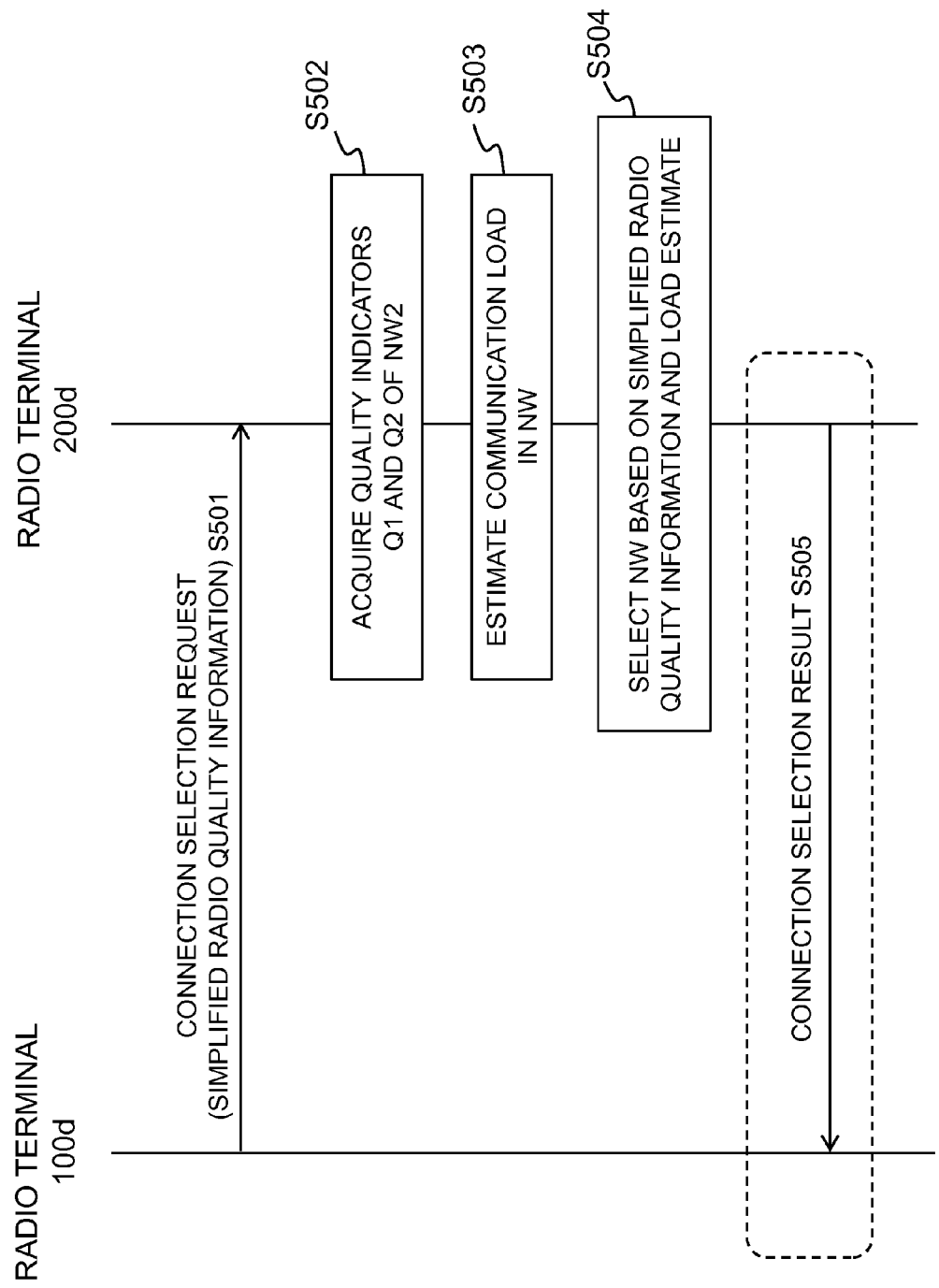
FIG. 39 is a sequence diagram showing operations in the network shown in FIG. 38.

Referring to FIG. 39, the connection control section 105 of the radio terminal 100d according to the present example, when starting network selection, sends a connection selection request including simplified radio quality information of its own terminal to the radio terminal 200d (Operation S501). The simplified radio quality information is information indicating simplified radio quality such as, for example, the number of antenna bars of the own terminal. When receiving the connection selection request, the communication load estimation section 206 of the radio terminal 200d acquires the quality indicators Q1 and Q2 of the network NW2 (Operation S502) and uses these measurement values to estimate a communication load in the network NW2 (Operation S503).

Subsequently, the connection control section 205 of the radio terminal 200d selects an appropriate network in accordance with selection criteria, which will be described later, based on the simplified radio quality information received from the radio terminal 100d and the communication load in the network NW2 estimated by the own terminal (Operation S504). At that time, the connection control section 205 may notify a result of the network selection to the radio terminal 100d (Operation S505).

Alternatively, if the radio terminal 100d is configured to preferentially select a connection on the radio terminal 200d side, it is also possible that the radio terminal 200d turns on/off the radio LAN functionality between the radio terminals 100d and 200d, thereby controlling network selection by the radio terminal 100d, without notifying a result of the network selection.

13.3) Network Selection Criteria

Figure 40:
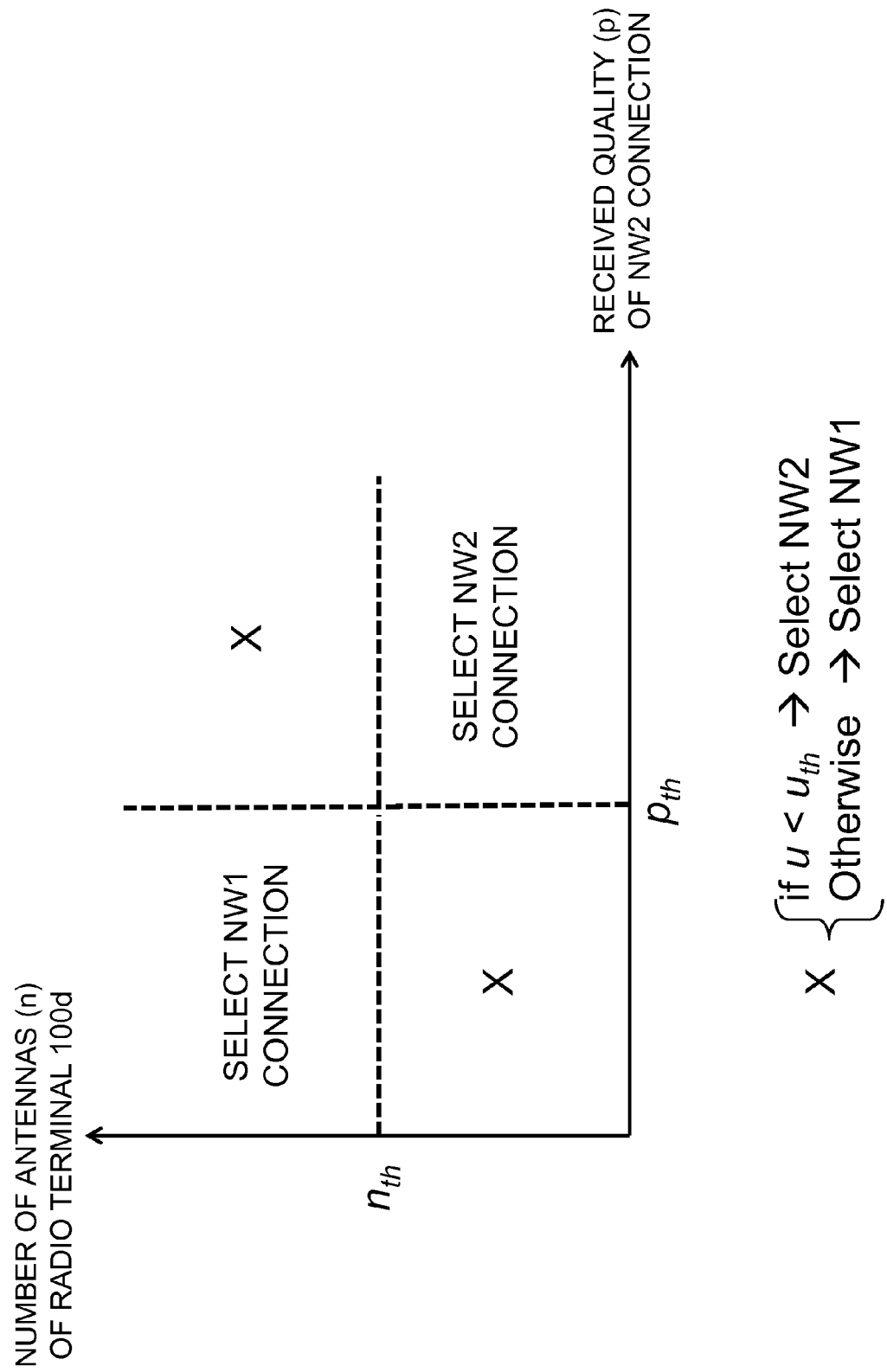
FIG. 40 is a schematic diagram for describing network selection criteria of the radio terminal according to the 13th example.

Referring to FIG. 40, according to the present example, a network is selected in consideration of not only the network load estimate u but also the received quality p of a network connection and the number of antennas n of the radio terminal 100d. Specifically, the network NW2 is selected when the received quality p of the network NW2 is not lower than a predetermined value pth and also when the number of antennas n of the radio terminal 100d is smaller than a predetermined value $n_{th}$. The network NW1 is selected when the received quality p of the network NW2 is lower than the predetermined value pth and also when the number of antennas n of the radio terminal 100d is not smaller than the predetermined value $n_{th}$. In the other cases (areas labeled with "X" in FIG. 40), the network NW2 is selected when the load estimate u of the network NW2 is lower than a predetermined value $u_{th}$, and otherwise the network NW1 is selected. Note that for the radio quality p, the above-described quality indicators can be used.

13.4) Operations of the Radio Terminal 200d

Figure 41:
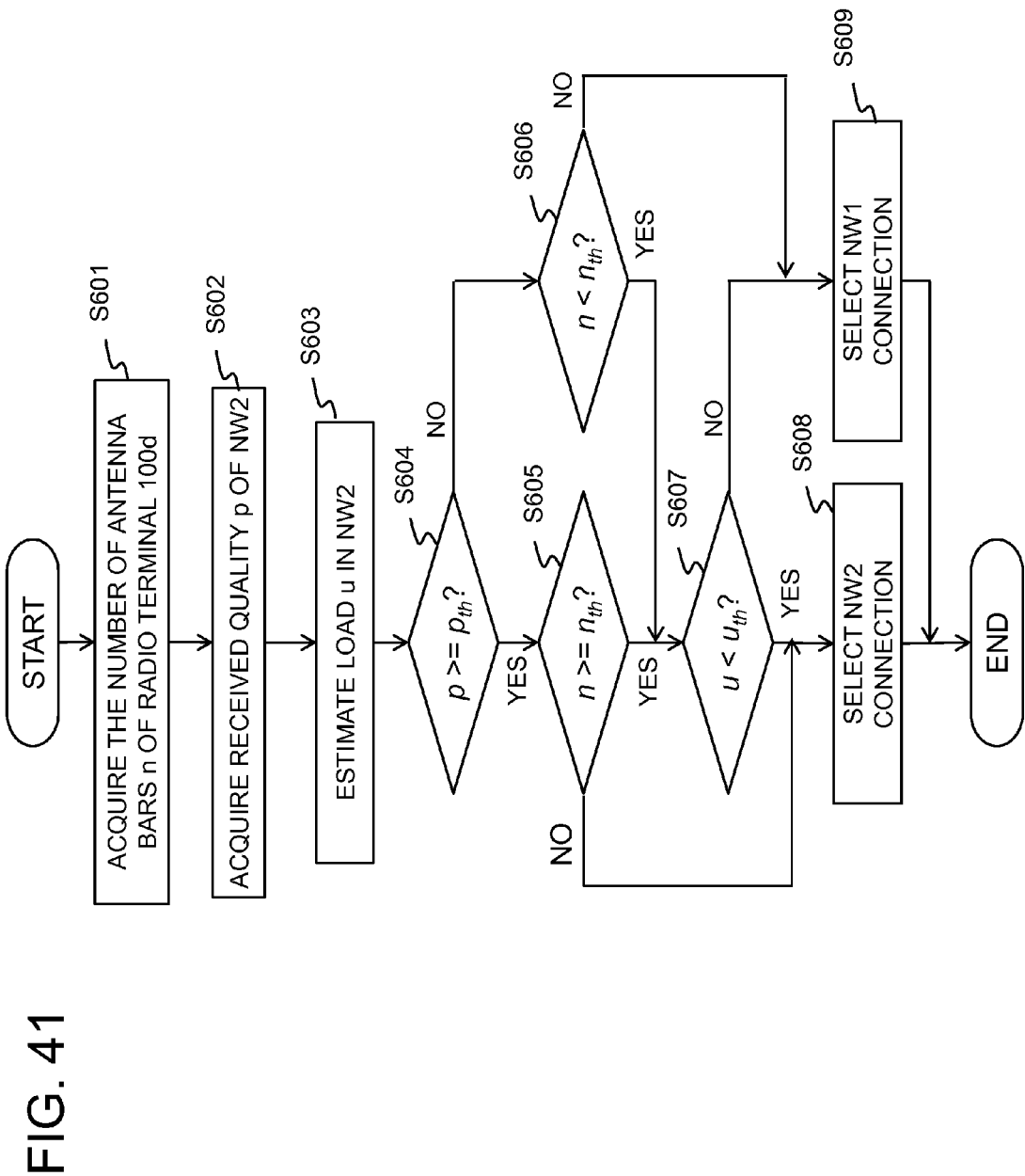
FIG. 41 is a flowchart showing operations of the radio terminal according to the 13th example.

Referring to FIG. 41, the connection control section 205 of the radio terminal 200d acquires the number of antennas n from the radio terminal 100d as its simplified radio quality information (Operation S601). Subsequently, the communication load estimation section 206 acquires the received quality p of the network NW2 (Operation S602) and estimates the load u in the network NW2 through the method described already (Operation S603).

Subsequently, the connection control section 205 determines whether or not the received quality p of the network NW2 is equal to or higher than the predetermined value $p_{th}$ (Operation S604) and, if $p \geq p_{th}$ (Operation S604; YES), further determines whether or not the number of antennas n of the radio terminal 100d is equal to or larger than the predetermined value $n_{th}$ (Operation S605). Moreover, if $p<p_{th}$ (Operation S604; NO), it is determined whether or not the number of antennas n of the radio terminal 100d is smaller than the predetermined value $n_{th}$ (Operation S606).

When $p>=p_{th}$ (Operation S604; YES) and also when $n>=n_{th}$ (Operation S605; YES), or when $p<p_{th}$ (Operation S604; NO) and also when $n<n_{th}$ (Operation S606; YES), then the connection control section 205 determines whether or not the load estimate u of the network NW2 is smaller than the predetermined value $u_{th}$ (Operation S607). The connection control section 205 selects the network NW2 (Operation S608) if $u<u_{th}$ (Operation S607; YES), but selects the network NW1 (Operation S609) if $u>=u_{th}$ (Operation S607; NO).

Moreover, when $p>=p_{th}$ (Operation S604; YES) and also when $n<n_{th}$ (Operation S605; NO), the connection control section 205 selects the network NW2 (Operation S608). When $p<p_{th}$ (Operation S604; NO) and also when $n>=n_{th}$ (Operation S605; NO), the connection control section 205 selects the network NW1 (Operation S609).

Note that although the radio terminal 200d selects a network for the radio terminal 100d to connect to by using a network load estimated by itself and simplified radio quality information acquired from the radio terminal 100d in the present example, it is also possible that the radio terminal 100d selects a network by using a network load estimated by itself and simplified radio quality information acquired from the radio terminal 200d.

13.5) Effects

As described above, according to the 13th example of the present invention, a network is selected based on simplified radio quality information of a radio terminal and on received quality measured by and a network communication load estimated by another radio terminal. Accordingly, even in a case where acquirable radio quality information is limited, it is possible to select an appropriated network, to further simplify network selection control, and also to reduce the amount of information to be notified between radio terminals.

Fourth Exemplary Embodiment

According to a fourth exemplary embodiment of the present invention, a communication load in a cell managed by a different operator can be estimated, and so it is possible to provide a communication load benchmark of the other operator. Hereinafter, 14th and 15th examples of the present invention will be described with reference drawings.

14. Fourteenth Example

According to a 14th example of the present invention, a radio station belonging to an operator (first operator) measures the quality indicators Q1 and Q2 of a cell managed by another operator (second operator), and a server collects the measurement results and estimates a communication load in the cell of the second operator. Hereinafter, a description will be given by using a case as an example where two cells are adjacent to an estimation-target cell.

Referring to FIG. 42, in a radio communication system according to the 14th example of the present invention, it is assumed that radio base stations 43 and 43b, a server 72, and radio stations ST and STb belong to the first operator, whereas a radio base station 44 belongs to the second operator. Moreover, it is assumed that cells 50 and 50b managed by the radio base stations 43 and 43b, respectively, are adjacent to an estimation-target cell 51 managed by the radio base station 44, and that the radio stations ST and STb are under control of the radio base stations 43 and 43b, respectively, and measure the quality indicators Q1 and Q2 of the estimation-target cell 51.

The radio stations ST and STb each have a function of measuring the quality indicators Q1 and Q2 of the estimation-target cell 51, which is managed by an operator different from theirs, and this measurement function is implemented at the application level. The radio stations ST and STb may be mobile terminals, or may be radio stations installed at locations where signals from the estimation-target cell 51 can be received.

The server 72 collects measurement values of the quality indicators Q1 and Q2 measured by the radio stations ST and STb via the radio base stations 43 and 43b, respectively, and estimates a communication load in the estimation-target cell 51 by using the measurement results as in the first to eighth examples described already. The configuration of the server 72 is basically similar to the upper-level apparatus 71 shown in the eighth example (FIG. 27), including a communication section 701, a reception data processing section 703, and a communication load estimation section 704.

As described above, the radio stations ST and STb for quality indicator measurement and the server 72 for load estimation are provided, whereby a communication load in the cell of the second operator can be acquired, enabling the first operator to acquire a communication load benchmark of the second operator from the server 72.

Note that the radio stations ST and STb may be directly connected to the server 72 through wired or wireless communication connections, not via the radio base stations 43 and 43b, respectively.

15. Fifteen Example

According to a 15th example of the present invention, load estimation is not performed by the server 72, but the radio station ST or STb can perform quality indicator measurement and load estimation. That is, a communication load estimation section is provided to the radio station ST or STb, whereby load estimation is performed by a radio station. Accordingly, the configuration of the radio station ST or STb is basically similar to those of the first to sixth examples.

16. Additional Statements

Part or all of the above-described exemplary embodiments and examples can also be stated as in, but are not limited to, the following additional statements.
(Additional Statement 1)

A method for estimating a communication load in a network, characterized in that the communication load in the network is estimated by using at least a first quality indicator, which includes entire received power, and a second quality indicator, which includes a signal-to-noise-and-interference ratio of a reference signal.
(Additional Statement 2)

The method for estimating a communication load according to additional statement 1, characterized in that the communication load is estimated based on a result of subtracting interference and noise power components included in the signal-to-noise-and-interference ratio from the entire received power.

(Additional Statement 3)

The method for estimating a communication load according to additional statement 1 or 2, characterized in that the communication load is estimated by using results of measurement of the first and second quality indicators, which is performed multiple times for each thereof.

(Additional Statement 4)

The method for estimating a communication load according to additional statement 3, characterized by comprising statistical processing of measurement values obtained by the multiple times of measurement.

(Additional Statement 5)

The method for estimating a communication load according to additional statement 3, characterized by comprising statistical processing of results of estimation, which is performed for each of the multiple times of measurement.

(Additional Statement 6)

The method for estimating a communication load according to any one of additional statements 1 to 5, characterized in that an operation for estimating the communication load is performed when received power of the reference signal is not smaller than a predetermined value.

(Additional Statement 7)

The method for estimating a communication load according to any one of additional statements 1 to 6, characterized in that the network includes a plurality of cells having a predetermined resource block structure, wherein the reference signal is a reference signal of the network.

(Additional Statement 8)

The method for estimating a communication load according to additional statement 7, characterized in that, assuming that the communication load is u, the communication load u is calculated by using a following equation (1):

[Math. 5]

$$u_k = \frac{1}{5} \cdot \left( \frac{RSSI}{2p_k} - \frac{6}{SINR_k} - 1 \right) = \frac{1}{5} \cdot \left( \frac{1}{2RSRQ_k} - \frac{6}{SINR_k} - 1 \right) \quad (1)$$

where the first quality indicator is RSSI or $RSRQ_k$, and the second quality indicator is $SINR_k$, RSSI is received signal power per resource block (1 RB) of an OFDM symbol in which the reference signal RS is multiplexed, $p_k$ is received signal power per resource element of the reference signal RS of a cell Cell_k ($RSRP_k$), $SINR_k$ is a ratio of received signal power of the RS signal of the cell Cell_k to interference signal power plus noise power, and $RSRQ_k$ is a ratio of the received signal power of the RS signal of the cell Cell_k to RSSI.

(Additional Statement 9)

The method for estimating a communication load according to any one of additional statements 1 to 6, characterized in that the network is of a code division multiplexing system of multiplexing the pilot signal and a user transmission signal, wherein the reference signal is the pilot signal.

(Additional Statement 10)

The method for estimating a communication load according to additional statement 9, characterized in that, assuming that the communication load is u, the communication load u is calculated by using a following equation (2):

[Math. 6]

$$u_k = \frac{RSSI}{p_k} - \frac{SF}{SINR_k} - 1 = \frac{1}{Ec/No_k} - \frac{SF}{SINR_k} - 1 \quad (2)$$

where the first quality indicator is RSSI or $Ec/No_k$, and the second quality indicator is $SINR_k$, RSSI is received signal power within a bandwidth, $p_k$ is received signal power of a pilot signal (PS) of a cell Cell_k ($RSRP_k$), $SINR_k$ is a ratio of the received signal power of the PS signal of the cell Cell_k to interference signal power plus noise power, $Ec/No_k$ is a ratio of the received signal power of the PS signal of the cell Cell_k to RSSI, and SF is a spreading factor.

(Additional Statement 11)

The method for estimating a communication load according to any one of additional statements 1 to 10, characterized in that a radio station in a radio communication system performs an operation for estimating the communication load.

(Additional Statement 12)

The method for estimating a communication load according to additional statement 11, characterized in that if the radio station manages at least one radio terminal, the radio terminal performs measurement of the first and second quality indicators and notifies them to the radio station.

(Additional Statement 13)

The method for estimating a communication load according to any one of additional statements 1 to 10, characterized in that at least one of a radio base station and a upper-level apparatus thereof in a radio communication system performs an operation for estimating a communication load in an estimation-target cell.

(Additional Statement 14)

The method for estimating a communication load according to additional statement 13, characterized in that a radio terminal that is connected to a cell managed by the radio base station performs measurement of the first and second quality indicators.

(Additional Statement 15)

The method for estimating a communication load according to additional statement 13, characterized in that if any other radio base station exists that cooperates with the radio base station in the operation for estimating the communication load, a radio terminal that is connected to a cell managed by this other radio base station performs measurement of the first and second quality indicators.

(Additional Statement 16)

The method for estimating a communication load according to additional statement 13, characterized in that a radio terminal that is connected to the estimation-target cell performs measurement of the first and second quality indicators.

(Additional Statement 17)

The method for estimating a communication load according to additional statement 16, characterized in that a third radio base station managing the estimation-target cell and the radio base station use a common database that stores measurement data on the first and second quality indicators.

(Additional Statement 18)

The method for estimating a communication load according to additional statement 16 or 17, characterized in that if a radio terminal located within the estimation-target cell operates in Logged MDT (Minimization of Drive Test) mode, the radio terminal, upon connecting to the radio base station, notifies measurement data on the first and second quality indicators to the radio base station.

(Additional Statement 19)

The method for estimating a communication load according to any one of additional statements 13 to 18, characterized in that the operation for estimating the communication load is performed in such a manner that load estimation is performed based on measurement data on the first and second quality indicators measured by a plurality of radio terminals, wherein a load is estimated for each's measurement data, and results or the estimation are subjected to statistical processing.

(Additional Statement 20)

The method for estimating a communication load according to any one of additional statements 1 to 10, characterized in that a radio terminal in a radio communication system performs an operation for estimating the communication load.

(Additional Statement 21)

The method for estimating a communication load according to additional statement 20, characterized in that the radio terminal estimates a communication load in each of a plurality of networks.

(Additional Statement 22)

The method for estimating a communication load according to additional statement 20 or 21, characterized in that the radio terminal estimates a communication load in at least one network and acquires from another radio terminal a communication load in another network, which is estimated by the another radio terminal.

(Additional Statement 23)

The method for estimating a communication load according to additional statement 20 or 21, characterized in that the radio terminal estimates a communication load in at least one network and acquires from another radio terminal measurement data on the first and second quality indicators of another network, which are measured by the another radio terminal.

(Additional Statement 24)

The method for estimating a communication load according to any one of additional statements 1 to 10, characterized in that acquisition of measurement data on the first and second quality indicators of the network is performed at an application level of a radio station in a radio communication system.

(Additional Statement 25)

The method for estimating a communication load according to additional statement 24, characterized in that a server in the radio communication system collects the measurement data and performs an operation for estimating the communication load.

(Additional Statement 26)

The method for estimating a communication load according to additional statement 24, characterized in that the radio station performs an operation for estimating the communication load.

(Additional Statement 27)

The method for estimating a communication load according to any one of additional statements 24 to 26, characterized in that the operation for estimating the communication load is performed in such a manner that load estimation is performed based on measurement data on the first and second quality indicators measured by a plurality of radio terminals, wherein a load is estimated for each's measurement data, and results of the estimation are subjected to statistical processing.

(Additional Statement 28)

The method for estimating a communication load according to any one of additional statements 24 to 27, characterized in that an operator of the network is different from an operator of the radio station.

(Additional Statement 29)

A device for estimating a communication load in a network, characterized by comprising:

acquisition means for acquiring at least measurement data on a first quality indicator, which includes entire received power, and on a second quality indicator, which includes a signal-to-noise-and-interference ratio of a reference signal; and estimation means for estimating the communication load in the network by using at least the first and second quality indicators.

(Additional Statement 30)

The device for estimating a communication load according to additional statement 29, characterized in that the estimation means estimates the communication load based on a result of subtracting interference and noise power components included in the signal-to-noise-and-interference ratio from the entire received power.

(Additional Statement 31)

The device for estimating a communication load according to additional statement 29 or 30, characterized in that the estimation means estimates the communication load by using results of measurement of the first and second quality indicators, which is performed multiple times for each thereof.

(Additional Statement 32)

The device for estimating a communication load according to additional statement 31, characterized in that the estimation means performs statistical processing of measurement values obtained by the multiple times of measurement and estimates the communication load by using a result of the statistical processing.

(Additional Statement 33)

The device for estimating a communication load according to additional statement 31, characterized in that the estimation means performs statistical processing of results of estimation, which is performed for each of the multiple times of measurement.

(Additional Statement 34)

The device for estimating a communication load according to any one of additional statements 29 to 33, characterized in that the estimation means performs an operation for estimating the communication load when received power of the reference signal is not smaller than a predetermined value.

(Additional Statement 35)

The device for estimating a communication load according to any one of additional statements 29 to 34, characterized in that the network includes a plurality of cells having a predetermined resource block structure, wherein the reference signal is a reference signal of the network.

(Additional Statement 36)

The device for estimating a communication load according to additional statement 35, characterized in that, assuming that the communication load is u, the communication load u is calculated by using a following equation (1):

[Math. 7]

$$u_k = \frac{1}{5} \cdot \left( \frac{RSSI}{2p_k} - \frac{6}{SINR_k} - 1 \right) = \frac{1}{5} \cdot \left( \frac{1}{2RSRQ_k} - \frac{6}{SINR_k} - 1 \right) \quad (1)$$

where the first quality indicator is RSSI or $RSRQ_k$, and the second quality indicator is $SINR_k$, RSSI is received signal power per resource block (1 RB) of an OFDM symbol in which the reference signal RS is multiplexed, $p_k$ is received signal power per resource element of the reference signal RS of a cell Cell_k ($RSRP_k$), $SINR_k$ is a ratio of received signal power of the RS signal of the cell Cell_k to interference signal power plus noise power, and $RSRQ_k$ is a ratio of the received signal power of the RS signal of the cell Cell_k to RSSI.

(Additional Statement 37)

The device for estimating a communication load according to any one of additional statements 29 to 34, characterized in that the network is of a code division multiplexing system of multiplexing the pilot signal and a user transmission signal, wherein the reference signal is the pilot signal.

(Additional Statement 38)

The device for estimating a communication load according to additional statement 37, characterized in that, assuming that the communication load is u, the communication load u is calculated by using a following equation (2):

[Math. 8]

$$u_k = \frac{RSSI}{p_k} - \frac{SF}{SINR_k} - 1 = \frac{1}{Ec/No_k} - \frac{SF}{SINR_k} - 1 \quad (2)$$

where the first quality indicator is RSSI or $Ec/No_k$, and the second quality indicator is $SINR_k$, RSSI is received signal power within a bandwidth, $p_k$ is received signal power of a pilot signal (PS) of a cell Cell_k ($RSRP_k$), $SINR_k$ is a ratio of the received signal power of the PS signal of the cell Cell_k to interference signal power plus noise power, $Ec/No_k$ is a ratio of the received signal power of the PS signal of the cell Cell_k to RSSI, and SF is a spreading factor.

(Additional Statement 39)

The device for estimating a communication load according to any one of additional statements 29 to 38, characterized by being provided to a radio station in a radio communication system.

(Additional Statement 40)

The device for estimating a communication load according to additional statements 39, characterized in that the acquisition means acquires measurement data on the first and second quality indicators from a radio terminal managed by the radio station.

(Additional Statement 41)

The device for estimating a communication load according to any one of additional statements 29 to 38, characterized by being provided to at least one of a radio base station and a upper-level apparatus thereof in a radio communication system, wherein the estimation means estimates a communication load in an estimation-target cell.

(Additional Statement 42)

The device for estimating a communication load according to additional statement 41, characterized in that the acquisition means acquires measurement data on the first and second quality indicators from a radio terminal that is connected to a cell managed by the radio base station.

(Additional Statement 43)

The device for estimating a communication load according to additional statement 41, characterized in that if any other radio base station exists that cooperates with the radio base station in the operation for estimating the communication load, the acquisition means acquires measurement data on the first and second quality indicators measured by a radio terminal that is connected to a cell managed by this other radio base station.

(Additional Statement 44)

The device for estimating a communication load according to additional statement 41, characterized in that the acquisition means acquires measurement data on the first and second quality indicators measured by a radio terminal that is connected to the estimation-target cell.

(Additional Statement 45)

The device for estimating a communication load according to additional statement 44, characterized in that the acquisition means acquires the measurement data on the first and second quality indicators from a database that is used in common with a third radio base station managing the estimation-target cell.

(Additional Statement 46)

The device for estimating a communication load according to additional statement 44 or 45, characterized in that if a radio terminal located within the estimation-target cell operates in Logged MDT (Minimization of Drive Test) mode, the acquisition means acquires measurement data on the first and second quality indicators when the radio terminal is connected to the radio base station.

(Additional Statement 47)

The device for estimating a communication load according to any one of additional statements 41 to 46, characterized in that the estimation means performs load estimation based on measurement data on the first and second quality indicators measured by a plurality of radio terminals, wherein a load is estimated for each's measurement data, and performs statistical processing of results of the estimation.

(Additional Statement 48)

The device for estimating a communication load according to any one of additional statements 29 to 38, characterized by being provided to a radio terminal in a radio communication system.

(Additional Statement 49)

The device for estimating a communication load according to additional statement 48, characterized in that the estimation means estimates a communication load in each of a plurality of networks.

(Additional Statement 50)

The device for estimating a communication load according to additional statement 48 or 49, characterized in that the estimation means estimates a communication load in at least one network and acquires from another radio terminal a communication load in another network, which is estimated by the another radio terminal.

(Additional Statement 51)

The device for estimating a communication load according to additional statement 48 or 49, characterized in that the estimation means estimates a communication load in at least one network, and the acquisition means acquires from another radio terminal measurement data on the first and second quality indicators of another network, which are measured by the another radio terminal.
(Additional Statement 52)
The device for estimating a communication load according to any one of additional statements 29 to 38, characterized in that the acquisition means acquires from a radio base station in a radio communication system measurement data on the first and second quality indicators of the network, which are measured at an application level of a radio terminal under control of the radio base station.
(Additional Statement 53)
The device for estimating a communication load according to additional statement 52, characterized in that the estimation means performs an operation for estimating the communication load by using the measurement data collected from the radio base station.
(Additional Statement 54)
The device for estimating a communication load according to any one of additional statements 29 to 38, characterized in that the acquisition means acquires measurement data on the first and second quality indicators of the network at an application level, and the estimation means performs an operation for estimating the communication load by using the measurement data.
(Additional Statement 55)
The device for estimating a communication load according to additional statement 52 or 53, characterized in that the estimation means performs load estimation based on measurement data on the first and second quality indicators measured by a plurality of radio terminals, wherein a load is estimated for each's measurement data, and performs statistical processing of results of the estimation.
(Additional Statement 56)
The device for estimating a communication load according to additional statement 52, 53 or 55, characterized in that an operator of the network is different from an operator of the radio terminal.
(Additional Statement 57)
A radio station in a radio communication system, characterized by comprising:
acquisition means for acquiring at least measurement data on a first quality indicator, which includes entire received power, and on a second quality indicator, which includes a signal-to-noise-and-interference ratio of a reference signal; and
estimation means for estimating a communication load in a network by using at least the first and second quality indicators.
(Additional Statement 58)
The radio station according to additional statement 57, characterized in that the estimation means estimates the communication load based on a result of subtracting interference and noise power components included in the signal-to-noise-and-interference ratio from the entire received power.
(Additional Statement 59)
The radio station according to additional statement 57 or 58, characterized in that the estimation means estimates the communication load by using results of measurement of the first and second quality indicators, which is performed multiple times for each thereof.
(Additional Statement 60)
The radio station according to additional statement 59, characterized in that the estimation means performs statistical processing of measurement values obtained by the multiple times of measurement and estimates the communication load by using a result of the statistical processing.

(Additional Statement 61)
The radio station according to additional statement 59, characterized in that the estimation means performs statistical processing of results of estimation, which is performed for each of the multiple times of measurement.
(Additional Statement 62)
The radio station according to any one of additional statements 57 to 61, characterized in that the estimation means performs an operation for estimating the communication load when received power of the reference signal is not smaller than a predetermined value.
(Additional Statement 63)
The radio station according to any one of additional statements 57 to 62, characterized in that the network includes a plurality of cells having a predetermined resource block structure, wherein the reference signal is a reference signal of the network.
(Additional Statement 64)
The radio station according to additional statement 63, characterized in that, assuming that the communication load is u, the communication load u is calculated by using a following equation (1):

[Math. 9]
$$u_k = \frac{1}{5} \cdot \left( \frac{RSSI}{2p_k} - \frac{6}{SINR_k} - 1 \right) = \frac{1}{5} \cdot \left( \frac{1}{2RSRQ_k} - \frac{6}{SINR_k} - 1 \right) \quad (1)$$

where the first quality indicator is RSSI or $RSRQ_k$, and the second quality indicator is $SINR_k$,
RSSI is received signal power per resource block (1 RB) of an OFDM symbol in which the reference signal RS is multiplexed,
$p_k$ is received signal power per resource element of the reference signal RS of a cell Cell_k ($RSRP_k$),
$SINR_k$ is a ratio of received signal power of the RS signal of the cell Cell_k to interference signal power plus noise power, and
$RSRQ_k$ is a ratio of the received signal power of the RS signal of the cell Cell_k to RSSI.
(Additional Statement 65)
The radio station according to any one of additional statements 57 to 62, characterized in that the network is of a code division multiplexing system of multiplexing the pilot signal and a user transmission signal, wherein the reference signal is the pilot signal.
(Additional Statement 66)
The radio station according to additional statement 65, characterized in that, assuming that the communication load is u, the communication load u is calculated by using a following equation (2):

[Math. 10]
$$u_k = \frac{RSSI}{p_k} - \frac{SF}{SINR_k} - 1 = \frac{1}{Ec/No_k} - \frac{SF}{SINR_k} - 1 \quad (2)$$

where the first quality indicator is RSSI or $Ec/No_k$, and the second quality indicator is $SINR_k$,
RSSI is received signal power within a bandwidth,
$p_k$ is received signal power of a pilot signal (PS) of a cell Cell_k ($RSRP_k$),
$SINR_k$ is a ratio of the received signal power of the PS signal of the cell Cell_k to interference signal power plus noise power, Ec/No$_k$ is a ratio of the received signal power of the PS signal of the cell Cell_k to RSSI, and SF is a spreading factor.

(Additional Statement 67)

The radio station according to any one of additional statements 57 to 66, characterized in that the estimation means estimates a communication load in each of a plurality of networks.

(Additional Statement 68)

The radio station according to any one of additional statements 57 to 67, characterized by further comprising network selection means for selecting a network based on the communication load(s) in the network(s).

(Additional Statement 69)

The radio station according to additional statement 68, characterized in that the estimation means estimates a communication load in at least one network and acquires from another radio terminal a communication load in another network, which is estimated by the another radio terminal, and the network selection means selects a network based on the communication load in each network.

(Additional Statement 70)

The radio station according to additional statement 68, characterized in that the acquisition means acquires from another radio terminal measurement data on the first and second quality indicators of another network, which are measured by the another radio terminal, the estimation means estimates a communication load in each network based on measurement data on the first and second quality indicators of at least one network and based on the measurement data of the another network, and the network selection means selects a network based on the communication load in each network.

(Additional Statement 71)

The radio station according to additional statement 67 or 68, characterized in that the acquisition means acquires from another radio terminal simplified radio quality information indicating radio quality of the another radio terminal, the estimation means estimates the communication load(s) in the network(s) by using the first and quality indicators of the network(s), and the selection means selects a network based on the simplified radio quality indicator and the communication load in each network.

(Additional Statement 72)

The radio station according to any one of additional statements 57 to 71, characterized in that the acquisition means acquires measurement data on the first and second quality indicators of the network(s) at an application level, and the estimation means performs an operation for estimating the communication load(s) by using the measurement data.

(Additional Statement 73)

The radio station according to any one of additional statements 57 to 71, characterized in that the estimation means performs load estimation based on measurement data on the first and second quality indicators measured by a plurality of radio terminals, wherein a load is estimated for each's measurement data, and performs statistical processing of results of the estimation.

(Additional Statement 74)

A upper-level apparatus of a radio station in a radio communication system, characterized by comprising:

acquisition means for acquiring from a radio station at least measurement data on a first quality indicator, which includes entire received power, and on a second quality indicator, which includes a signal-to-noise-and-interference ratio of a reference signal; and estimation means for estimating a communication load in a network by using at least the first and second quality indicators.

(Additional Statement 75)

The upper-level apparatus according to additional statement 74, characterized in that the estimation means estimates the communication load based on a result of subtracting interference and noise power components included in the signal-to-noise-and-interference ratio from the entire received power.

(Additional Statement 76)

The upper-level apparatus according to additional statement 74 or 75, characterized in that the estimation means estimates the communication load by using results of measurement of the first and second quality indicators, which is performed multiple times for each thereof.

(Additional Statement 77)

The upper-level apparatus according to additional statement 76, characterized in that the estimation means performs statistical processing of measurement data obtained by the multiple times of measurement and estimates the communication load by using a result of the statistical processing.

(Additional Statement 78)

The upper-level apparatus according to additional statement 76, characterized in that the estimation means performs statistical processing of results of estimation, which is performed for each of the multiple times of measurement.

(Additional Statement 79)

The upper-level apparatus according to any one of additional statements 74 to 78, characterized in that the estimation means performs an operation for estimating the communication load when received power of the reference signal is not smaller than a predetermined value.

(Additional Statement 80)

The upper-level apparatus according to any one of additional statements 74 to 79, characterized in that the network includes a plurality of cells having a predetermined resource block structure, wherein the reference signal is a reference signal of the network.

(Additional Statement 81)

The upper-level apparatus according to additional statement 81, characterized in that, assuming that the communication load is u, the communication load u is calculated by using a following equation (1):

[Math. 11]

$$u_k = \frac{1}{5} \cdot \left( \frac{RSSI}{2p_k} - \frac{6}{SINR_k} - 1 \right) = \frac{1}{5} \cdot \left( \frac{1}{2RSRQ_k} - \frac{6}{SINR_k} - 1 \right) \quad (1)$$

where the first quality indicator is RSSI or RSRQ$_k$, and the second quality indicator is SINR$_k$, RSSI is received signal power per resource block (1 RB) of an OFDM symbol in which the reference signal RS is multiplexed, $p_k$ is received signal power per resource element of the reference signal RS of a cell Cell_k (RSRP$_k$), SINR$_k$ is a ratio of received signal power of the RS signal of the cell Cell_k to interference signal power plus noise power, and RSRQ$_k$ is a ratio of the received signal power of the RS signal of the cell Cell_k to RSSI.

(Additional Statement 82)

The upper-level apparatus according to any one of additional statements 74 to 79, characterized in that the network is of a code division multiplexing system of multiplexing the pilot signal and a user transmission signal, wherein the reference signal is the pilot signal.

(Additional Statement 83)

The upper-level apparatus according to additional statement 82, characterized in that, assuming that the communication load is u, the communication load u is calculated by using a following equation (2):

[Math. 12]

$$u_k = \frac{RSSI}{p_k} - \frac{SF}{SINR_k} - 1 = \frac{1}{Ec/No_k} - \frac{SF}{SINR_k} - 1 \quad (2)$$

where the first quality indicator is RSSI or $Ec/No_k$, and the second quality indicator is $SINR_k$, RSSI is received signal power within a bandwidth, $p_k$ is received signal power of a pilot signal (PS) of a cell Cell_k ($RSRP_k$), $SINR_k$ is a ratio of the received signal power of the PS signal of the cell Cell_k to interference signal power plus noise power, $Ec/No_k$ is a ratio of the received signal power of the PS signal of the cell Cell_k to RSSI, and SF is a spreading factor.

(Additional Statement 84)

The upper-level apparatus according to any one of additional statements 74 to 83, characterized in that the estimation means estimates a communication load in each of a plurality of networks.

(Additional Statement 85)

A radio communication system including at least one of a radio station and a upper-level apparatus thereof, characterized in that the radio station or the upper-level apparatus estimates a communication load in the network by using at least a first quality indicator, which includes entire received power, and a second quality indicator, which includes a signal-to-noise-and-interference ratio of a reference signal.

(Additional Statement 86)

The radio communication system according to additional statement 85, characterized in that the communication load is estimated based on a result of subtracting interference and noise power components included in the signal-to-noise-and-interference ratio from the entire received power.

(Additional Statement 87)

The radio communication system according to additional statement 85 or 86, characterized in that the communication load is estimated by using results of measurement of the first and second quality indicators, which is performed multiple times for each thereof.

(Additional Statement 88)

The radio communication system according to additional statement 87, characterized in that the communication load is estimated by using statistical processing of measurement values obtained by the multiple times of measurement.

(Additional Statement 89)

The radio communication system according to additional statement 87, characterized in that the communication load is calculated by statistical processing of results of estimation, which is performed for each of the multiple times of measurement.

(Additional Statement 90)

The radio communication system according to any one of additional statements 85 to 89, characterized in that an operation for estimating the communication load is performed when received power of the reference signal is not smaller than a predetermined value.

(Additional Statement 91)

The radio communication system according to any one of additional statements 85 to 90, characterized in that the network includes a plurality of cells having a predetermined resource block structure, wherein the reference signal is a reference signal of the network.

(Additional Statement 92)

The radio communication system according to additional statement 91, characterized in that, assuming that the communication load is u, the communication load u is calculated by using a following equation (1):

[Math. 13]

$$u_k = \frac{1}{5} \cdot \left( \frac{RSSI}{2p_k} - \frac{6}{SINR_k} - 1 \right) = \frac{1}{5} \cdot \left( \frac{1}{2RSRQ_k} - \frac{6}{SINR_k} - 1 \right) \quad (1)$$

where the first quality indicator is RSSI or $RSRQ_k$, and the second quality indicator is $SINR_k$, RSSI is received signal power per resource block (1 RB) of an OFDM symbol in which the reference signal RS is multiplexed, $p_k$ is received signal power per resource element of the reference signal RS of a cell Cell_k ($RSRP_k$), $SINR_k$ is a ratio of received signal power of the RS signal of the cell Cell_k to interference signal power plus noise power, and $RSRQ_k$ is a ratio of the received signal power of the RS signal of the cell Cell_k to RSSI.

(Additional Statement 93)

The radio communication system according to any one of additional statements 85 to 90, characterized in that the network is of a code division multiplexing system of multiplexing the pilot signal and a user transmission signal, wherein the reference signal is the pilot signal.

(Additional Statement 94)

The radio communication system according to additional statement 93, characterized in that, assuming that the communication load is u, the communication load u is calculated by using a following equation (2):

[Math. 14]

$$u_k = \frac{RSSI}{p_k} - \frac{SF}{SINR_k} - 1 = \frac{1}{Ec/No_k} - \frac{SF}{SINR_k} - 1 \quad (2)$$

where the first quality indicator is RSSI or $Ec/No_k$, and the second quality indicator is $SINR_k$, RSSI is received signal power within a bandwidth, $p_k$ is received signal power of a pilot signal (PS) of a cell Cell_k ($RSRP_k$), $SINR_k$ is a ratio of the received signal power of the PS signal of the cell Cell_k to interference signal power plus noise power, $Ec/No_k$ is a ratio of the received signal power of the PS signal of the cell Cell_k to RSSI, and SF is a spreading factor.

INDUSTRIAL APPLICABILITY

The present invention is applicable to radio communication systems utilizing a network load, for example, a radio communication system that autonomously performs optimization of radio parameters and network configurations, and the like.

REFERENCE SIGNS LIST

1 Communication load estimation function
Q1 First quality indicator
Q2 Second quality indicator
10, 10a, 10b Load estimation device
11 Radio communication section
12 Load estimation section
13 Statistical processing section
14 Data processing section
30 Radio station
31 Radio communication section
32 Transmission/reception data processing section
33 Communication load estimation section
34 Control section
40, 40a, 40b, 41, 42, 43a, 43b, 44 Radio base station
50, 50a, 50b, 51 Radio cell
60, 61, 62, 63, 64 Communication line
70 Terminal measurement database
71 Upper-level apparatus
72 Server
100, 100a, 100b, 100c, 100d Radio terminal
200a, 200b, 200c, 200d Radio terminal

The invention claimed is:

1. A method for estimating a communication load in a network, wherein the network includes a plurality of cells and has a predetermined resource block structure, comprising:

measuring, by a radio station, a first quality indicator including entire received power;
measuring, by the radio station, a second quality indicator including a signal-to-noise-and-interference ratio with respect to a reference signal of a cell; and
estimating a physical resource block usage as a communication load of the cell by using the entire received power and the signal-to-noise-and-interference ratio,
wherein the network is of LTE (Long Term Evolution) and the reference signal is of the network, and
wherein, assuming that the communication load is u, the communication load u is calculated by using a following equation:

$$u_k = \frac{1}{5} \cdot \left( \frac{RSSI}{2p_k} - \frac{6}{SINR_k} - 1 \right) = \frac{1}{5} \cdot \left( \frac{1}{2RSRQ_k} - \frac{6}{SINR_k} - 1 \right) \quad (1)$$

where the first quality indicator is RSSI or $RSRQ_k$, and the second quality indicator is $SINR_k$,
RSSI is received signal power per resource block (1 RB) of an OFDM symbol in which the reference signal RS is multiplexed,
$p_k$ is received signal power per resource element of the reference signal RS of a cell Cell_k ($RSRP_k$),
$SINR_k$ is a ratio of received signal power of the RS signal of the cell Cell_k to interference signal power plus noise power, and
$RSRQ_k$ is a ratio of the received signal power of the RS signal of the cell Cell_k to RSSI.

2. The method according to claim 1, wherein the communication load of the cell is estimated by:
measuring received power of the reference signal of the cell;
calculating interference and noise power components from the signal-to-noise-and-interference ratio and the received power of the reference signal of the cell; and
estimating the communication load of the cell based on a result of subtracting the interference and noise power components from the entire received power.

3. The method according to claim 1, wherein the communication load is estimated by using results of measurement of the first and second quality indicators, wherein the measurement is performed multiple times for each of the first and second quality indicators.

4. The method according to claim 3, further comprising statistical processing of measurement values obtained by the multiple times of measurement.

5. The method according to claim 3, further comprising statistical processing of estimation results, each of which is obtained by estimation for each of the multiple times of measurement.

6. The method according to claim 1, wherein an estimation operation of the communication load is performed when received power of the reference signal is not smaller than a predetermined value.

7. A method for estimating a communication load in a network, comprising:

measuring, by a radio station, a first quality indicator including entire received power;
measuring, by the radio station, a second quality indicator including a signal-to-noise-and-interference ratio with respect to a reference signal of a cell; and
estimating a communication load of the cell by using the entire received power and the signal-to-noise-and-interference ratio,
wherein the network is of a code division multiplexing system of multiplexing a pilot signal and a user transmission signal, wherein the reference signal is the pilot signal,
wherein, assuming that the communication load is u, the communication load u is calculated by using a following equation:

$$u_k = \frac{RSSI}{p_k} - \frac{SF}{SINR_k} - 1 = \frac{1}{Ec/No_k} - \frac{SF}{SINR_k} - 1 \quad (2)$$

where the first quality indicator is RSSI or $Ec/No_k$, and the second quality indicator is $SINR_k$,
RSSI is received signal power within a bandwidth,
$p_k$ is received signal power of a pilot signal (PS) of a cell Cell_k ($RSRP_k$),
$SINR_k$ is a ratio of the received signal power of the PS signal of the cell Cell_k to interference signal power plus noise power,
$Ec/No_k$ is a ratio of the received signal power of the PS signal of the cell Cell_k to RSSI, and
SF is a spreading factor.

8. A device for estimating a communication load in a network, wherein the network includes a plurality of cells and has a predetermined resource block structure, comprising:

a communication section that is configured to acquire at least first measurement data on a first quality indicator, which includes entire received power by a radio station, and second measurement data on a second quality indicator, which includes a signal-to-noise-and-interference ratio at a radio station with respect to a reference signal of a cell; and an estimation section that estimates a physical resource block usage as the communication load of the cell by using at least the first measurement data of the entire received power and the second measurement data of the signal-to-noise-and-interference ratio, wherein the network is of LTE (Long Term Evolution) and the reference signal is of the network, and wherein, assuming that the communication load is u, the communication load u is calculated by using a following equation:

$$u_k = \frac{1}{5} \cdot \left( \frac{RSSI}{2p_k} - \frac{6}{SINR_k} - 1 \right) = \frac{1}{5} \cdot \left( \frac{1}{2RSRQ_k} - \frac{6}{SINR_k} - 1 \right) \quad (1)$$

where the first quality indicator is RSSI or $RSRQ_k$, and the second quality indicator is $SINR_k$, RSSI is received signal power per resource block (1 RB) of an OFDM symbol in which the reference signal RS is multiplexed, $p_k$ is received signal power per resource element of the reference signal RS of a cell Cell_k ($RSRP_k$), $SINR_k$ is a ratio of received signal power of the RS signal of the cell Cell_k to interference signal power plus noise power, and $RSRQ_k$ is a ratio of the received signal power of the RS signal of the cell Cell_k to RSSI.

9. The device according to claim 8, wherein the estimation section estimates the communication load of the cell by:
measuring received power of the reference signal of the cell;
calculating interference and noise power components from the signal-to-noise-and-interference ratio and the received power of the reference signal of the cell; and
estimating the communication load of the cell based on a result of subtracting the interference and noise power components from the entire received power.

10. The device according to claim 8, wherein the estimation section estimates the communication load by using results of measurement of the first and second quality indicators, wherein the measurement is performed multiple times for each of the first and second quality indicators.

11. The device according to claim 10, wherein the estimation section performs statistical processing of measurement values obtained by the multiple times of measurement and estimates the communication load by using a result of the statistical processing.

12. The device according to claim 10, wherein the estimation section performs statistical processing of estimation results, each of which is obtained by estimation for each of the multiple times of measurement.

13. The device according to claim 8, wherein the estimation section performs an estimation operation of the communication load when received power of the reference signal is not smaller than a predetermined value.

14. A device for estimating a communication load in a network, comprising:
a communication section that is configured to acquire at least first measurement data on a first quality indicator, which includes entire received power by a radio station, and second measurement data on a second quality indicator, which includes a signal-to-noise-and-interference ratio at a radio station with respect to a reference signal of a cell; and an estimation section that estimates the communication load of the cell by using at least the first measurement data of the entire received power and the second measurement data of the signal-to-noise-and-interference ratio, wherein the network is of a code division multiplexing system of multiplexing the pilot signal and a user transmission signal, wherein the reference signal is the pilot signal, wherein, assuming that the communication load is u, the communication load u is calculated by using a following equation:

$$u_k = \frac{RSSI}{p_k} - \frac{SF}{SINR_k} - 1 = \frac{1}{Ec/No_k} - \frac{SF}{SINR_k} - 1 \quad (2)$$

where the first quality indicator is RSSI or $Ec/No_k$, and the second quality indicator is $SINR_k$, RSSI is received signal power within a bandwidth, $p_k$ is received signal power of a pilot signal (PS) of a cell Cell_k ($RSRP_k$), $SINR_k$ is a ratio of the received signal power of the PS signal of the cell Cell_k to interference signal power plus noise power, $Ec/No_k$ is a ratio of the received signal power of the PS signal of the cell Cell_k to RSSI, and SF is a spreading factor.

15. A radio station in a radio communication system, wherein the radio communication system includes a plurality of cells and has a predetermined resource block structure, comprising:
a communication section that is configured to acquire at least first measurement data on a first quality indicator, which includes entire received power, and second measurement data on a second quality indicator, which includes a signal-to-noise-and-interference ratio with respect to a reference signal of a cell; and an estimation section that estimates a physical resource block usage as the communication load of the cell by using at least the first measurement data of the entire received power and the second measurement data of the signal-to-noise-and-interference ratio, wherein the radio communication system is of LTE (Long Term Evolution) and the reference signal is of the radio communication system, and wherein, assuming that the communication load is u, the communication load u is calculated by using a following equation:

$$u_k = \frac{1}{5} \cdot \left( \frac{RSSI}{2p_k} - \frac{6}{SINR_k} - 1 \right) = \frac{1}{5} \cdot \left( \frac{1}{2RSRQ_k} - \frac{6}{SINR_k} - 1 \right) \quad (1)$$

where the first quality indicator is RSSI or $RSRQ_k$, and the second quality indicator is $SINR_k$, RSSI is received signal power per resource block (1 RB) of an OFDM symbol in which the reference signal RS is multiplexed, $p_k$ is received signal power per resource element of the reference signal RS of a cell Cell_k ($RSRP_k$), SINR$_k$ is a ratio of received signal power of the RS signal of the cell Cell_k to interference signal power plus noise power, and RSRQ$_k$ is a ratio of the received signal power of the RS signal of the cell Cell_k to RSSI.

16. The radio station according to claim 15, wherein the estimation section estimates the communication load of the cell by:
    measuring received power of the reference signal of the cell;
    calculating interference and noise power components from the signal-to-noise-and-interference ratio and the received power of the reference signal of the cell; and
    estimating the communication load of the cell based on a result of subtracting the interference and noise power components from the entire received power.

17. The radio station according to claim 15, wherein the estimation section estimates the communication load by using results of measurement of the first and second quality indicators, wherein the measurement is performed multiple times for each of the first and second quality indicators.

18. The radio station according to claim 17, wherein the estimation section performs statistical processing of measurement values obtained by the multiple times of measurement and estimates the communication load by using a result of the statistical processing.

19. The radio station according to claim 17, wherein the estimation section performs statistical processing of estimation results, each of which is obtained by estimation for each of the multiple times of measurement.

20. The radio station according to claim 15, wherein the estimation section performs an estimation operation of the communication load when received power of the reference signal is not smaller than a predetermined value.

21. The radio station according to claim 15, wherein the estimation section estimates a communication load in each of a plurality of radio communication systems.

22. The radio station according to claim 21, wherein the communication section acquires, from a first radio station other than the radio station, simplified radio quality information indicating radio quality of the first radio station,
    the estimation section estimates communication loads in the radio communication systems by using the first and second quality indicators of the radio communication systems, and
    the connection controller selects a radio communication system based on the simplified radio quality indicator and the communication load in each of the plurality of radio communication systems.

23. The radio station according to claim 15, wherein the communication section acquires measurement data on the first and second quality indicators of the radio communication system at an application level, and the estimation section performs an estimation operation of the communication load by using the measurement data.

24. The radio station according to claim 15, wherein the estimation section performs load estimation based on measurement data on the first and second quality indicators measured by each of a plurality of radio terminals, and performs statistical processing of results of the load estimation.

25. The radio station according to claim 15, further comprising a connection controller that is configured to select one of a plurality of radio communication systems based on estimated communication loads in the plurality of radio communication systems.

26. The radio station according to claim 25, wherein the estimation section estimates a communication load in at least one radio communication system and acquires, from a first radio station other than the radio station, a first communication load in a first radio communication system other than the at least one radio communication system, wherein the first communication load is estimated by the first radio station, and
    the connection controller selects the one of the plurality of radio communication systems based on the communication load in each of the plurality of radio communication systems.

27. The radio station according to claim 25, wherein the communication section acquires, from a first radio station other than the radio station, measurement data on the first and second quality indicators of a first radio communication system other than at least one radio communication system, wherein the first and second quality indicators of the first radio communication system are measured by the first radio station,
    the estimation section estimates a communication load in each radio communication system based on measurement data on the first and second quality indicators of the at least one radio communication system and based on the measurement data of the first radio communication system, and
    the connection controller selects the one of the plurality of radio communication systems based on the communication load in each of the plurality of radio communication systems.

28. A radio station in a radio communication system, comprising:
    a communication section that is configured to acquire at least first measurement data on a first quality indicator, which includes entire received power, and second measurement data on a second quality indicator, which includes a signal-to-noise-and-interference ratio with respect to a reference signal of a cell; and
    an estimation section that estimates the communication load of the cell by using at least the first measurement data of the entire received power and the second measurement data of the signal-to-noise-and-interference ratio,
    wherein the radio communication system is of a code division multiplexing system of multiplexing a pilot signal and a user transmission signal, wherein the reference signal is the pilot signal,
    wherein, assuming that the communication load is u, the communication load u is calculated by using a following equation:

$$u_k = \frac{RSSI}{p_k} - \frac{SF}{SINR_k} - 1 = \frac{1}{Ec/No_k} - \frac{SF}{SINR_k} - 1 \qquad (2)$$

where the first quality indicator is RSSI or Ec/No$_k$, and the second quality indicator is SINR$_k$, RSSI is received signal power within a bandwidth, $p_k$ is received signal power of a pilot signal (PS) of a cell Cell_k (RSRP$_k$), SINR$_k$ is a ratio of the received signal power of the PS signal of the cell Cell_k to interference signal power plus noise power, Ec/No$_k$ is a ratio of the received signal power of the PS signal of the cell Cell_k to RSSI, and SF is a spreading factor.

29. An upper-level apparatus of a radio station in a radio communication system, wherein the radio communication system includes a plurality of cells and has a predetermined resource block structure, comprising:
- a communication section that is configured to acquire at least first measurement data on a first quality indicator, which includes entire received power by the radio station, and second measurement data on a second quality indicator, which includes a signal-to-noise-and-interference ratio at the radio station with respect to a reference signal of a cell; and
- an estimation section that estimates a physical resource block usage as the communication load of the cell by using at least the first measurement data of the entire received power and the second measurement data of the signal-to-noise-and-interference ratio,
- wherein the radio communication system is of LTE (Long Term Evolution) and the reference signal is of the radio communication system, and
- wherein, assuming that the communication load is u, the communication load u is calculated by using a following equation:

$$u_k = \frac{1}{5} \cdot \left( \frac{RSSI}{2p_k} - \frac{6}{SINR_k} - 1 \right) = \frac{1}{5} \cdot \left( \frac{1}{2RSRQ_k} - \frac{6}{SINR_k} - 1 \right) \quad (1)$$

where the first quality indicator is RSSI or $RSRQ_k$, and the second quality indicator is $SINR_k$, RSSI is received signal power per resource block (1 RB) of an OFDM symbol in which the reference signal RS is multiplexed, $p_k$ is received signal power per resource element of the reference signal RS of a cell Cell_k ($RSRP_k$), $SINR_k$ is a ratio of received signal power of the RS signal of the cell Cell_k to interference signal power plus noise power, and $RSRQ_k$ is a ratio of the received signal power of the RS signal of the cell Cell_k to RSSI.

* * * * *